United States Patent [19]
Audit et al.

[11] Patent Number: 5,667,907
[45] Date of Patent: Sep. 16, 1997

[54] ELECTRICAL ENERGY STORAGE DEVICE FOR A MOTOR VEHICLE

[75] Inventors: Thomas E. Audit; Jon K. West, both of Gainesville, Fla.

[73] Assignee: EV Energy Systems, Ltd., Gainsville, Fla.

[21] Appl. No.: 420,691

[22] Filed: Apr. 12, 1995

Related U.S. Application Data

[62] Division of Ser. No. 295,106, Aug. 24, 1994, Pat. No. 5,439,488, which is a division of Ser. No. 104,221, Aug. 11, 1993, Pat. No. 5,370,711, which is a continuation-in-part of Ser. No. 94,711, Jul. 21, 1993, abandoned.

[51] Int. Cl.$^6$ .................... H01M 10/36; B60K 1/00
[52] U.S. Cl. .................... 429/94; 180/65.1; 429/233
[58] Field of Search .................... 429/94, 233; 180/68.5, 180/65.1

[56] References Cited

U.S. PATENT DOCUMENTS

| | | | |
|---|---|---|---|
| D. 304,927 | 12/1989 | Ching, Jr. et al. | D13/8 |
| D. 307,886 | 5/1990 | Ching, Jr. et al. | D13/103 |
| 3,503,806 | 3/1970 | Sugaski . | |
| 4,212,179 | 7/1980 | Juergens | 72/148 |
| 4,259,419 | 3/1981 | Uba et al. | 429/174 |
| 4,493,221 | 1/1985 | Stieg et al. | 474/14 |
| 4,521,498 | 6/1985 | Juergens | 429/59 |
| 4,578,324 | 3/1986 | Koehler et al. | 429/26 |
| 4,592,972 | 6/1986 | Juergens et al. | 429/160 |
| 4,606,982 | 8/1986 | Nelson et al. | 429/59 |
| 4,767,682 | 8/1988 | Dorogi et al. | 429/94 |
| 4,780,379 | 10/1988 | Puester | 429/59 |
| 4,859,547 | 8/1989 | Adams et al. | 429/121 |
| 5,045,086 | 9/1991 | Juergens | 29/623.1 |
| 5,047,300 | 9/1991 | Juergens | 429/94 |
| 5,198,313 | 3/1993 | Juergens | 429/94 |
| 5,323,527 | 6/1994 | Ribordy et al. | 29/623.1 |

OTHER PUBLICATIONS

"The Ultimate Starter," Optima Batteries, Denver, Colorado, dated Aug. 10, 1993.
Attachment A, photograph of EII Handline Winder (no date).
Attachment B, photograph of EII Handline Winder (no date).
Attachment C, Jun. 19, 1991 letter from Jon West.
Attachment D, Nov. 6, 1991 letter from Jon West.
Attachment E, May 26, 1992 letter from Jon West.
Attachment F, Jun. 22, 1992 letter from Jon West.

(List continued on next page.)

*Primary Examiner*—John S. Maples
*Attorney, Agent, or Firm*—Finnegan, Henderson, Farabow, Garrett, & Dunner, L.L.P.

[57] ABSTRACT

An electric energy storage device, comprises a casing and a coiled winding disposed within the casing. The winding includes a cathode plate including a strip having a pair of elongated side edges, an anode plate including a strip having a pair of elongated side edges, and a separator located between the cathode and anode plates. The cathode and anode plates are wound in an offset relationship so that one elongated side edge of the cathode plate extends beyond one elongated side edge of the anode plate at a first side of the winding, and the other elongated side edge of the anode plate extends beyond the other elongated side edge of the cathode plate at a second side of the winding opposite the first side. An electrolyte material is located within the winding. Two current collectors are secured to the casing, one current collector being pressed against the first side of the winding to contact the cathode plate at a plurality of locations thereon, and the other current collector being pressed against the second side of the winding to contact the anode plate at a plurality of locations thereon. A pressure vessel may be provided to hold at least one of the casings having at least one of the windings therein. An electric vehicle includes a plurality of the energy storage devices.

12 Claims, 38 Drawing Sheets

OTHER PUBLICATIONS

Attachment G, Jun. 23, 1992 letter from Tom Audit.

Attachment H, drawing originally enclosed with Attachment G–Jun. 1992.

Attachment I, Jun. 24, 1992 letter from Tom Audit.

Attachment J, drawing originally enclosed with Attachment I–Jun. 1992.

Attachment K, executed version of Attachment J–Jun. 1992.

Cliff Gromer, "New Age of the Electric Car", pp. 38–40, 103, *Popular Mechanics*, Feb. 1994.

Dan McCosh, "We Drive The World's Best Electric Car", pp. 52–58, *Popular Science*, Jan. 1994.

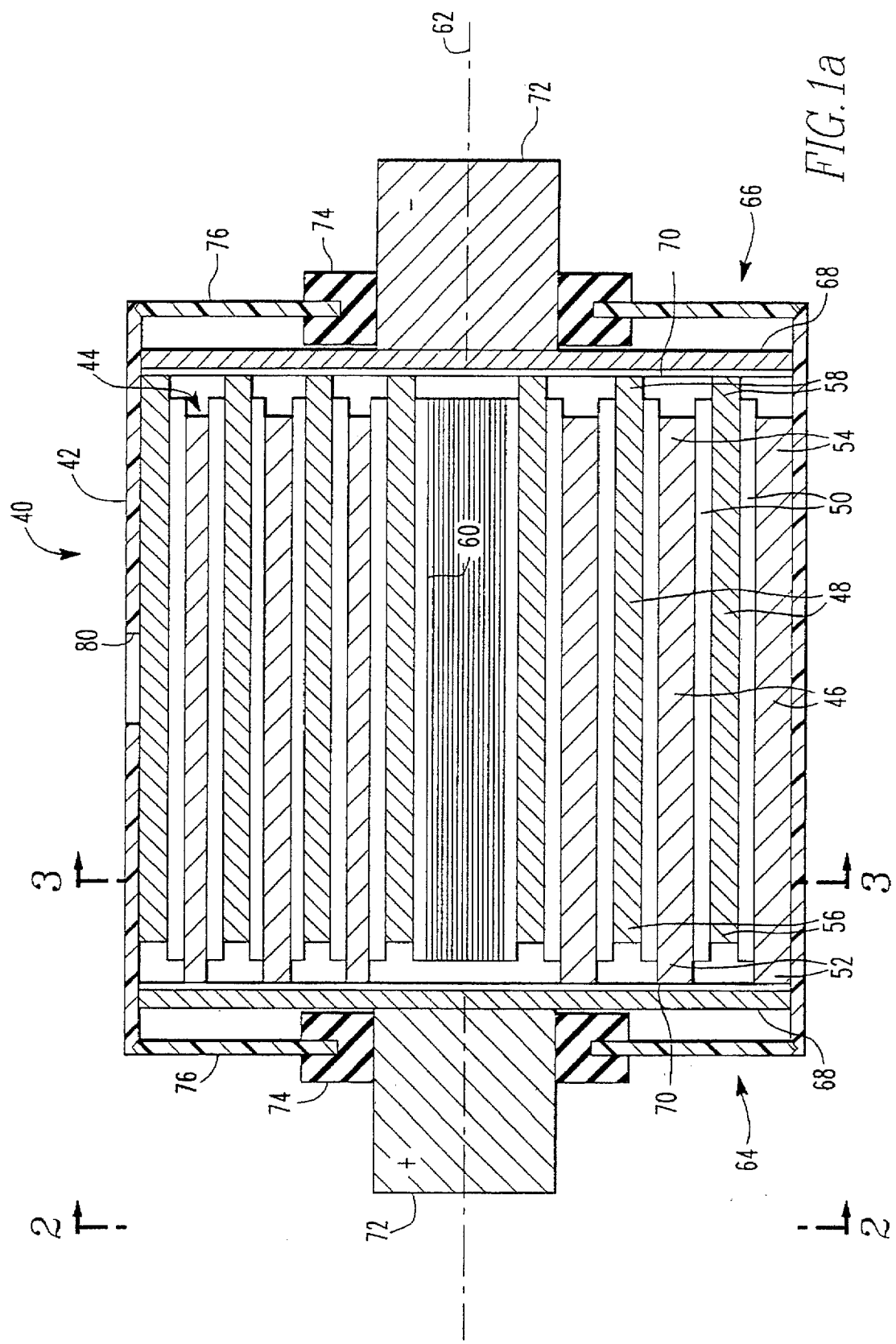

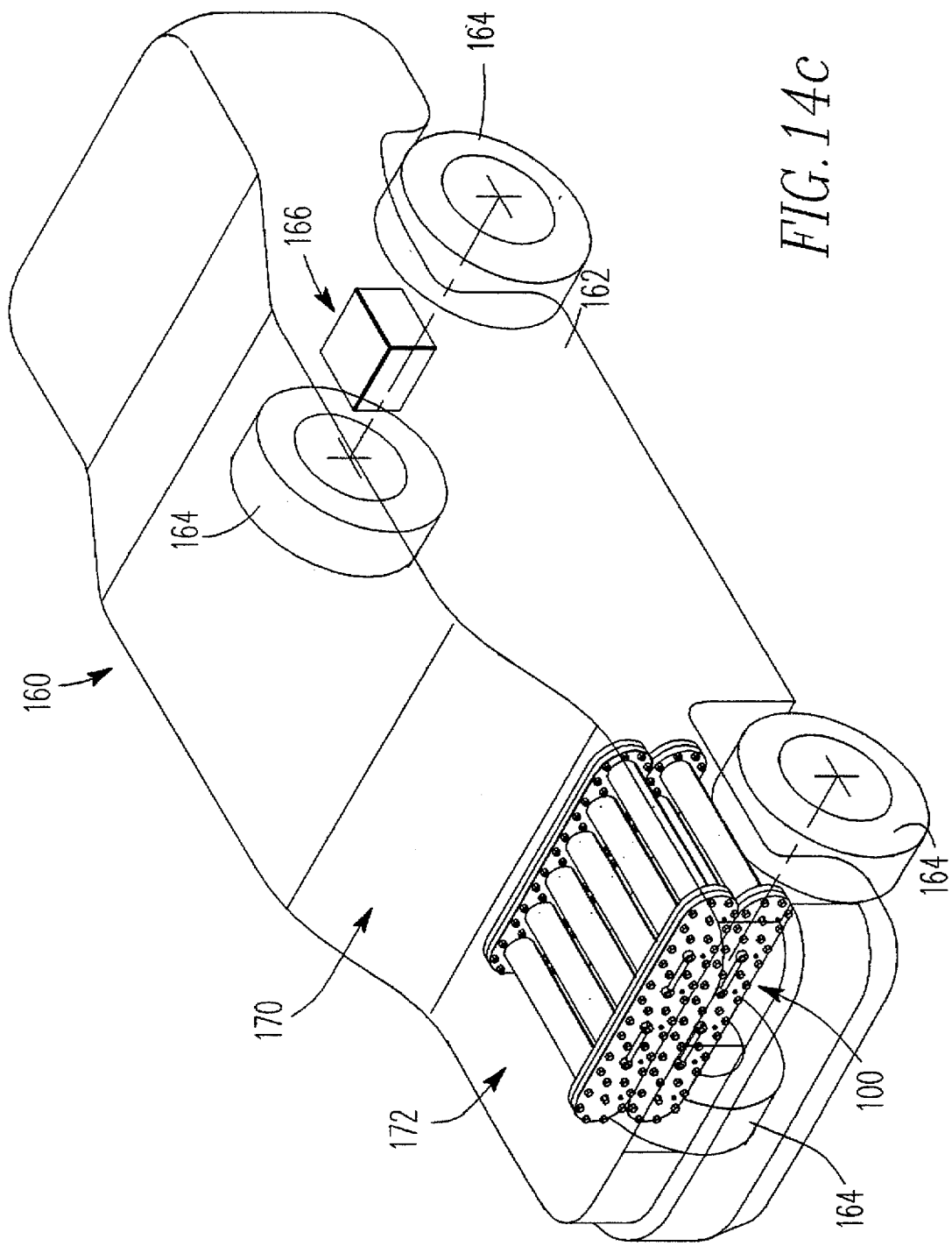

ELECTRICAL ENERGY STORAGE DEVICE FOR A MOTOR VEHICLE

This is a division of application Ser. No. 08/295,106, filed Aug. 24, 1994, now U.S. Pat. No. 5,439,488, which is a division of application Ser. No. 08/104,221, filed Aug. 11, 1993, now allowed as U.S. Pat. No. 5,370,711, which is a continuation-in-part of application Ser. No. 08/094,711 filed, Jul. 21, 1993, now abandoned, both of which are incorporated by reference herein.

BACKGROUND OF THE INVENTION

1. Field of the Invention

This invention relates to an electrical storage device, a vehicle powered by such an electrical storage device, and a method and apparatus for making such an electrical storage device. More particularly, the invention relates to a storage device made by winding layers of materials, a vehicle powered by such a storage cell, and a method and apparatus for making such a storage device.

2. Description of the Related Art

In recent years, with increasing emphasis on energy conservation and pollution control, various types of electrically powered vehicles have been proposed. Generally, these vehicles are powered by some sort of battery. Due to the cost of the battery or batteries needed to power a vehicle, rechargeable batteries are generally utilized in such vehicles. Such rechargeable batteries may be charged by solar energy using photoelectric cells which convert light energy into electrical energy. However, solar powered batteries are very expensive and are not efficient enough for a practical electric vehicle. Further, solar cells require daylight to operate, thereby limiting the distance which the vehicle could travel in one trip, and limiting travel at night.

Other rechargeable batteries are charged by direct connection a source of electrical energy. In an electrically powered vehicle where the batteries are charged through electricity rather than through solar energy, the storage capacity of the battery has been a limiting factor affecting the speed at which the vehicle can travel, and the distance that the vehicle can travel before having to recharge its batteries. Different types of rechargeable batteries have been proposed for use in such vehicles.

For example, it has been proposed to use a plurality of prismatic batteries similar to typical automobile batteries. Prismatic automobile batteries usually include a number of separate cells or chambers, each of which contains multiple positive electrodes made of lead oxide, multiple negative electrodes made of lead, and an electrolyte solution such as sulfuric acid. The cells are connected in series with two terminals provided to connect the battery to an external circuit when the terminals are connected to the circuit, a chemical reaction occurs in the cells. In this reaction, the negative electrodes are oxidized (producing electrons) and the positive electrodes are reduced. Electrons flow from the negative electrode to the positive electrode through the external circuit to do work discharging the battery. The battery can be recharged by passing direct current through it in the direction opposite to the direction of current flow during discharge thereby reversing the chemical reaction. Thus, during recharging, the negative electrodes are reduced and the positive electrodes are oxidized.

For a given reaction direction, the oxidized electrode is typically called an "anode" and the reduced electrode is called a "cathode." For simplicity herein, and consistent with common usage, the electrode reduced during discharge will be called the "cathode," and the electrode oxidized during discharge will be call the "anode", even though during recharge the electrodes' roles are reversed.

Many problems exist, however, in creating a prismatic battery suitable for powering a vehicle. For example, prismatic batteries are very bulky and heavy and, as such, reduce the distance the vehicle can travel on a charge and the top speed that the vehicle can achieve. Further, these batteries generally require a long period of time, on the order of several hours, to recharge. Therefore, prismatic battery powered vehicles are not practical for traveling between locations more distant than the vehicle can travel on a single charge. Moreover, if a prismatic, lead-acid battery powered vehicle were to be involved in a serious accident, its passengers and the environment would be at risk of harm from contact with acid spilled from broken batteries.

Another type of generally known rechargeable battery is a wound or coil battery. In wound batteries, the two electrode plates made of long strips of material are wound together into a coil, with one or more pieces of separator material wound between the coils (to prevent shorting), and an electrolyte placed in the coil to allow current flow. Tabs are welded to each of the electrodes and connected to respective positive and negative terminals. As for prismatic batteries, when the terminals are connected to an external circuit, a chemical reaction occurs causing current to flow. The battery is then recharged by driving direct current through the battery in the reverse direction to recharge the battery.

One type of wound battery is a nickel-cadmium battery, which is the commonly available rechargeable battery used for consumer products. A nickel-cadmium battery includes a positive electrode made of nickel hydroxide, a negative plate made of cadmium, and an aqueous alkaline solution, such as potassium hydroxide, as the electrolyte.

The operating parameters of a wound battery are a function of the dimensions of its electrodes. For example, the capacity of a wound battery to store charge, and the corresponding ability of the battery to produce current for a period of time (often measured in amp-hours), is dependent upon the mass of active material making up the electrode plates. The available current of the battery is roughly proportional to the amount of overlapping surface area of the electrodes within the coil.

It has therefore been proposed to form wound cells having thin electrode plates to increase the amount of overlapping surface area within a battery of a given diameter to increase available current. However, attempts to make wound batteries with very thin plates proved unsuccessful for a number of reasons.

For example, the strength of the electrodes is roughly proportional to their thickness. Therefore, thinner than usual electrodes are liable to undesirably bend or break during manufacture of the battery.

Further, with thinner than usual electrodes, the portion of the volume of the wound battery which is taken up by the separator will necessarily be greater. This result occurs because more windings of thinner electrodes will fit within the battery, and the electrodes will therefore be longer. However, because the electrodes are longer, the separator must also be longer. In that the separator thickness is not a function of the electrode thickness, in a wound battery with thinner electrodes, the separator occupies more volume than if the electrodes were not thinner. Thus, in a battery with thinner than usual electrodes, the mass of the electrodes within the battery, and consequently the capacity of the battery is undesirably reduced.

It has also been proposed to construct wound batteries having longer than usual electrodes which are as thick as conventional electrodes. This type of battery would thus have a diameter greater than that of a conventional battery. This type of battery would have a higher capacity than a conventional battery due to longer (more massive) electrodes and would have a higher current output than a conventional battery due to increased overlapping surface between the electrodes. However, a number of problems exist in the manufacture and use of such a wound battery.

For example, long electrodes are more likely to be bent, broken or non-uniformly wound during the battery manufacturing process which could slow their manufacture, or create gaps or shorts in the battery rendering it useless. Long electrodes also require more precise control of the feeding of the electrodes and separator during the winding process. If either of the electrodes are even slightly misaligned, winding the electrodes repeatedly as is required to form a winding will cause the battery to fail to achieve the desired cylindrical shape. Instead, the winding will be slightly conical and, with each turn, the electrodes will be undesirably offset from each other by a greater distance. Such a misaligned winding generally cannot be used and probably will not function due to contact between the plates. Similarly, if the separator is not properly aligned or tears during winding, the electrodes will contact each other thereby shorting the winding.

Moreover, with long electrodes, more tabs must be welded to each electrode to uniformly draw current from the electrode. Welding the additional tabs is labor intensive making manufacturing difficult and making the winding less uniform due to the increased frequency of the tabs projecting into the layers at more points in the battery.

Further, long windings with large diameters are necessarily heavier than their smaller counterparts making uniform support of the winding during the step of manufacturing difficult. Since the electrodes are usually wound about an arbor, heavier windings can cause the arbor to bend or break under the weight of the wound electrodes thereby ruining the battery.

In that a single wound battery often is too small to provide the voltage, capacity, or current required for a given application, groups of wound batteries have been connected in some fashion to provide increased output. Connecting batteries in series provides a total voltage equal to the sum of the individual voltages across each battery. Connecting batteries in parallel provides a total capacity and current equal to the sum of the individual capacities and, respectively, of the individual currents, of each battery. Connecting groups of batteries in series, and then connecting the groups in parallel provides increased voltage, capacity, and current. However, such combinations of individual batteries suffer from several drawbacks.

For example, a plurality of individual rechargeable batteries obviously requires more space and weigh more than a single battery While wound batteries are generally volumetrically more efficient than prismatic batteries (that is, wound batteries can provide more capacity per unit of volume), use of a plurality of conventional wound batteries still requires a large volume because each battery includes a single winding held inside of an individual conductive casing and/or pressure vessel. For example, as shown in FIG. 15, in a conventional battery, a winding W may be placed within a cup-shaped conductive casing A (commonly called a can). The open end of the casing A is covered by an end plate B attached to the casing by some sort of sealing member C. The sealing member C keeps the electrolyte within the cup-shaped casing A and electrically isolates the plate B from the casing A. A plastic disc D keeps the top of the winding W from electrically contacting the bent in neck of the casing, which could cause shorting of the battery. An electrically conductive tab E extending through a hole in the disc D is welded to one of the winding's electrodes and to the end plate B. A second tab F is welded to the other electrode and the bottom of the can A. A pressure relief valve G is provided in the end plate B to relieve excess pressure during recharging. The valve G may include a spring H which urges a stopper I against a hole J in the bottom of the plate B. Excess pressure causes gases to force the stopper upward against the spring H thereby allowing gases to escape through the valve G. Thus, providing a plurality of batteries having separate casings A, end plates B, sealing members C, and valves G thus takes up space, adds weight to the energy storage device and increases the chance of electrolyte leakage due to seal failure.

Fabrication of a storage device comprising a plurality of separate batteries is complicated and results in a great number of potential points of failure within the device. The casings must contain gases produced within the windings as the batteries are recharged, and thus must act as individual pressure vessels, each having separate seals and pressure relief valves. If a plurality of separate pressure vessels are used, failure of one seal could render the entire group of batteries inoperable. As windings are made more massive, the forces produced during recharging become higher increasing the possibility of failure of the seals.

In light of the foregoing, there is a need for a battery and battery operated vehicle, and a method and apparatus for manufacturing such a battery which overcome these disadvantages.

SUMMARY OF THE INVENTION

In accordance with the purpose of the present invention, and as embodied and broadly described herein, the invention includes an electric energy storage device comprising a casing, a coiled winding disposed within the casing and including a cathode plate including a strip having a pair of elongated side edges, an anode plate including a strip having a pair of elongated side edges, and a separator located between the cathode and anode plates. The cathode and anode plates are wound in an offset relationship so that one elongated side edge of the cathode plate extends beyond one elongated side edge of the anode plate at a first side of the winding, and the other elongated side edge of the anode plate extends beyond the other elongated side edge of the cathode plate at a second side of the winding opposite the first side. An electrolyte material is located within the winding. Two current collectors are secured to the casing, one current collector being pressed against the first side of the winding to thereby electrically contact the winding side at a plurality of locations thereon, the other current collector being pressed against the second side of the winding to thereby electrically contact the winding side at a plurality of locations thereon.

In another aspect, the invention includes an electric energy storage device comprising at least one casing, a plurality of electrically connected coiled windings disposed within each casing, each winding including a cathode plate including a strip having a pair of elongated side edges, an anode plate including a strip having a pair of elongated side edges, and a separator located between the cathode and anode plates. The cathode and anode plates are wound in an offset relationship so that one elongated side edge of the cathode plate extends beyond one elongated side edge of the anode plate at a first side of the winding, and the other elongated side edge of the anode plate extends beyond the other elongated side edge of the cathode plate at a second side of the winding opposite the first side. An electrolyte material is located within each winding. A plurality of current collectors are disposed within the casing, at least one of the current collectors being pressed against one of the first and second sides of each winding to thereby electrically contact the winding side at a plurality of locations thereon.

In yet another aspect, the present invention includes a pressure vessel and a plurality of electrically connected coiled windings disposed within the pressure vessel. Each winding includes a cathode plate, an anode plate, and a separator located therebetween and defines a circular first side and a circular second side axially spaced from the first side. An electrolyte material is located within each winding. A plurality of current collectors are secured within the pressure vessel, each of the current collectors being pressed against one of the first and second sides of one of the windings to thereby electrically contact the winding side at a plurality of locations thereon.

In another aspect, the present invention includes a motor vehicle for transporting loads in excess of 100 pounds, the vehicle comprising a frame, a plurality of wheels rotatably mounted on the frame, an electric motor for driving at least one of the wheels, and an electric energy storage device electrically connected to the motor for energizing the motor. The electric energy storage device includes at least one casing and plurality of electrically connected windings disposed within each casing. Each winding includes a cathode plate including a strip having a pair of elongated side edges, an anode plate including a strip having a pair of elongated side edges, and a separator located between the cathode and anode plates. The cathode and anode plates are wound in an offset relationship so that one elongated side edge of the cathode plate extends beyond one elongated side edge of the anode plate at a first side of the winding, and the other elongated side edge of the anode plate extends beyond the other elongated side edge of the cathode plate at a second side of the winding opposite the first side. An electrolyte material is located within the winding. A plurality of current collectors are disposed within each casing. At least one of the current collectors is pressed against one of the first and second sides of each winding to electrically contact the winding side at a plurality of locations thereon.

In another aspect, the present invention includes an apparatus for making an electrical energy storage device including a coiled winding having an anode plate, a cathode plate, and a separator, the apparatus comprising a frame and an arbor rotatably mounted on the frame. Means for rotating the arbor to wind the anode plate, the cathode plate and the separator about the arbor to thereby form the winding are provided. The diameter of the winding increases from an initial diameter to a completed diameter during the winding. A series of rollers is arranged about the arbor and is movable away from the arbor, with only a portion of the series of rollers contacting the winding when the winding is of the initial diameter, and additional rollers contacting the winding when the winding reaches a first intermediate diameter between the initial and completed diameters.

In yet another aspect, the present invention includes a method for making an electric energy storage device comprising the steps of forming a winding by winding on a rotating arbor multiple layers including a cathode plate, an anode plate, and a separator between the cathode and anode plates. The diameter of the winding increases from an initial diameter to a completed diameter. The method also includes supporting the winding during the step of winding using a series of rollers arranged about the rotating arbor and being movable away from the arbor during the winding step. Only a portion of the series of rollers contacts the winding when the winding is of the initial diameter, and additional rollers contact the winding when the winding reaches a diameter between the initial and completed diameters.

It is to be understood that both the foregoing general description and the following detailed description are exemplary and explanatory only, and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate the presently preferred embodiments of the invention and, together with the description, serve to explain the principles of the invention.

FIG. 1a is a sectional view of an electric energy storage device according to the present invention;

FIG. 2 is a an end view of an electric energy storage device of FIG. 1a;

FIGS. 14a–14e are schematic perspective views of a motor vehicle powered by an electric energy storage device of the present invention with the device located in various locations within the vehicle in accordance with the present invention;

DESCRIPTION OF THE PREFERRED EMBODIMENTS

Reference will now be made in detail to the present preferred embodiments of the invention, examples of which are illustrated in the accompanying drawings.

Figure 1B:
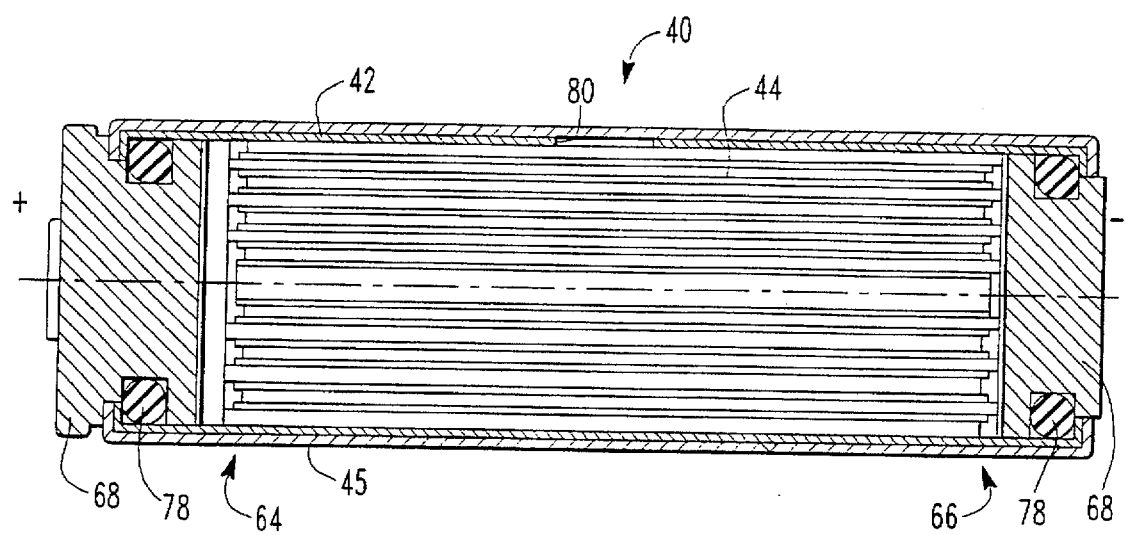
FIG. 1b iis a sectional view of another embodiment of the electric energy storage device according to the present invention.
Figure 2:
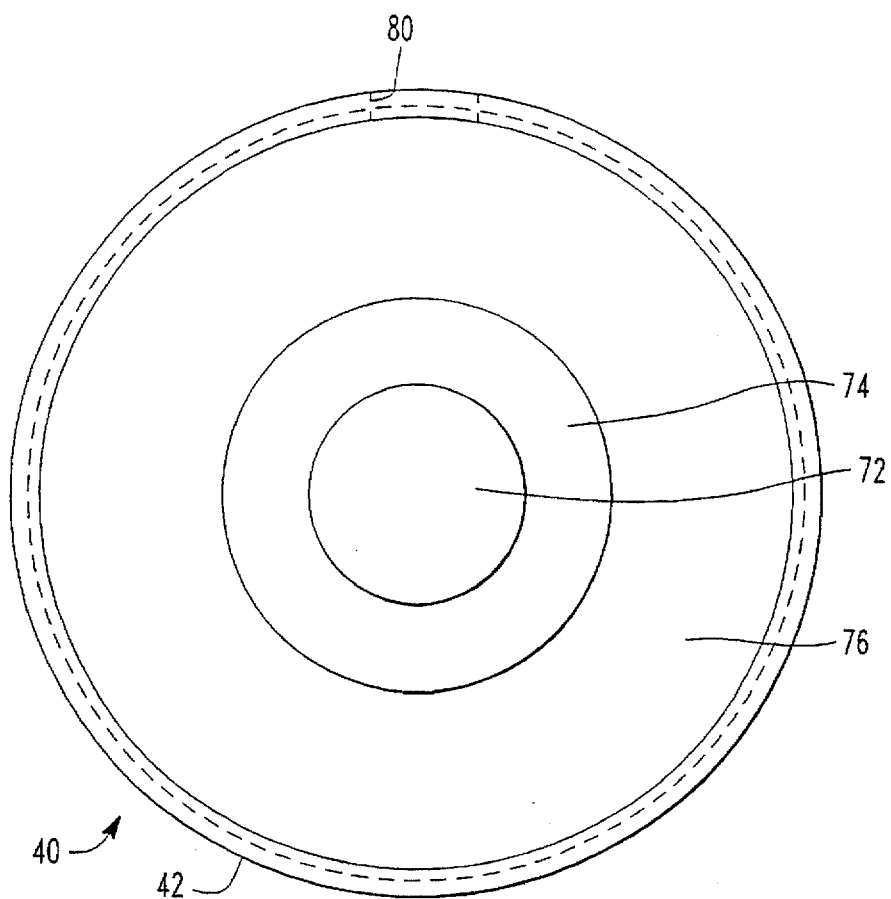

In accordance with the present invention, an electrical energy storage device includes a casing. The exemplary embodiment of the electrical energy storage device of the present invention is shown in FIG. 1a and is designated generally by reference numeral 40. As embodied herein and referring to FIGS. 1a, 1b, 2 and 3, storage device 40 includes a tubular casing 42. The casing 42 is preferably made of a nonconductive material, such as plastic. The casing must also be chemically compatible with the electrochemistry of the storage device, and thus be resistant and impermeable to the electrolyte used. Any such suitable material may be employed as the casing.

In accordance with the invention, the device further includes coiled winding having a cathode plate including a strip having a pair of elongated side edges, an anode plate including a strip having a pair of elongated side edges, and a separator located between the cathode and anode plates. As embodied herein, the storage device 40 includes a coiled winding 44 made of three elongated rectangular strips wound together: a cathode plate 46, an anode plate 48 and a separator 50. The separator 50 is wound between the cathode plate 46 and the anode plate 48 along their entire lengths to prevent the plates from contacting each other. The cathode plate 46 and the anode plate 48 each have two elongated side edges 52 and 54, and 56 and 58, respectively, which extend along the entire lengths of the longest sides of the plates.

It should be noted that the thickness of the plates 46,48 and the separator 50 shown in FIGS. 1a, 1b, 8–10 and 18–25 are highly magnified and illustrative only, and are not drawn to scale relative to the other elements of the device 40.

Figure 3:
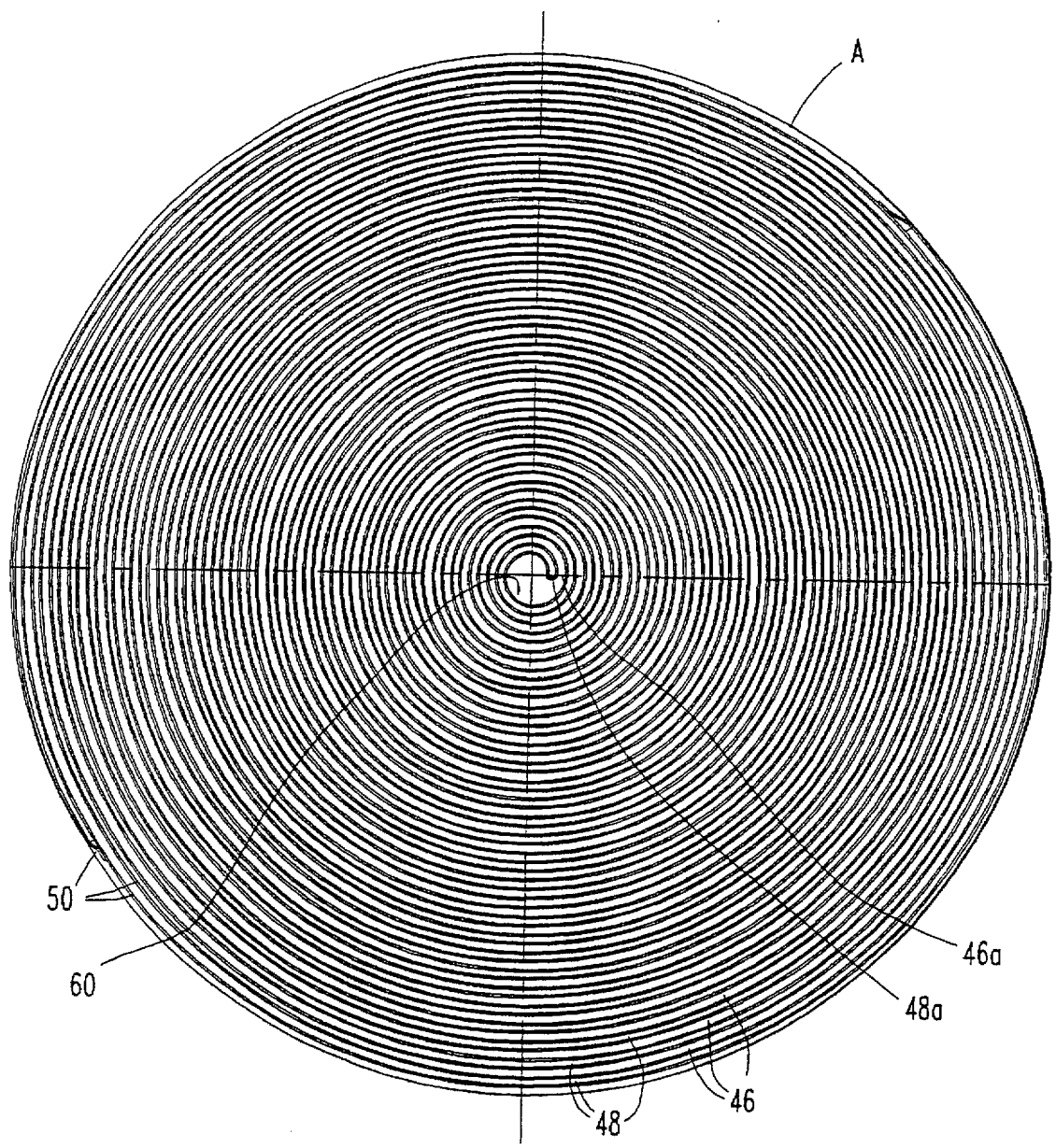
FIG. 3 is a sectional view of the winding of the electric energy storage device of the winding of FIG. 1a taken along line 3—3.

Preferably, the cathode plate, anode plate and separator are each formed of a continuous piece of material. As shown in FIG. 3, cathode plate 46, anode plate 48 and separator 50 each advantageously comprise a single piece of material wound from the center of the winding 44 to the exterior circumference of the winding without breaks or joints. Use of a continuous piece of material provides the benefit of a uniform winding without seams in the strips and with uniform electrical capacity throughout. It is possible, however, to employ a separator 50 made of several pieces, if desired. The separator 50 and the plates 46,48 have the same width along their entire length, but they are offset as will be described below. The separator 50 is preferably twice as long as either of the plates 46,48 so that when the three strips are wound the separator prevents the plates from contacting each other along their entire lengths. As will be described below in detail, the winding 44 can be formed by winding the plates 46,48 and the separator 50 about an arbor having a predetermined diameter.

The cathode plate 46 and the anode plate 48 are each preferably made of a substrate on which dissimilar materials comprising a galvanic couple are deposited. A galvanic couple produces current when brought in contact with an electrolyte. For example, the plates 46,48 can be made of any of the following substances which can be readily deposited on a suitable substrate and wound into a coil around the arbor: nickel hydroxide and cadmium hydroxide, nickel hydroxide and a metal hydride, lithium and carbon black, or lead oxide and lead dioxide. However, any suitable galvanic materials and substrate may be used in the plates 46,48 in the winding 44 within the scope of the present invention.

The thickness of the plates 46,48 should be as thin as possible in order to optimize the discharge rate and capacity of the winding 44. Therefore, according to the present invention and using the method of manufacture and apparatus described below, plates as thin as 0.005 to 0.011 inches may be wound in the winding 44 in order to obtain a high amp-hour output for a given winding diameter. Plates as thick as 0.025 to 0.035 inches and thicker can also be wound if lower rates of discharge and longer life cycle are desired.

The separator 50 is preferably made of a nonconducting material, such as paper, glass fiber, or nonconductive plastic, thick enough to prevent contact and bridging between the plates 46,48, but thin enough to allow for as many turns as possible of active material within a given diameter of the winding 44. Separators 50 as thin as 0.001 to 0.010 inches may be used in the winding 44 made by the method and apparatus described below. Any suitable thin, nonconductive material may be employed as a separator within the scope of the present invention.

Preferably, the separator is compressed substantially uniformly throughout the winding, with the separator compression varying by no more than about 10% from a first portion of the winding at a center portion thereof to a second portion of the winding at an outer region thereof. As broadly shown in FIG. 3, the radial thickness of each turn of the separator 50 is substantially uniform across winding 44. Preferably, the separator compression varies by no more than about 10%. Such uniform compression provides uniform resistance in the electrochemical circuit formed inside the winding 44. If the winding 44 is not uniform, portions of the winding will not contribute current when the device is used, thereby reducing the available amp-hours. The method and apparatus described below provide a winding having such uniform compression.

Preferably, the winding defines a hole therethrough along a longitudinal axis, a ratio of the diameter of the winding to the diameter of the hole being greater than about 6 to 1. As embodied in FIGS. 1a and 3, a hole 60 passes through the winding 44 along its longitudinal axis 62. The hole 60 is substantially the same diameter as the arbor about which the winding was wound during manufacture, as described below. The ratio of the diameter of the winding 44 to the diameter of the hole 60 may be greater than about 6 to 1 if high capacity is desired. Using the method and apparatus described below, windings 44 can be constructed having diameters in the neighborhood of 8 inches or more.

Such large windings 44 have greater electric capacity than smaller windings made of the same materials due to the increased mass of active material making up the plates 46,48. For a winding 44 of a given hole 60 size, a winding with a higher ratio must have a larger diameter, more massive plates 46,48, and a correspondingly higher electrical capacity. Similarly, for a winding 44 of a given diameter, a winding with a higher ratio must have a smaller hole 60, more massive plates 46,48, and a correspondingly higher electrical capacity. A secondary effect of a high winding 44 diameter to hole 60 diameter ratio is a high discharge rate, a function of the opposed surface area of the plates 46,48. A device 40 according to the present invention may thus have an electrical capacity of at least 30 amp-hours or higher, with typical electrochemistries, which is much greater than has heretofore been obtained from a wound cell.

In accordance with the invention, the cathode plate and the anode plate are wound in an offset relationship so that one elongated side edge of the cathode plate extends beyond one elongated side edge of the anode plate at a first side of the winding, and the other elongated side edge of the anode plate extends beyond the other elongated side edge of the cathode plate at a second side of the winding opposite the first side. As shown in FIG. 1a, the cathode plate 46 and the anode plate 48 are wound in an offset relationship so that the edge 52 of the cathode plate extends beyond the edge 56 of the anode plate at the circular first side 64 of the winding 44. Similarly, at the circular second side 66 of the winding 44, the other edge 58 of the anode plate 48 extends beyond the other edge 54 of the cathode plate 46. Therefore, the edge 52 of the cathode plate 46 forms a spiral surface at the first side 64 of the winding 44, and the edge 58 of the anode plate 48 forms a spiral surface at the second side 66 of the winding.

Figure 4:
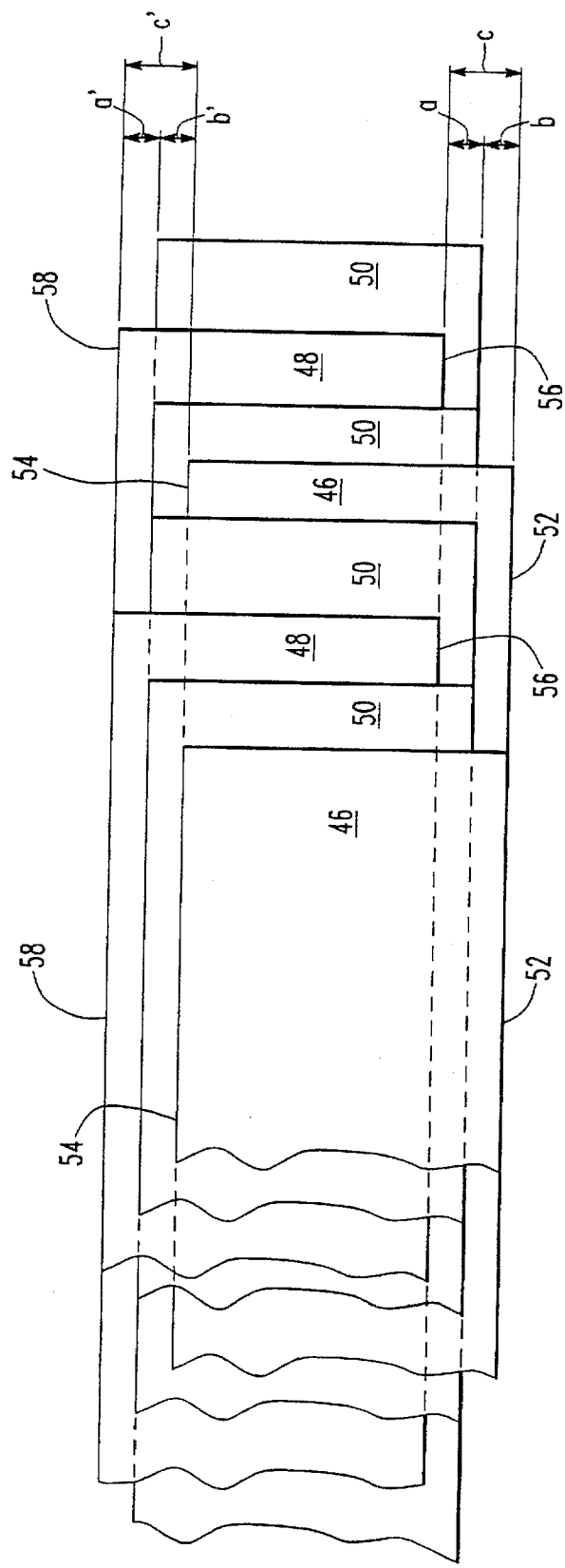
FIG. 4 is a diagrammatical representation of the electric energy storage device of FIG. 1a showing several turns of a winding in an unwound condition to illustrate the offset between the electrode plates.

The offset relationship between the plates 46,48 can best be demonstrated by reference to FIG. 4. FIG. 4 is a diagrammatical representation of what several turns of the winding 44 would look like if they were cut apart and unrolled. As shown, the cathode plate 46, the anode plate 48 and the separator 50 all have substantially the same width. Since the plates 46,48 have substantially the same width, the plate offset on each side of the winding (c and c' in FIG. 4) is substantially equal throughout the winding. The plates 46,48 and separator 50 are also uniformly offset from one another throughout the entire winding 44.

The offset between the plates 46,48 should be as small as is required to collect current from the winding 44, as will be described below. The plate 46,48 offset is minimized because the offset plate side edges 52,58 do not produce current because they do not oppose another plate. Thus, the offset edges 52,58 reduce the volumetric efficiency of the winding 44. As will be described below, the desired offset amount is dependent on several factors. However, applicants have found that an offset in the order of magnitude of about 0.100 inches is satisfactory, an amount large enough for electrical contact to be made with the side edges 52,58, as will be described below, but small enough to not significantly diminish the efficiency of the plates 46,48.

The separator 50 is spaced as evenly as possible between the two offset plates 46,48 to prevent any side edges of the plates from contacting each other. As shown in FIG. 4, the separator and plate spacing is as follows: a=a'=b=b'=½c= ½c', assuming the separator 50 and plates 46,48 have the same width. Assuming a plate offset (c, c') of about 0.100 inches, the separator 50 should be offset from the plates (a, a', b, b') by about 0.050 inches. It should be understood that, depending on the composition of the materials chosen and the thickness of the plates 46,48, the offset between the plates (c, c') may vary, with the separator offset (a, a', b, b') varying correspondingly, as will be described below.

Figure 5B:
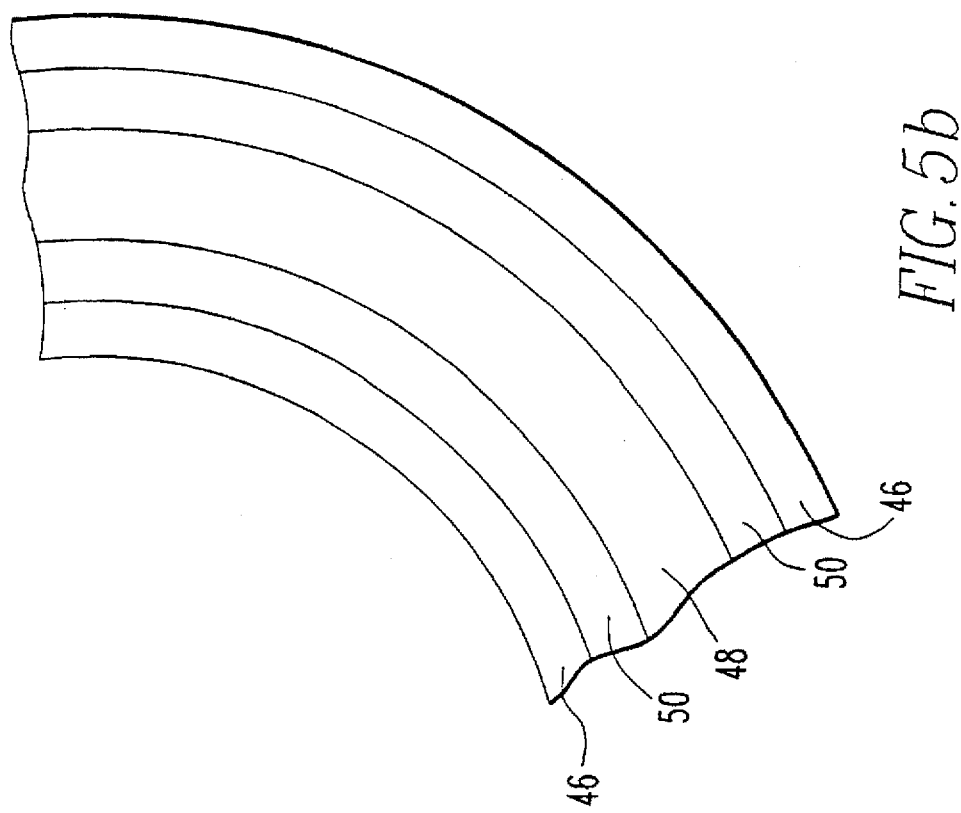
FIG. 5b is an enlarged view of a portion of a winding as in FIG. 3, wherein the anode plate is thicker than the cathode plate.
Figure 5A:
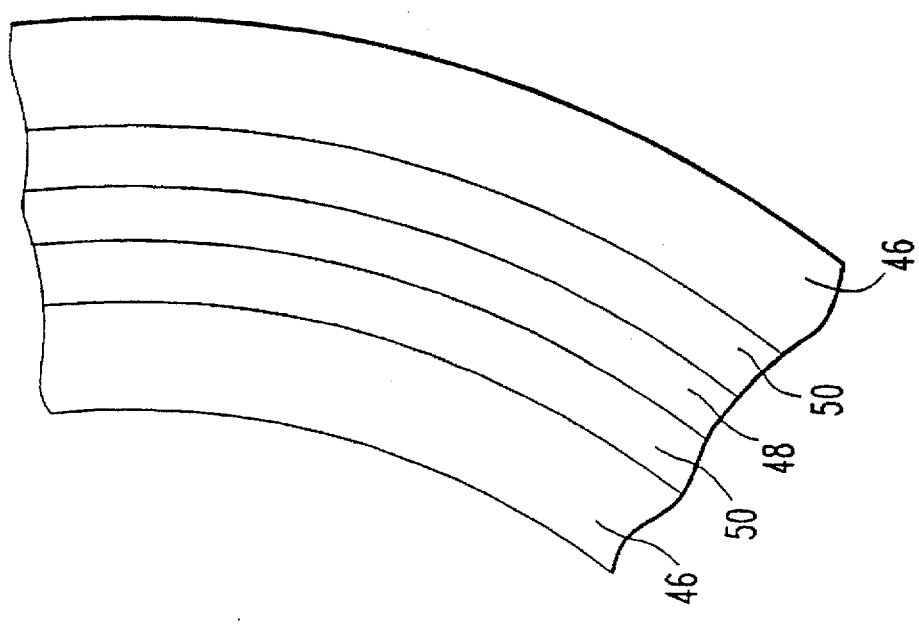
FIG. 5a is an enlarged view of a portion of a winding as in FIG. 3, wherein the cathode plate is thicker than the anode plate.

It may be preferable that one of the cathode and anode plates have a thickness which is at least twice the thickness of the other of the cathode and anode plates. Therefore, as shown in FIGS. 5a and 5b, one of the cathode and anode plates 46,48 may have a thickness which is at least twice that of the other plates. Such an arrangement is desirable where galvanic couples are used in which the material for one plate has more electrical capacity than the material for the other plate. For example, in metal hydride windings, the anode plate 48 may have nearly three times the electrical capacity per unit of volume than that of the cathode plate 46. It is thus desirable to wind a winding 44 with a cathode plate 46 of about three times the thickness (for example, about 0.030 inches) than that of the anode plate 48 (for example, about 0.011 inches). Thus, as shown in FIG. 5a, the cathode plate 46 may be thicker than the anode plate 48. Alternately, depending on the chosen electrochemistry, as shown in FIG. 5b, the anode plate 48 may be the thicker. Generally, though, anode material has a higher electrical capacity than cathode material, requiring a thicker cathode to optimize the capacity of the winding. Such windings 44 having differing plate thicknesses may be constructed using the method and apparatus described below. In any event, however, care should be taken to avoid using a thickened plate which is so thick that it undesirably reduces the number of turns which fit in the winding 44 and thereby undesirably decreases the surface area of the plates and the corresponding discharge rate of the device 40.

In accordance with the invention, an electrolyte material is located within the winding. A liquid electrolyte material is located between the plates 46,48 in the winding and saturates the separator 50. If the plates 46,48 are porous, the electrolyte material may also enter the pores to improve the output of the winding 44. The electrolyte material must be sealed within the casing 42 or sealed within a casing holding a plurality of windings, as will be described below, to prevent leakage.

The electrolyte material allows the desired electrochemical reaction to occur within the winding 44. If the plates 46,48 are made of nickel hydroxide and cadmium, the electrolyte material may comprise an aqueous alkaline solution such as potassium hydroxide. However, any suitable electrolyte which performs favorably in combination with the materials chosen as the plates 46,48 may be used within the scope of the present invention.

In accordance with the invention, two current collectors are secured to the casing, one current collector being pressed against the first side of the winding to contact the cathode plate at a plurality of locations thereon, and the other current collector being pressed against the second side of the winding contact the anode plate at a plurality of locations thereon. As embodied in FIG. 1a, two current collectors 68 comprising discs are pressed against the sides 64,66 of the winding 44 to contact the respective plate edges 52,58. One current collector 68 is pressed against the first side 64 of the winding 44 to contact the cathode plate 46 and the second current collector 68 is pressed against the second end 66 of the winding 44 to contact the anode plate 48. The offset relationship between the plates 46,48 allows each current collector 68 to make direct electrical contact with a single plate without the need for tabs connecting the plates and collectors.

Preferably, each of the current collectors comprises a solid member impervious to electrolyte flow therethrough. As shown in FIGS. 1a, 1b, and 6a–6c, the current collectors 68 are solid members through which no electrolyte may pass. The current collectors 68 include disc-shaped portions extending over the sides of the winding 44. Thus, the current collectors 68 seal the electrolyte in the winding 44. It should be understood that the current collectors 68 may be made of multiple parts attached together, for example, by welding, as long as the electrolyte is kept within the winding 44 by the current collectors.

Preferably each current collector includes an electrical conductor having a series of protrusions for electrically contacting multiple locations on an adjacent end of the winding. As shown in FIGS. 1a, 1b, and 6a–6c, the current collector 68 may comprise a metallic electrical conductor having a series of protrusions 70. The protrusions 70 electrically contact multiple locations on an adjacent end of the winding 44.

Figure 6C:
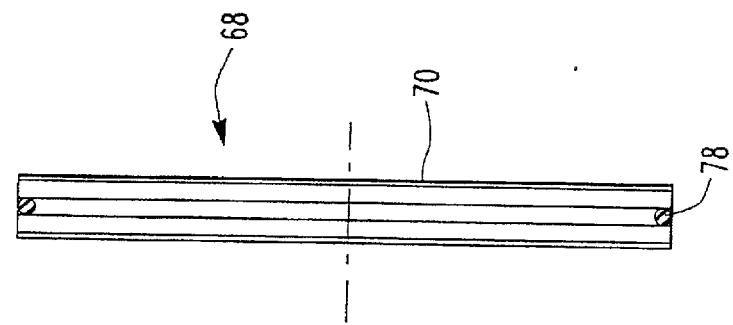
FIG. 6c is a side view of a current collector of the present invention.
Figure 6A:
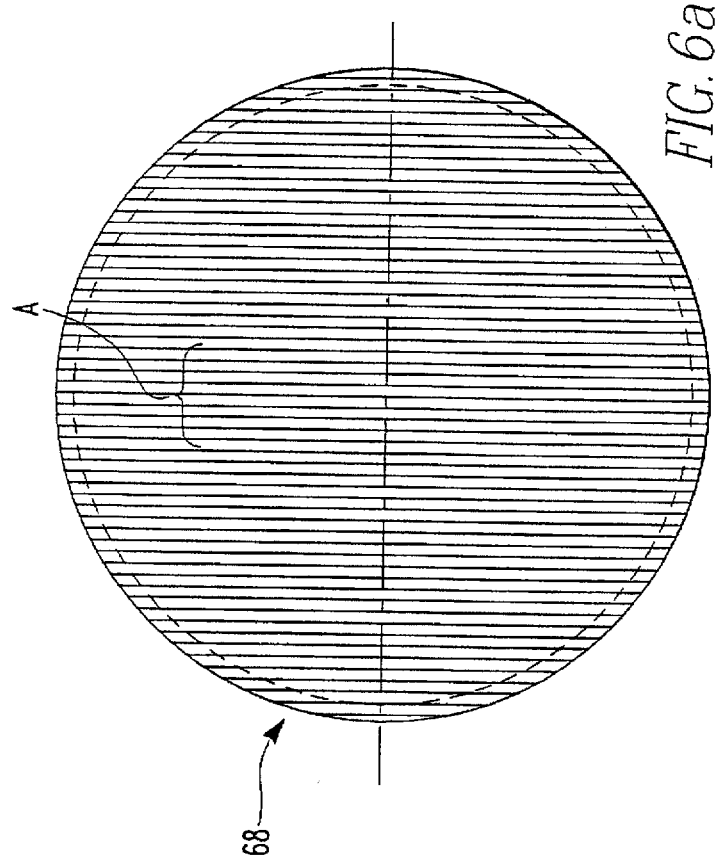
FIG. 6a is a front view of a current collector of the present invention.
Figure 6B:
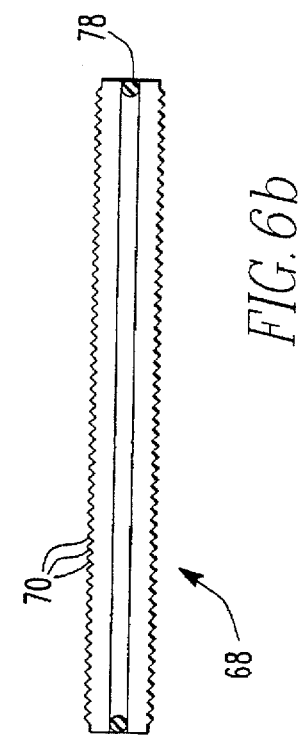
FIG. 6b is a bottom view of a current collector of the present invention.

Preferably, the protrusions are ridges separated by grooves. As shown in FIGS. 6a and 6b, protrusions 70 may comprise a plurality of parallel ridges on the current collector 68. However, the protrusions 70 need not comprise ridges. For example, a plurality of depressions, such as counterbores, could be drilled into the surface of the current collectors 68 thereby creating protrusions extending between the depressions. Alternately, the depressions could be punched or forged rather than drilled. Any suitable pattern of protrusions may be used as long as the protrusions sufficiently contact and partially extend into the corresponding offset portion of the winding 44 when pressed against it, as will be described below. Applicants have found that pointed protrusions perform better than rounded protrusions. Further, applicants have found that a plurality of parallel ridges and grooves, as shown in the figures, are simple to fabricate into the current collectors 68 and perform satisfactorily. However, any suitable functioning protrusions may be used within the scope of the invention.

Figure 7:
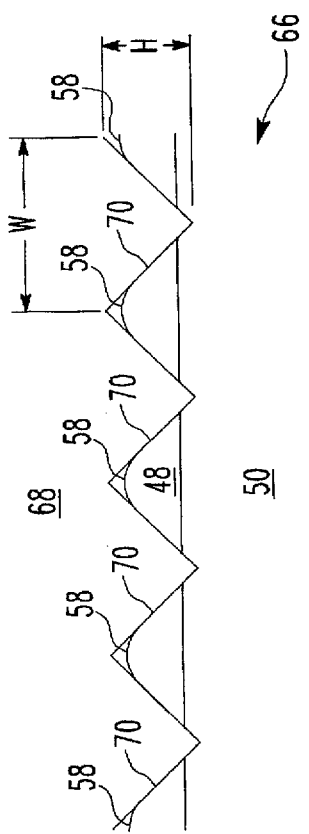
FIG. 7 is a diagrammatical representation of the interface between a current collector and a winding according to the present invention.

Preferably, the protrusions or ridges extend into and deform the winding side at a plurality of locations to thereby electrically contact the winding side. FIG. 7 shows an interface between a portion A (as shown in FIG. 6a) of collector plate 68 and a winding side 66. At winding side 66, side edge 58 of the anode plate 48 extends beyond side edge 54 of the cathode plate 46, with the separator 50 in between. The ridges 70 extend into the side edge 58 to about the position of the edge of the separator 50. It is desirable that each ridge 70 be able to penetrate the side 58 to a distance about equal to its peak to valley height H, and to crush the side further by about the same amount. Thus, the peak of each ridge 70 is substantially in contact with the separator 50. Such an arrangement is beneficial in that contact between adjacent plates 46 and 48 is prevented while contact between plate 48 and the ridges 70 is maximized.

With these relative distances in mind, the preferable peak to valley height of each ridge may be determined. The ridge height H is a function of the thickness of the plates 46,48. As described above, the plate thickness is chosen based on the desired capacity, discharge rate, and dimensions of the battery. For thicker plates 46,48, the ridges 70 should have a greater height H so that they penetrate and crush the plates, as described above, to about the separator 50.

Thus, the height H of the ridges 70 should be about as large as the thickness of the plates 46,48. The width W of the ridges 70 should be about twice their height H to allow the ridges to penetrate the plates 46,48 sufficiently to make electrical contact.

For example, for plates 46,48 having a thickness of 0.030 inches, the ridge height H may preferably be 0.030 inches and the ridge width W may preferably be 0.060 inches. The ridge 70 penetrates the plates for a distance of about 0.030 inches and crushes it for about the same distance. Thus disposed, the ridges 70 should be contacting or nearly contacting the separator 50. Therefore, a desired offset (c or c' in FIG. 4) between the 46,48 plates is about 0.100 inches, and a desired offset of the separator 50 from the plates (a, a', b or b' in FIG. 4) is about 0.050 inches.

Use of pointed ridges 70 extending into the plates 46,48 allows the ridges to make contact with a much greater number of locations on the plates than does the use of a single tab, as in prior art devices. For example, for a 3½ inch diameter winding, applicants have determined that over 1500 points of contact are made between the ridges 70 on a current collector 68 and the winding. Thus, each plate contacts a ridge 70 about every ⅛ inch along the plate. Such multiple contacts allow much better utilization of the capacity of the plates 46,48, extremely low internal resistance, better discharge capability, and less voltage drop during discharge, as compared with prior art devices.

Use of pointed ridges 70 also allows the current collectors to be pressed into contact with the winding 44 without the need for welding. Thus, manufacture of the storage device is simplified as compared to prior art devices in which tabs are welded to the windings. However, if desired, the pressed contact can be augmented with the application of ultrasonic or electrical energy during manufacture to maintain the electrical contact between the ridges 70 and winding 44 during use. Such additional application of energy may be especially useful if certain corrosive electrochemistries are employed.

It should be understood that the specific dimensions given above for the height H and width W of the ridges 70, the thickness of the plates 46,48, and the amount of the offsets (a, a', b, b', c, c') are exemplary only. These dimensions may be changed so long as pressing the ridges 70 into the plates 46,48 allows the ridges to properly penetrate to about the edge of the separator 50 when assembled as shown in FIG. 7.

As shown in FIG. 1a, the winding 44 and the current collectors 68 may be held within a casing 42 which may be made of polyethylene or any other nonconductive material. Exterior electrical connection may be made directly with the current collectors 68. As also shown in FIG. 1a, conductor rods 72 may be provided extending from the current collectors 68 for transmitting energy. Nonconductive grommets 74 may be disposed around the conductor rods 72 and may be held by nonconductive discs 76 secured to the casing 42. The discs 76 form a seal with the casing 42 so as to keep electrolyte from leaking out of the winding 44. Similarly, the grommets 74 form a seal with the conductor rods 72 to prevent leakage. Alternately, as shown in FIG. 1b, the discs 76 and grommets 74 may be eliminated and a seal member such as an o-ring 78 may extend around the current collectors 68 to prevent leakage of electrolyte between the current collectors 68 and casing 42.

Preferably a vent opening 80 is provided in the casings 42 of FIGS. 1a and 1b to allow escape of excess gases produced during recharging and to allow the electrolyte to be inserted into the winding 44 during manufacturing. As shown in FIG. 1b, the casing 42 may be held within a pressure vessel 45 which contains these gases. Alternatively, the casings 42 of FIGS. 1a and 1b may themselves comprise pressure vessels and separate pressure vessels may be omitted within the scope of the invention. In communication with the vent opening 80 or the pressure vessel 45 may be any one way valve or other similar mechanism which allows gas above a given pressure to escape. For example, in FIG. 1b, a small slot (not shown) could be provided in the inside of the casing 42 or the outside of a current collector 68 adjacent an o The slot should be small enough to allow only excess pressure to bleed past the o-ring 78, but should not allow electrolyte to pass.

The storage device 40 of FIG. 1b shown in section is similar to that of FIG. 1a. The device 40 includes a winding 44 and electrolyte material within a casing 42. Current collectors 68 are pressed against the sides 64,66 of the winding 44. However, seal members such as o-rings 78 are provided about the current collectors 68 to keep the electrolyte within the winding 44. Thus, a simplified device is provided in which the element contacting each winding side (namely the current collector) maintains the electrolyte material within the winding and is also the external electrical contact for the device. No complicated structures such as the welded tabs, end plates, and combination of seal members are required as in the prior art to confine the electrolyte and gases, and to make electrical contact with the proper electrode in the winding.

As shown in FIG. 1b, a pressure vessel 45, such as a metal tube, may be disposed about the casing 42. The casing 42 and current collectors 68 may be secured within the pressure vessel 45 by crimping the ends of the pressure vessel over the current collectors. The pressure vessel 45 should be able to withstand the vapor pressures generated during the recharging of the device 40, but should have some release mechanism, as described above.

As an alternative to the devices of FIGS. 1a and 1b, only one current collector 68 may be provided for use with a cup-shaped conductive casing or pressure vessel. The end of the winding 44 at the "bottom" of the cup electrically contacts the cup, and the end of the winding at the open end of the cup contacts a current collector 68. The single current collector 68 is secured to the conductive casing with a seal member such as an o-ring disposed between the casing and collector to prevent shorting and to seal electrolyte within the casing.

Figure 8:
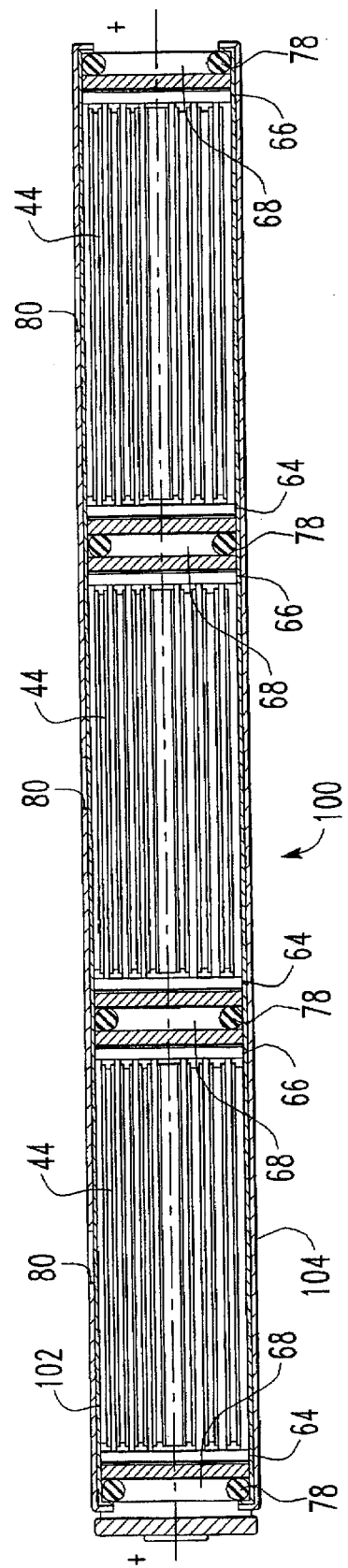
FIG. 8 is a sectional view of an electric energy storage device according to the present invention including a plurality of windings.
Figure 9:
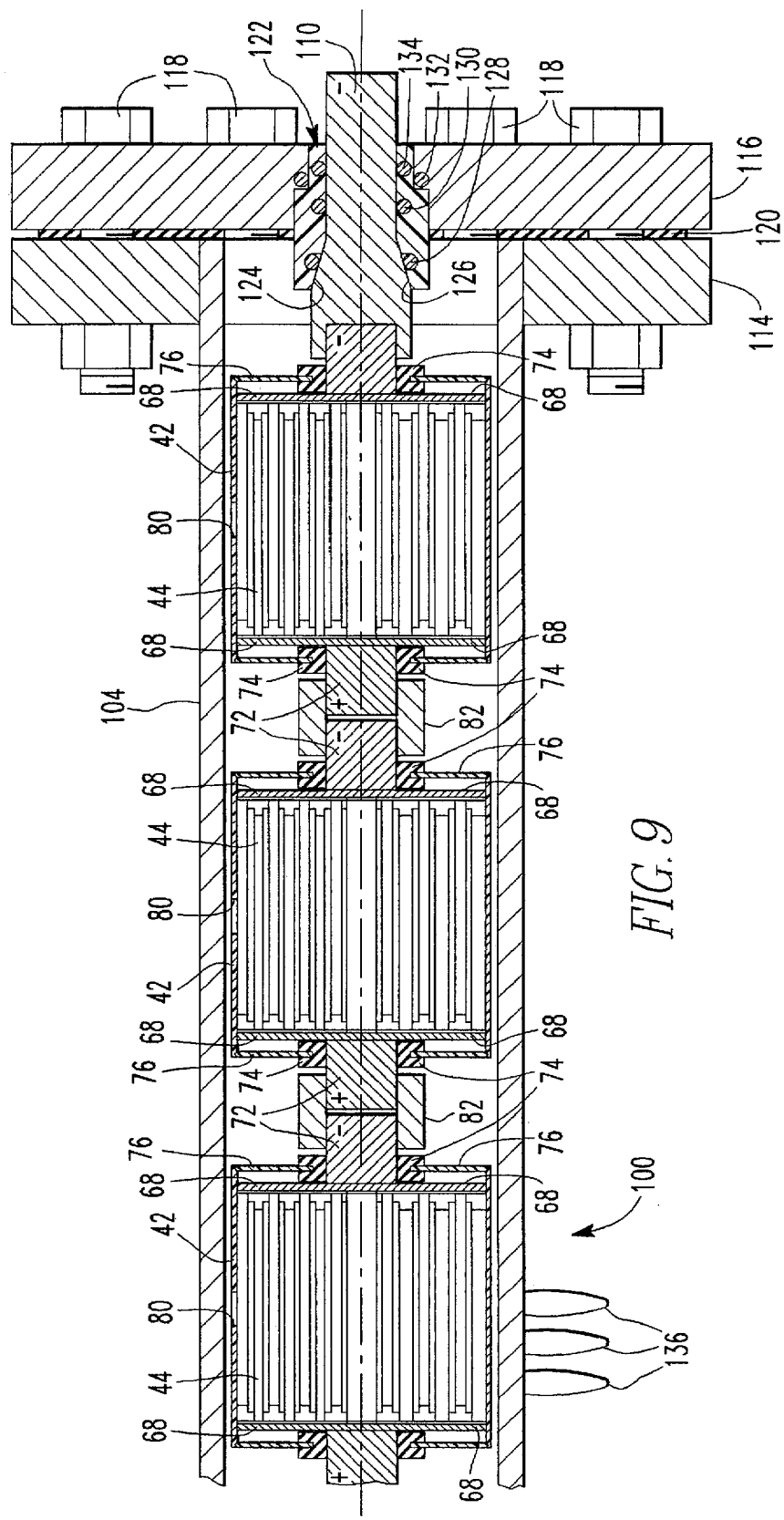
FIG. 9 is a sectional view of a portion of an electric energy storage device having a plurality of windings held within a plurality of casings within a pressure vessel.
Figure 10:
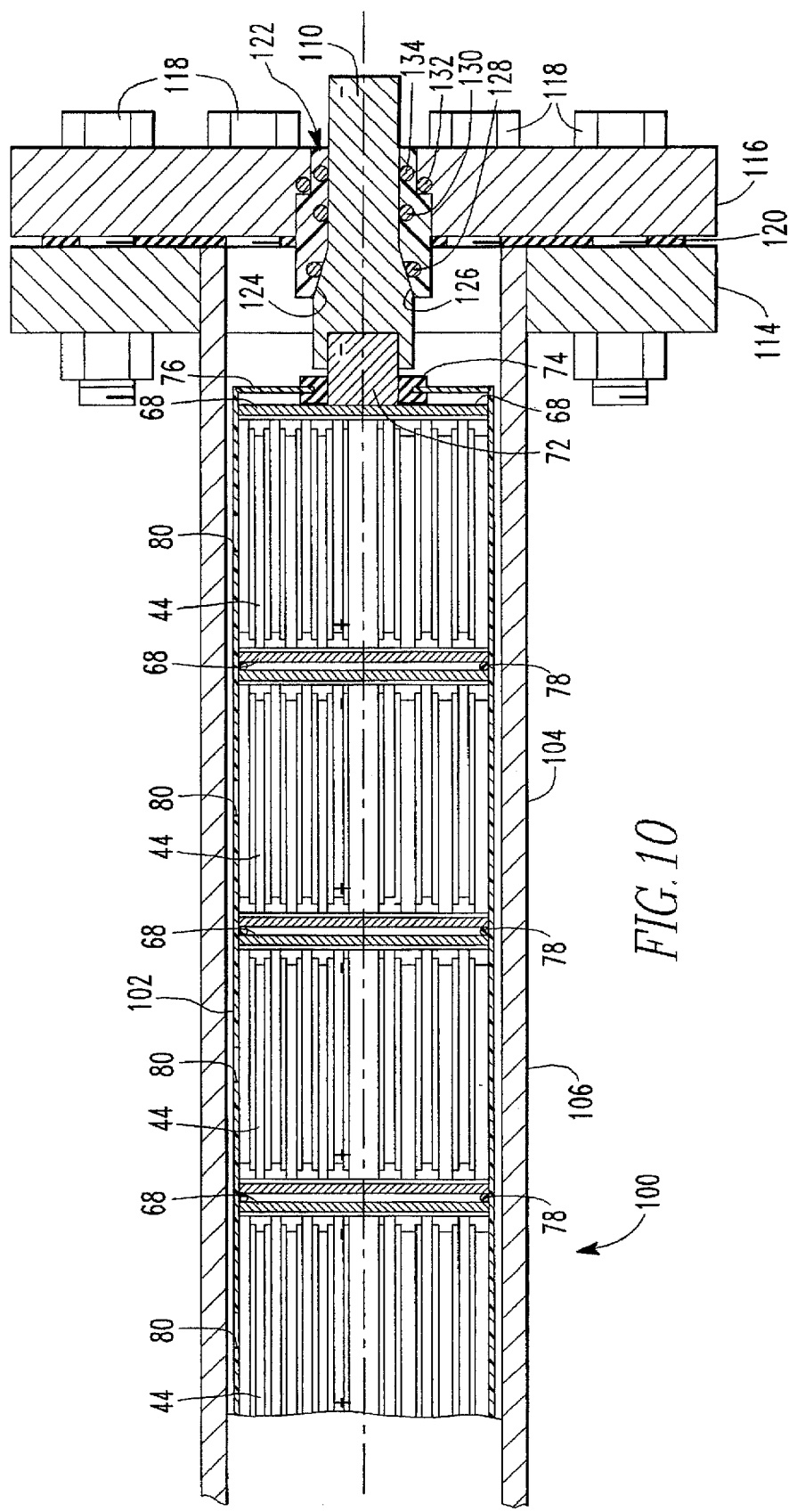
FIG. 10 is a sectional view of a portion of an electric energy storage device having a plurality of windings held within a casing within a pressure vessel.

Another aspect of the invention will now be described, with like or similar parts being identified throughout the drawings by the same reference characters. In accordance with another aspect, the present invention includes an electrical energy storage device including at least one casing. As shown in FIGS. 8-10, another aspect of the energy storage device of the present invention is designated generally by reference numeral 100. As embodied herein, storage device 100 includes at least one casing 42 or 102, as described above.

FIG. 8 shows a sectional view of a pressure vessel 104 holding a casing 102. FIGS. 9 and 10 each depict a right hand portion of a pressure vessel 104 according to the present invention, the left hand portions being substantially symmetrical.

In accordance with the invention, the device further includes a plurality of electrically connected windings, at least one winding being disposed within each casing. As shown in FIG. 9, the device 100 may include a plurality of separate casings 42, each holding one winding 44, as described above. Alternately, as shown in FIGS. 8 and 10, the device 100 may include a single casing 102 holding a plurality of windings 44.

As shown in FIG. 8, a group of windings 44 may be held within a single casing 102 disposed within a pressure vessel 104 forming a unitary battery pack. Such a battery pack can be used in any of a number of applications, such as consumer electronic goods, computers and telephones. In such a battery pack, the casing 102 may comprise a thin plastic, nonconductive tube into which the windings are placed. The casing 102 is then slipped inside the pressure vessel 104, and the pressure vessel ends are crimped over the current collectors 68 at either end. Thus, the current collectors 68 and windings 44 are securely held within the pressure vessel 104. In this arrangement, the casing 102 may be replaced by a nonconductive coating sprayed onto the inside surface of the pressure vessel 104 before the windings 44 are inserted.

Alternately, the plurality of windings 44 may be placed within a single casing 102 held within a pressure vessel 104, as shown in FIG. 10. The casing 102 and pressure vessel 104 of FIG. 10 are larger than those of FIG. 8 and can thus hold more and larger windings 44. However, the principles by which the devices of FIGS. 8 and 10 operate are essentially the same. In both devices, a single casing 102 holds a plurality of windings 44 within a pressure vessel 104.

In accordance with the invention, an electrolyte material is located within each winding. As described above, electrolyte material is located within each winding 44 so as to facilitate the electrochemical reaction in the winding.

In accordance with the invention, a plurality of current collectors are provided, at least one of the current collectors being pressed against one of the first and second sides of each winding to thereby electrically contact the winding side at a plurality of locations thereon. As shown in FIGS. 8–10, current collectors 68, as described above, are provided. Each winding 44 is contacted by at least one current collector 68 pressed against the winding to transmit energy through the device 100.

Each current collector which is disposed between two of the windings may contact both of the windings, the current collector being pressed against the first side of one winding to contact the cathode plate, and the current collector being pressed against the second side of the second winding to contact the anode plate. As broadly shown in FIGS. 8 and 10, where a group of windings 44 are connected in series, each current collector 68 disposed between two adjacent windings 44 may contact both adjacent windings. The current collector 68 is thus pressed against the first side 64 of one of the windings 44 to contact its cathode plate 46. The current collector 68 is also pressed against the second side 66 of an adjacent winding 44 to contact its anode plate 48. Preferably, the current collector has protrusions as previously described on opposite surfaces thereof for contacting the two windings. As described above, ridges 70 may be provided on the current collector 68 for contacting the sides of the windings 44. The ridges 70 extend into and deform the windings sides 64, 66 at a plurality of locations. In this way, current can flow directly from one winding 44 to another through the current collector 68. Such an arrangement beneficially saves space by allowing a single pressure vessel to house a plurality of windings.

Alternately, a plurality of conductor rods may be provided, each conductor rod extending from one of the current collectors for transmitting electrical energy. As shown in FIG. 9, and as described above, a plurality of conductor rods 72 may be provided. Each conductor rod 72 extends from and electrically contacts a current collector 68 for transmitting electrical energy.

If conductor rods are provided, a sleeve may preferably be disposed about and electrically connected to two adjacent conductor rods. As shown in FIG. 9, sleeve 82 may be disposed about adjacent conductor rods 72 to pass electric current therethrough. The sleeve 82 allows electricity to be conducted through the windings 44 without contact between the current collectors 68 or conductor rods 72 of adjacent windings. The sleeve 82 may comprise a conductive clamp which is tightened by a thread, or any other suitable connecting method. If desired, however, the sleeve 82 may be eliminated allowing the conductor rods 72 of adjacent windings 44 to make direct contact.

As shown in FIG. 10, even if some current collectors 68 are arranged so as to contact two windings 44, a current collector at the end of the series of windings 44 may have an integral conductor rod 72 to facilitate connecting the series of windings to an external electrical contact. The rightmost current collector 68 in FIG. 10 has such an integral conductor rod 72 for connection with a terminal 110, as will be described below.

Preferably, the casing includes a plurality of vent openings, each opening corresponding to one of the windings. As broadly embodied in FIGS. 8 and 10, vent openings 80 are provided in the nonconductive casing 102 at positions corresponding to windings 44. The vent openings 80 are desirable in that they allow for equalization of electrolyte vapor pressure throughout the inside of the pressure vessel 104, which is important during recharging of the device 100 as vapor is produced in the windings 44. Also, the electrolyte material may be initially placed in the windings 44 through the respective vent openings 80.

Preferably, a seal member is disposed about an outer periphery of the current collector for precluding flow of the electrolyte material between the current collector and the casing. As described above, the current collectors 68 should be solid members through which no electrolyte material can pass. As broadly shown in FIGS. 8 and 10, a seal member such as a rubber o-ring 78 may be disposed about the outer periphery of each current collector 68. The o-ring 78 prevents the flow of the liquid electrolyte material from winding to winding within the casing 102 during normal operation or recharging, which could undesirably short out the device 100.

However, in the device shown in FIG. 8 wherein a coating replaces the casing 102, during the extremely high pressures experienced during recharging, a small amount of electrolyte or vapor may pass from one winding 44 to another by transmission between the o-ring 78 and the side of the pressure vessel 104. This type of vapor bleeding would be minimal in that, during recharge, all of the windings 44 are subject to high pressure, thereby causing any material passing from winding to winding to move from one location having a high pressure to another location with only a slightly lower pressure. Such a device can be contrasted with prior art devices in which each winding is disposed within an individual pressure vessel. During recharging, leakage would be more likely to occur and be extensive enough to cause a failure of the device in that the pressure differential between the pressurized interior of the pressure vessel and the ambient environment is much greater than the pressure differential between adjacent windings within a single pressure vessel, as described above.

Figure 11:
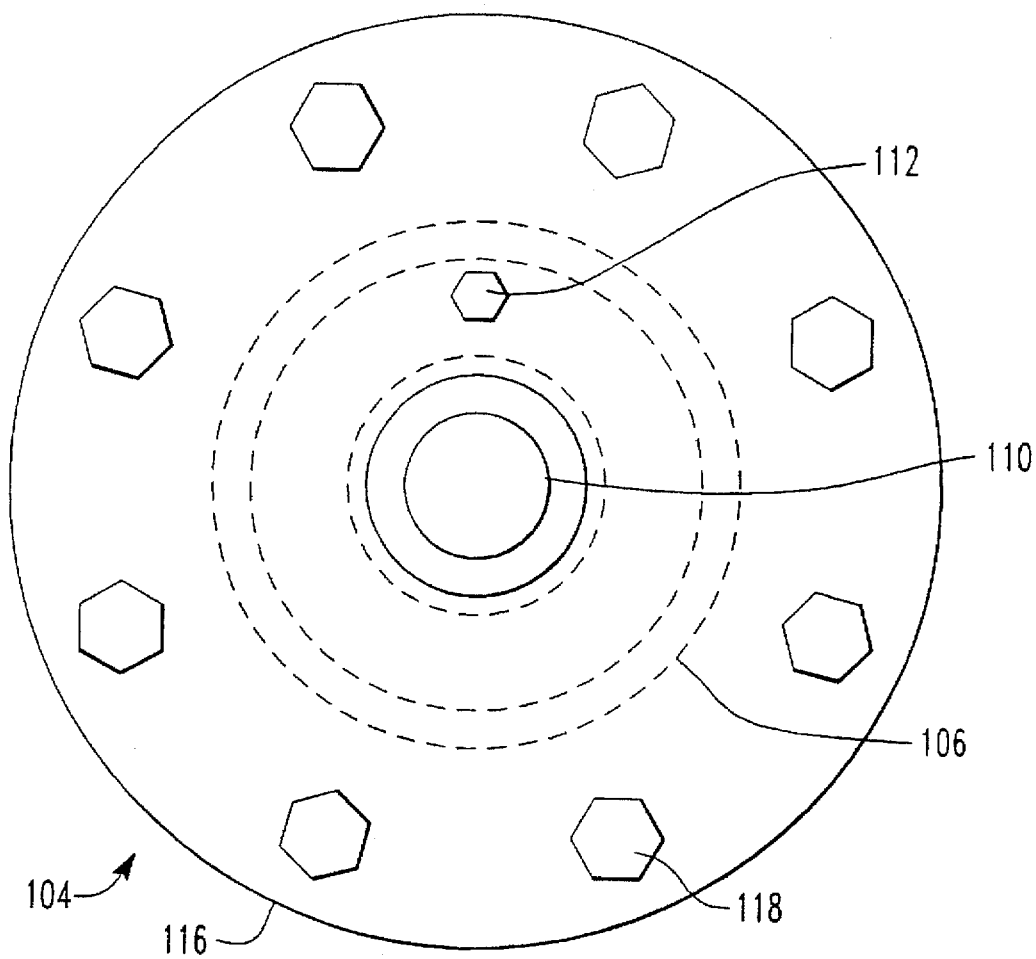
FIG. 11 is an end view of the device of FIG. 9.
Figure 12:
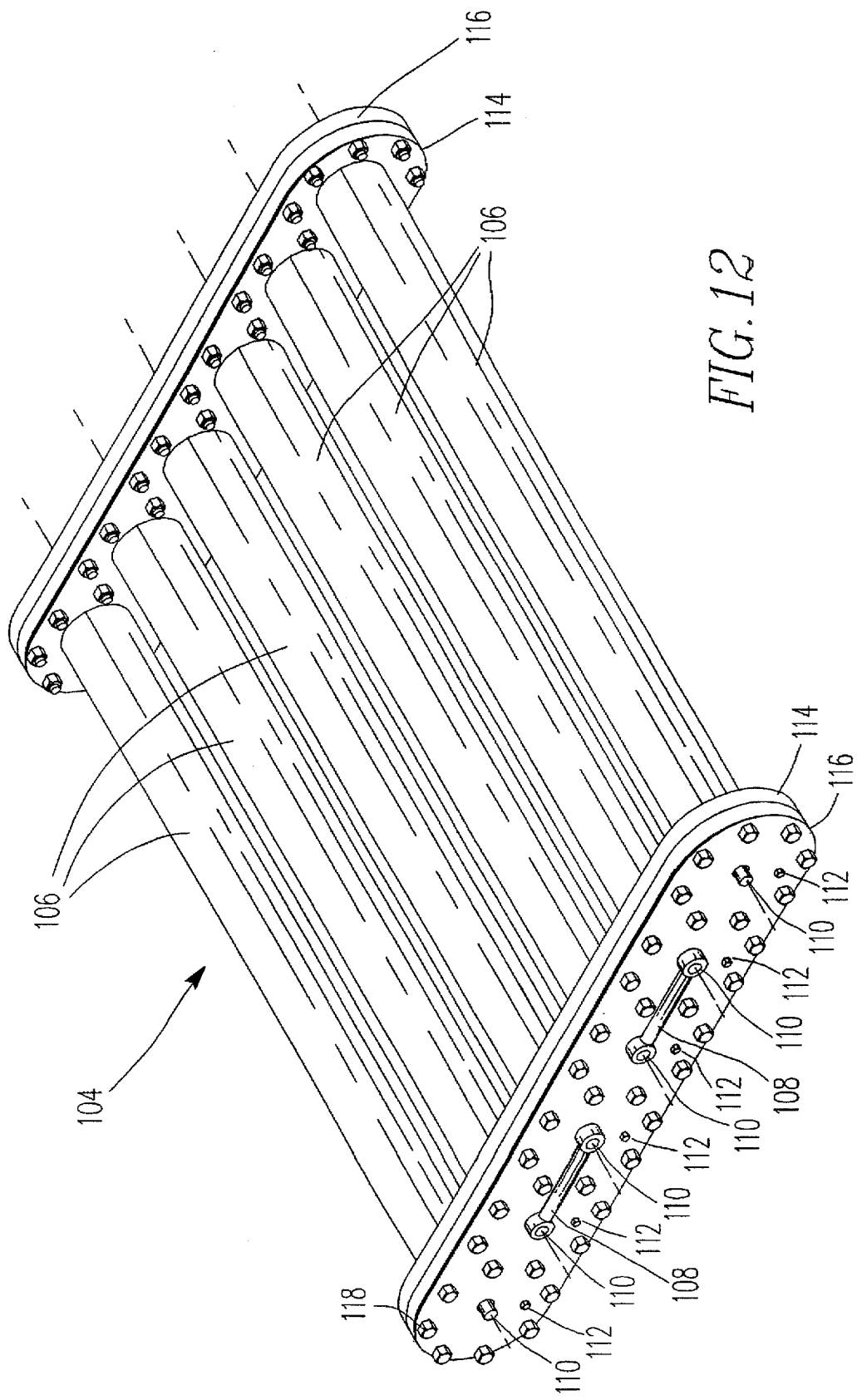
FIG. 12 is a perspective view of an electric energy storage device having a plurality of tubes for holding casings.

FIG. 11 depicts an end view of the pressure vessel 104 of FIGS. 9 or 10 including a tube 106 for holding windings 44. FIG. 12 depicts an isometric view of a pressure vessel 104 having plurality of tubes 106 for holding windings 44.

The plurality of windings may preferably be electrically connected in series, or the windings may be connected in groups in series, the groups being electrically connected in parallel. As shown in FIGS. 8–10, the windings 44 can be electrically connected in series. As shown in FIG. 12, groups of windings 44 can be electrically connected in series within tubes 106, and the tubes may be connected in series by conductors such as the bars 108 provided between terminals 110. The bars 108 connect the positive terminal 110 of a series of windings 44 with the negative terminal 110 of a second series of windings 44, as shown in FIG. 12. Thus, all of the windings 44 in all of the tubes 106 may be placed in series thereby increasing the total voltage of the device 100 to the sum of the voltages across the individual windings 44. Alternatively, the groups of windings 44 in the tubes 106 could be connected in parallel by placing all of the positive terminals 110 of the series of windings at one end of the tubes 106 and all the negative terminals at the other end, and connecting the adjacent terminals together with a bar 108 spanning all six tubes. Such an arrangement beneficially provides increased capacity as measured in amp-hours for a specific volume.

Preferably, the casing may be disposed within a pressure vessel. As broadly embodied herein, and as shown in FIGS. 8–10, the casing 102 or casings 42 containing the windings 44 may be disposed in a pressure vessel 104. Preferably, the pressure vessel and casings both have a substantially cylindrical shape for compactness and pressure resistance. However, any shape casing or pressure vessel may be employed within the scope of the invention. As shown in FIGS. 8–10, the pressure vessel 104 may comprise a tube 106 for holding the windings 44 within their respective casings 42,102.

The make up and characteristics of the pressure vessel may vary within the scope of the invention so long as the pressure vessel is strong enough to withstand the increase in pressure caused by the production of vapor during recharging, and is chemically resistant to damage from the electrolyte vapor. Therefore, the choice of electrochemistries (that is, the make up of the plates 46,48 and the electrolyte material) will generally determine the type and strength of material chosen for the pressure vessel 104. Steel, stainless steel, composites or plastics, for example, may be used as pressure vessels. For a large nickel-cadmium device, stainless steel or nickel-plated steel able to withstand 300 psi and having a gauge of at least schedule 80 may safely be employed.

Preferably, the pressure vessel includes at least one pressure relief valve. As shown in FIGS. 11 and 12, the pressure vessel 104 may have at least one pressure relief valve 112 which allows built up pressure inside of the pressure vessel to escape when it exceeds a certain point above a design specified normal operating limit. The pressure should be released at a point much lower than the maximum capacity of the pressure vessel for safety reasons. Any suitable one-way valve can be used for this function. The pressure relief valve 112 is important in that it allows the vapor produced during recharging of the device to vent upon reaching a predetermined level. The vent openings 80 in the casings allow the vapor produced by all of the windings 44 within a given casing to be vented through a single valve 112, thereby simplifying manufacture and reducing the undesirable possibility of valve failure.

If a plurality of casings 102 are provided within a plurality of tubes, as shown in FIG. 12, only a single valve 112 may be provided for the entire pressure vessel 104. In such a device, the vapor produced by all of the windings 44 in all of the casings 102 could flow through the entire interior of the pressure vessel 104 via piping (not shown) connecting the tubes 106 with each other.

In accordance with the invention, the device may further include a plurality of nonconductive casings disposed within a pressure vessel, each casing housing a plurality of the windings, an amount of the electrolyte material, and a plurality of the current collectors. As shown broadly in FIGS. 12 and 13, a plurality of casings 102 may be disposed within the pressure vessel 104. The casings 102 may be oriented within the pressure vessel 104 in various ways. As shown in FIG. 12, a plurality of casings 102 (as shown in FIGS. 9 or 10) may be provided within the tubes 106 of the pressure vessel 104, with one or more casings in each tube.

Figure 13:
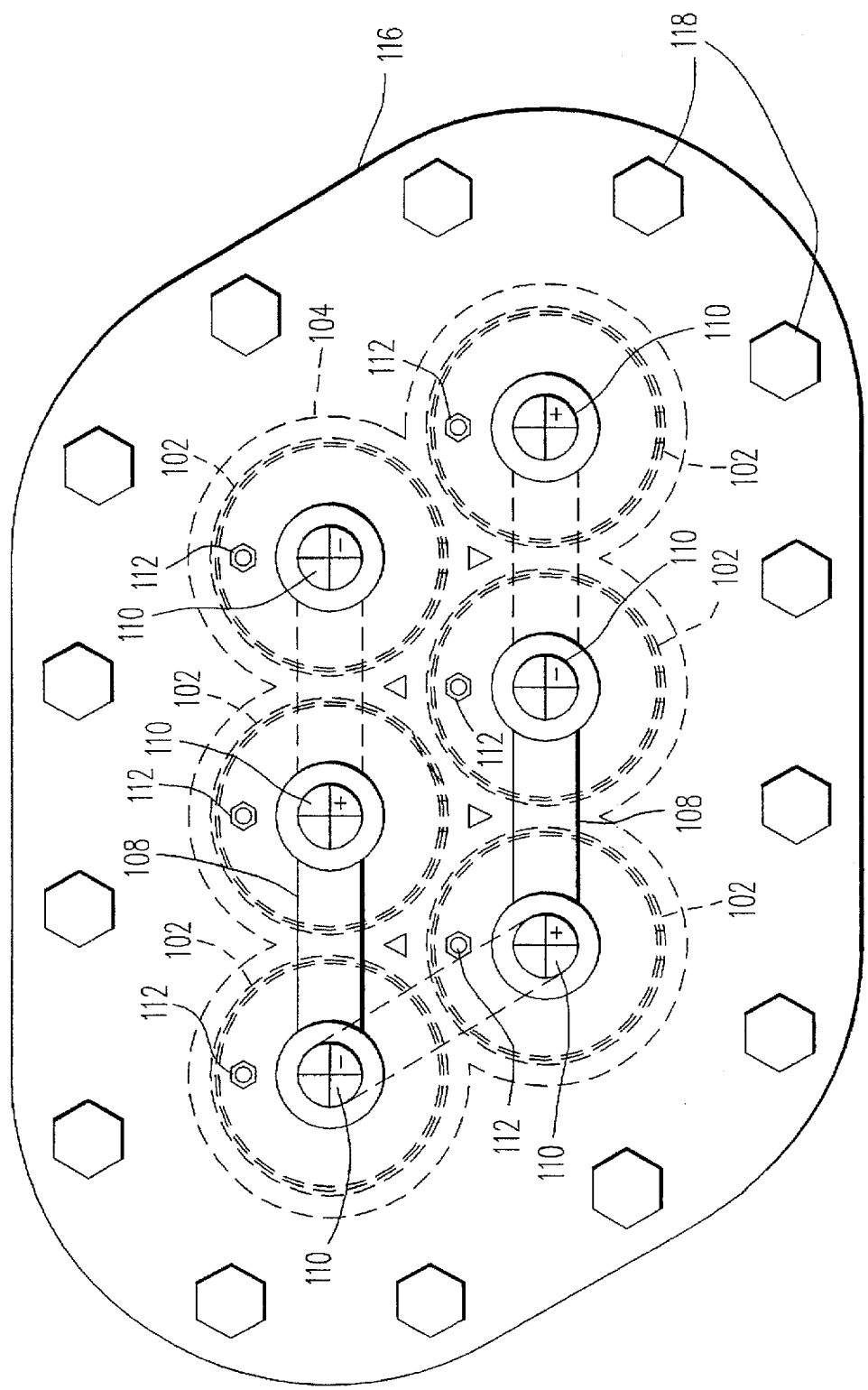
FIG. 13 is an end view of an electric energy storage device pressure vessel having a plurality of tubes arranged in a honeycomb manner for holding casings.

The pressure vessel may also be configured to hold a plurality of cylindrical casings with their longitudinal axes in a parallel honeycomb arrangement or in a coplanar parallel arrangement. As shown in FIG. 13, the casings 102 may be arranged within pressure vessel 104 in a honeycomb arrangement. This arrangement is beneficial in that casings 102 are densely packed inside the pressure vessel 104 thereby reducing the amount of material required to house the casings and reducing the surface area and weight of the pressure vessel 104. Alternately, as shown in FIG. 12, the casings 42, 102 may be arranged within the pressure vessel 104 with their axes in a parallel coplanar arrangement.

Preferably, a plurality of heat radiation fins extend from the pressure vessel. As shown in FIG. 9 the pressure vessel 104 may include heat radiation fins 136 on all or a portion of the vessel and configured in any desired fashion. The fins 136 improve heat transfer from the pressure vessel during charging, thereby preventing undesirable temperature increase within the vessel. The fins 136 may also be used to transfer heat into the pressure vessel 104 so that the device operates better in a cold environment where a battery could be sluggish or the electrolyte may freeze. In such an environment, a petroleum or natural gas fueled heater, or the like, could be provided to heat the pressure vessel 104 via the fins 136. Such a heater would be useful in an electric vehicle, as described below.

If desired, an external circuit could be provided to electrically disconnect the device 100 from its load if the battery charge runs down below a predetermined amount. Thus, if the voltage measured across the device 100 drops below, for example, 20% of its maximum voltage, the device could be disabled. This type of circuit would be useful in preventing wear on the plates 46,48 which occurs if the device is entirely discharged. This type of circuit would be especially useful in a vehicle wherein a warning signal could also be given to the operator that the battery level is low before the battery is disabled by the circuit.

As shown in FIGS. 9–13, flanges 114 are secured to either end of the pressure vessel 104 by welding, threading or any other suitable method. The flanges 114 may be secured to the plates 116 by bolts 118, or any other suitable device. As shown best in FIGS. 9 and 10, plates 116 serve to seal off the space within the tubes 106 to form the pressure vessel. A gasket 120 may be provided between flange 114 and plate 116 to better maintain the pressure seal. A hole is provided through the plate 116 for receiving a nonconductive seating member 122 which electrically isolates the terminal 110 from the flange 114 and plate 116, and also seals the pressure vessel 104 from the atmosphere. The seating member 122 includes a camming surface 124 angled to contact a slanted surface 126 on the terminal 110. When the bolts 118 are tightened, the camming surface 124 contacts the slanted surface 126 to urge the terminal 110 over the conductor rod 72 and urge the windings 44 and current collectors 68 in the tube 106 into tighter engagement.

The seating member 122, which may be made of any nonconductive material such as plastic or a composite, must be strong enough to withstand the mechanical stresses generated by the tightening of the bolts 118 and the pressures generated during recharging. In order to improve the sealing capability of the seating member 122, a number of o-rings 128,130,132,134 may be provided in contact with the seating member.

The flanges 114 or the plates 116 may be secured to any surface to hold the storage device 100 where desired. For example, the flanges 114 or plates 116 may be secured to the frame of an automobile, or may comprise part of the frame of an automobile, or may be secured to the wall of a building where a rechargeable power supply is required. The storage device 100 may be used as a building reserve power supply in case the regular power supply is interrupted. In this use, the storage device may be used to collect and store solar energy.

In accordance with another aspect, the present invention includes a motor vehicle for transporting loads in excess of 100 pounds, the vehicle including a frame. The exemplary embodiment of the motor vehicle of the present invention is shown in FIGS. 14a–14e and is designated generally by reference numeral 160. AS broadly embodied herein and referring to FIGS. 14a–14e, a motor vehicle 160 includes a frame 162 which may be made of any rigid material, such as metal, plastic, composites, or wood, suitable for supporting loads.

The motor vehicle may also include a plurality of wheels rotatably mounted on the frame. As broadly disclosed in FIGS. 14a–14e, wheels 164 are rotatably mounted on frame 162 in any known fashion. Pairs of wheels 164 may be mounted on axles, or wheels may be mounted individually to the frame, as desired. The vehicle 160 may comprise a car, truck, or cart having any number of wheels 164, a motorcycle, or any other type of motorized vehicle within the scope of the invention.

An electric motor for driving at least one of the wheels is provided in the motor vehicle. As broadly embodied in FIGS. 14a–14e, electric motor 166 is mounted on the frame 162. The motor 166 may also be mounted on an axle. The electric motor 166 drives at least one of the wheels 164 through any suitable mechanism. Preferably a single electric motor 166 is provided for driving at least one of the wheels 164, however a plurality of motors may be provided on the frame, each motor driving at least one wheel. It should be understood that any type of DC electric motor 166 may be provided, and any number of motors may be provided in any distribution within the vehicle 160, within the scope of the invention.

In accordance with the invention, the motor vehicle also includes an electric energy storage device electrically connected to the motor for energizing the motor, the device including a plurality of electrically connected coiled windings. As broadly shown in FIGS. 14a–14e, an electric energy storage device 100, as described above, is provided electrically connected to the motor 166 for energizing the motor. The storage device 100 includes a plurality of windings 44, an electrolyte material, and a plurality of current collectors 68, as described above.

Preferably, the vehicle includes a vessel for containing at least a portion of the windings. As broadly shown in FIGS. 14a–14e, a vessel 168 is provided in the vehicle 160 for containing at least a portion of the windings 44. Preferably the vessel 168 is a pressure vessel which can withstand the gas pressure generated during recharge of the device 100.

As shown in FIGS. 14a–14e, the vessel can have any number of configurations and is preferably a structural portion of the frame. As broadly embodied in FIGS. 14a and 14b pressure vessel 168 is a portion of frame 162 and provides structural support for the frame. Use of the pressure vessel 168 as a portion of the frame 162 allows for a reduction in the weight of the vehicle 160 thereby increasing the vehicle's range and speed. Placement of the pressure vessel 168 as low as possible within the frame 162 is desirable in that the vehicle's 160 center of gravity is lowered thereby improving performance.

Figure 14A:
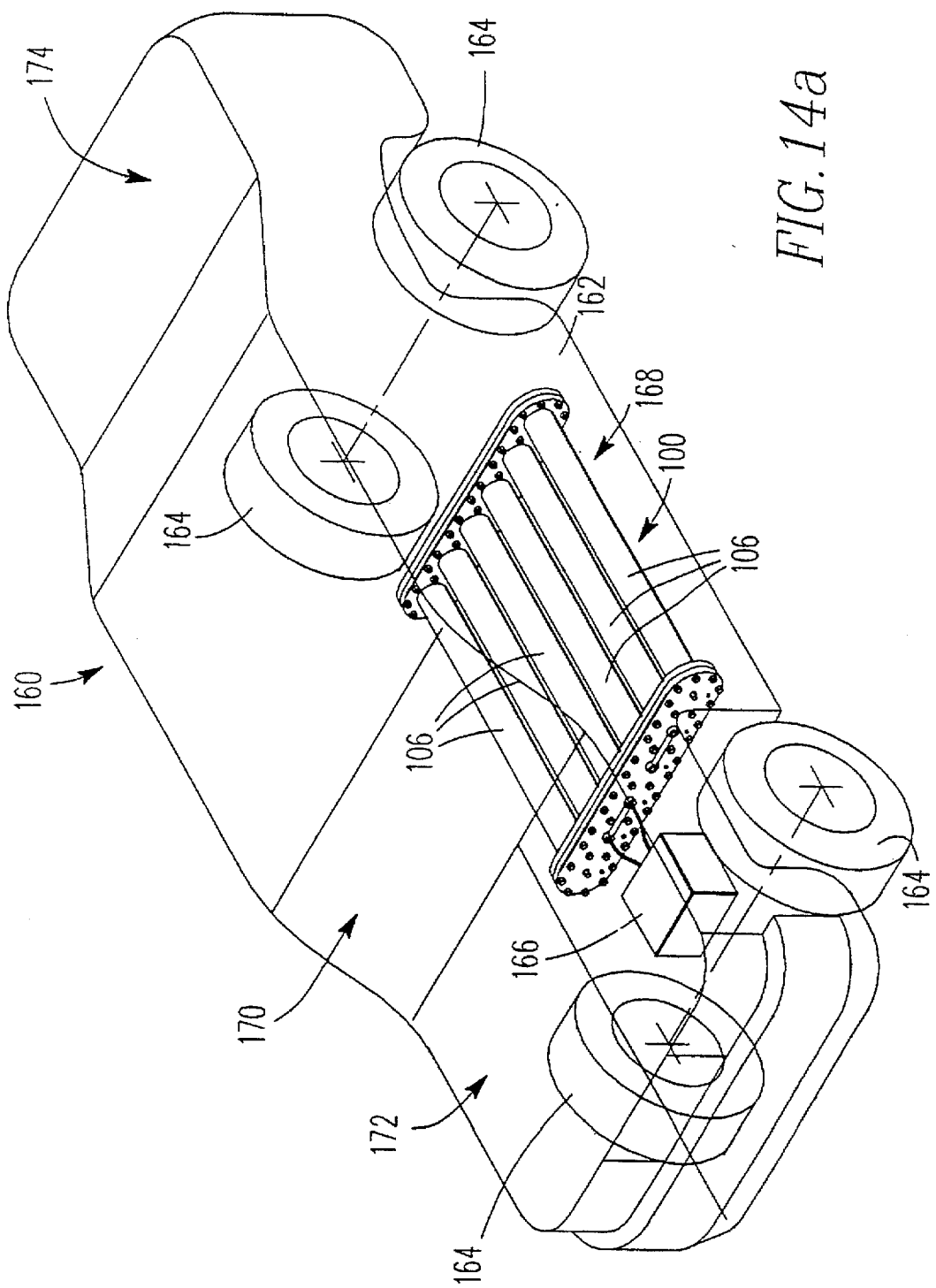
Figure 14B:
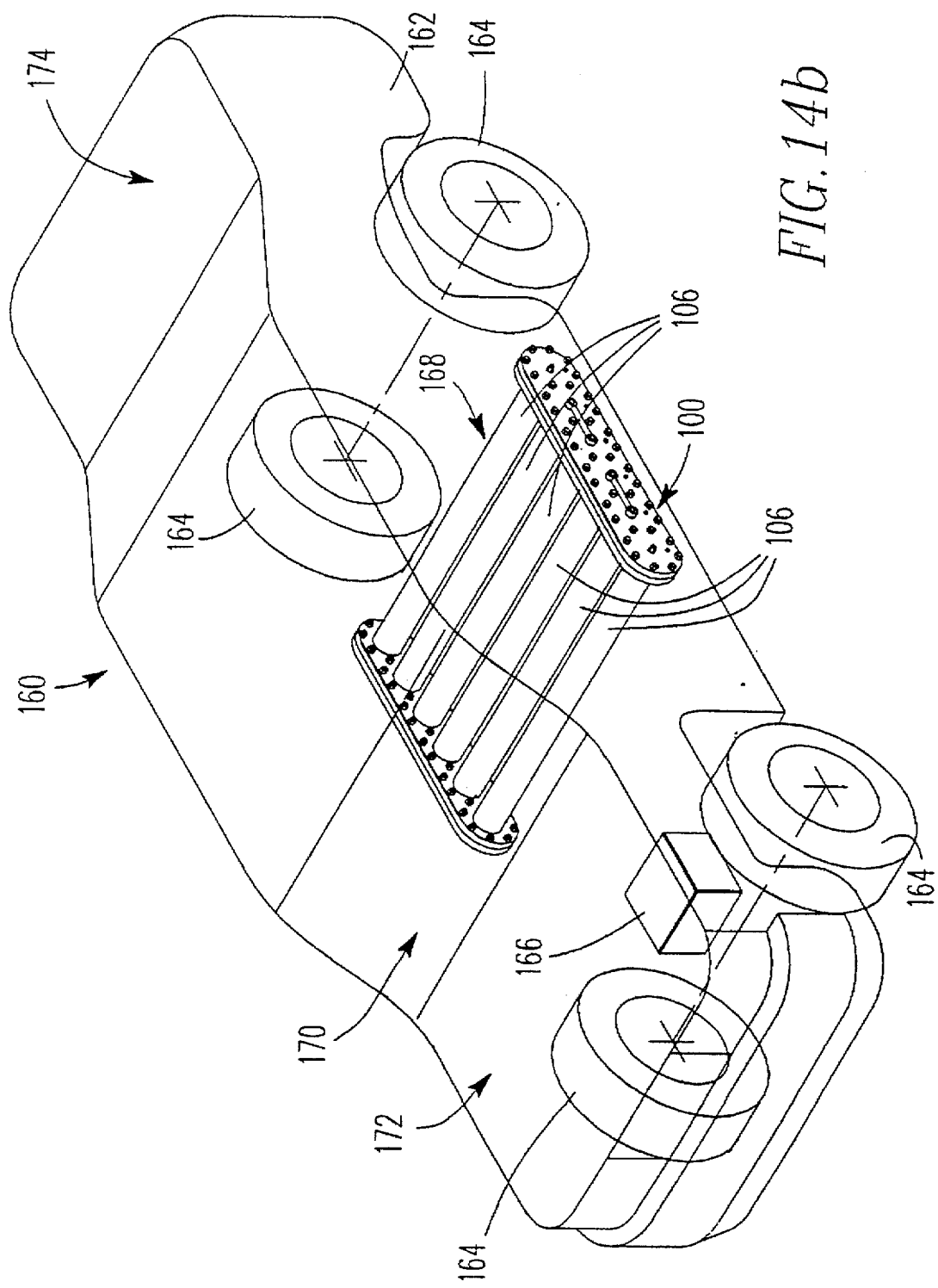
Figure 14D:
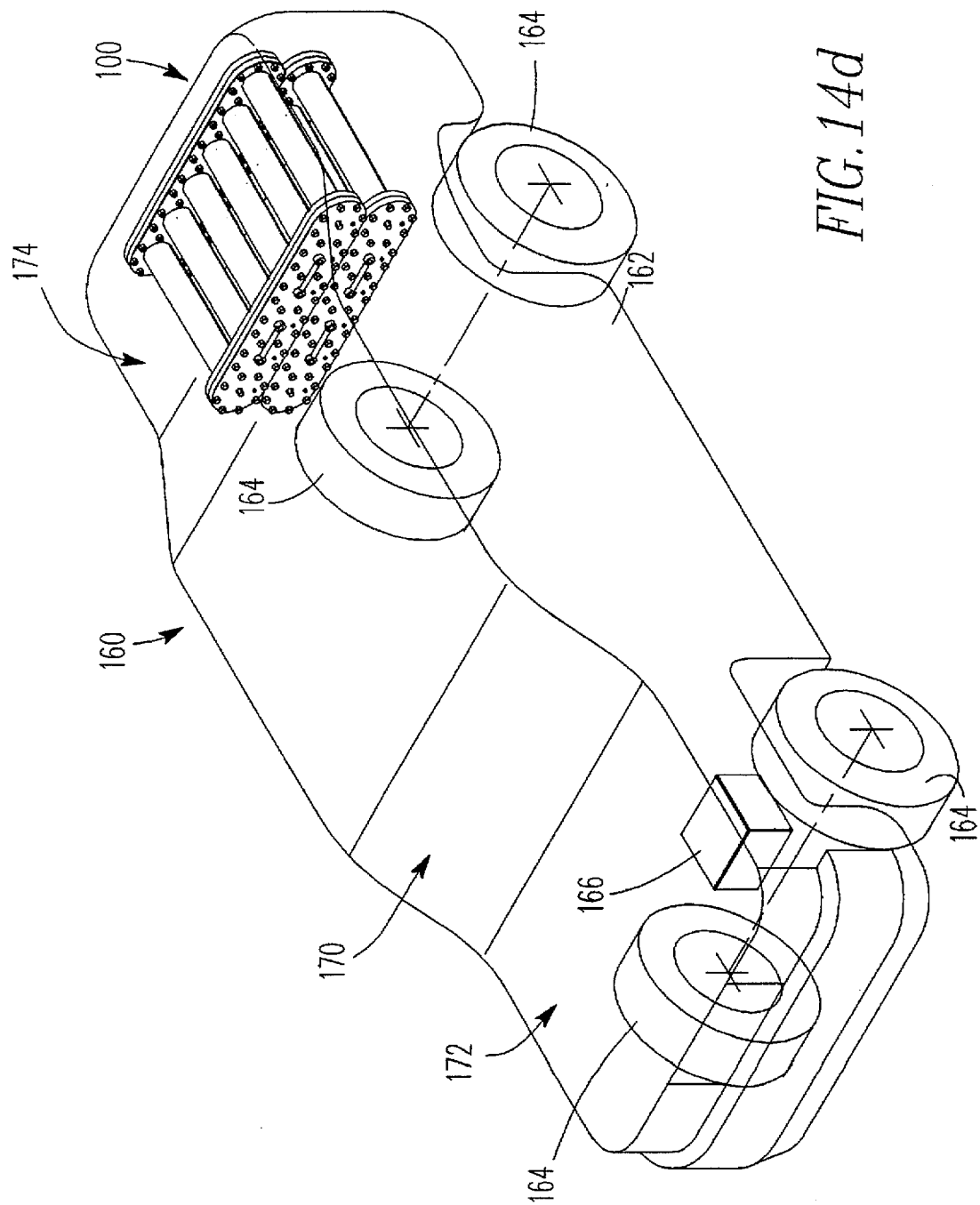
Figure 14E:
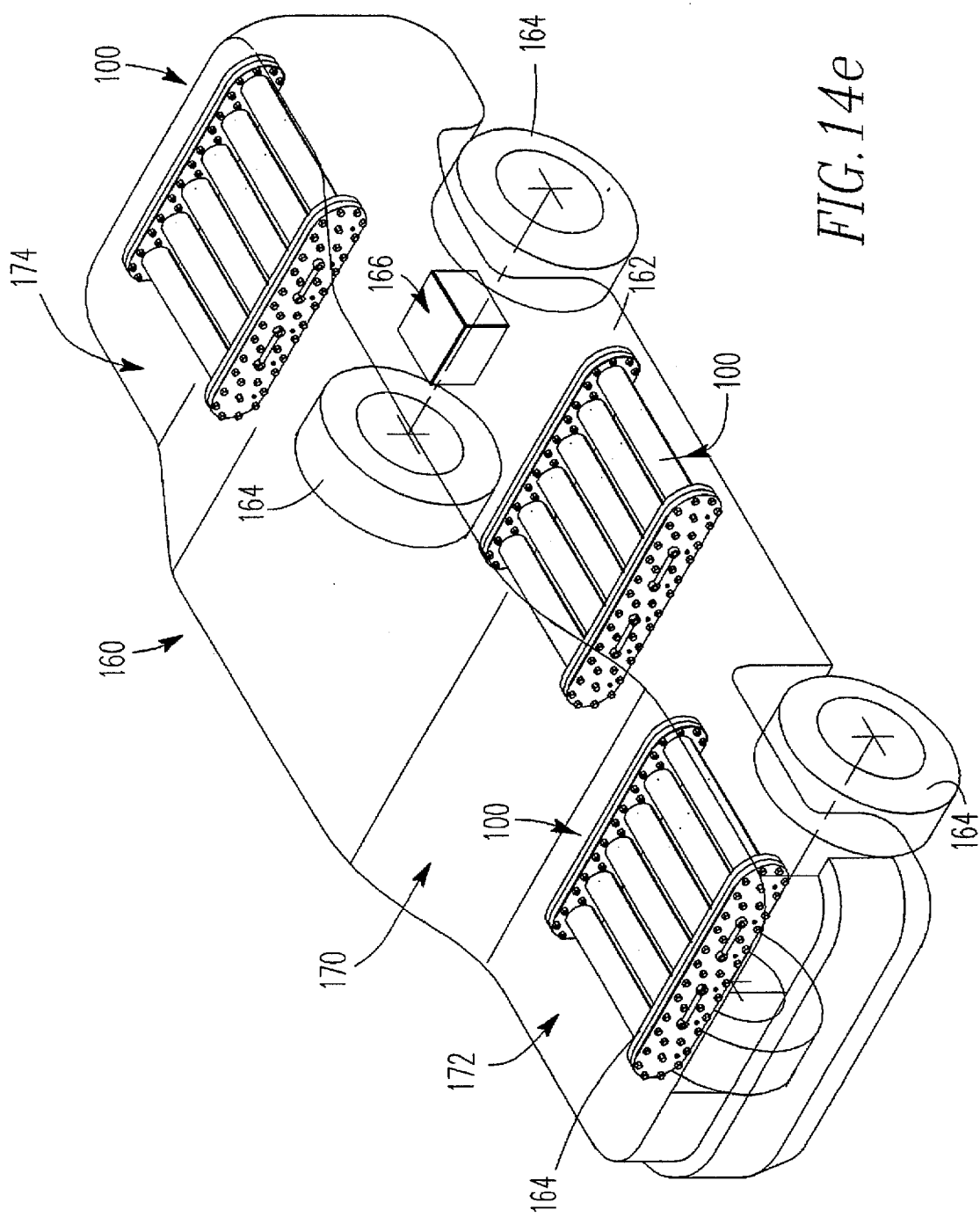
Figure 15:
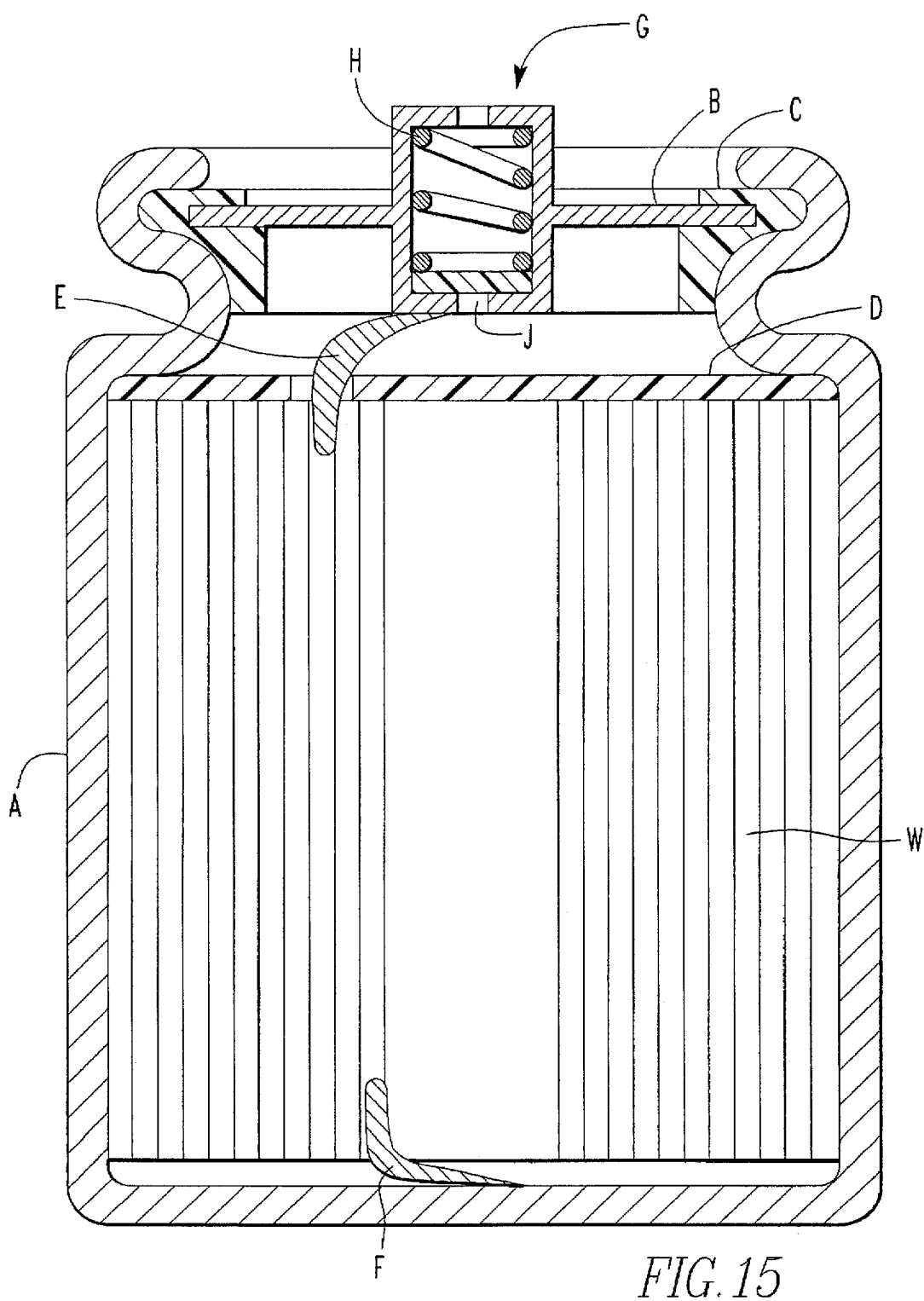
FIG. 15 is a sectional view of a conventional wound battery.

As shown in FIGS. 14a–14e, the vehicle's pressure vessel may be located in various portions of the frame and various different arrangements. For example, the pressure vessel may be located in the hood compartment or the trunk compartment, or beneath the passenger compartment of the vehicle. As shown in FIG. 14a, the pressure vessel 168 may be disposed in the frame 162 beneath the passenger compartment 170, with the series of windings 44 extending from the front to the rear of the vehicle. Alternately, as shown in FIG. 14b, the pressure vessel 168 may be disposed in the frame 162 beneath the passenger compartment 170, with the series of windings 44 extending from side to side in the vehicle. Alternately, as shown in FIG. 14c, the pressure vessel 168 may be disposed in the hood compartment 172 or, as shown in FIG. 14d, the trunk compartment 174 of the vehicle 160. A plurality of pressure vessels 168 may be also provided, with the pressure vessels being located in different places throughout the vehicle 160, as shown in FIG. 14e.

Preferably, the vehicle's pressure vessel may be configured to maintain at least a portion of the windings with their longitudinal axes arranged in a parallel honeycomb arrangement. As shown in FIG. 13 and as described above, the pressure vessel 168 may be configured to hold a plurality of windings 44 in a honeycomb arrangement, as is pressure vessel 104. Alternatively, the pressure vessel may be configured to maintain at least a portion of the windings with their longitudinal axes in a parallel coplanar arrangement. As shown in FIGS. 14a–14e and as described above, the pressure vessel 168 may be configured to hold a plurality of windings 44 with their axes in a coplanar parallel arrangement within a plurality of tubes 106.

Preferably, a series of tubes are connected to the frame, each tube for holding a plurality of windings in an axially aligned relationship. As shown in FIGS. 14a–14e, the vessel may comprise tubes 106 provided in various arrangements within the frame 162 of the vehicle 160. These tubes 106 hold the windings 44 in an axially aligned relationship as described above.

A series of tubes may be connected to the frame, each tube for holding a nonconductive casing. As shown in FIGS. 14a–14e, each tube 106 may hold casing, similar to the casings 42,102 described above and as shown in FIGS. 8–10, in which windings 44 and at least one current collector 68 are housed.

In accordance with another aspect of the invention, an apparatus, which is for making an electrical energy storage device including a winding having a cathode plate, an anode plate, and a separator, comprises a frame, with an arbor rotatably mounted on the frame. As broadly embodied in FIG. 16, an apparatus 200 for making an electrical storage device includes a frame 202 on which the winding 44 is wound. The frame 202 has a front wall 203, in front of which the winding 44 is wound. The apparatus 200 may wind a winding 44, such as that described above, including a cathode plate 46 and an anode plate 48 wound in an offset relationship with a separator 50 in between. Although the apparatus 200 is particularly suitable for manufacturing batteries constructed in accordance with the present invention, it also may be used to wind windings without offset cathode and anode plates if desired.

Figure 16:
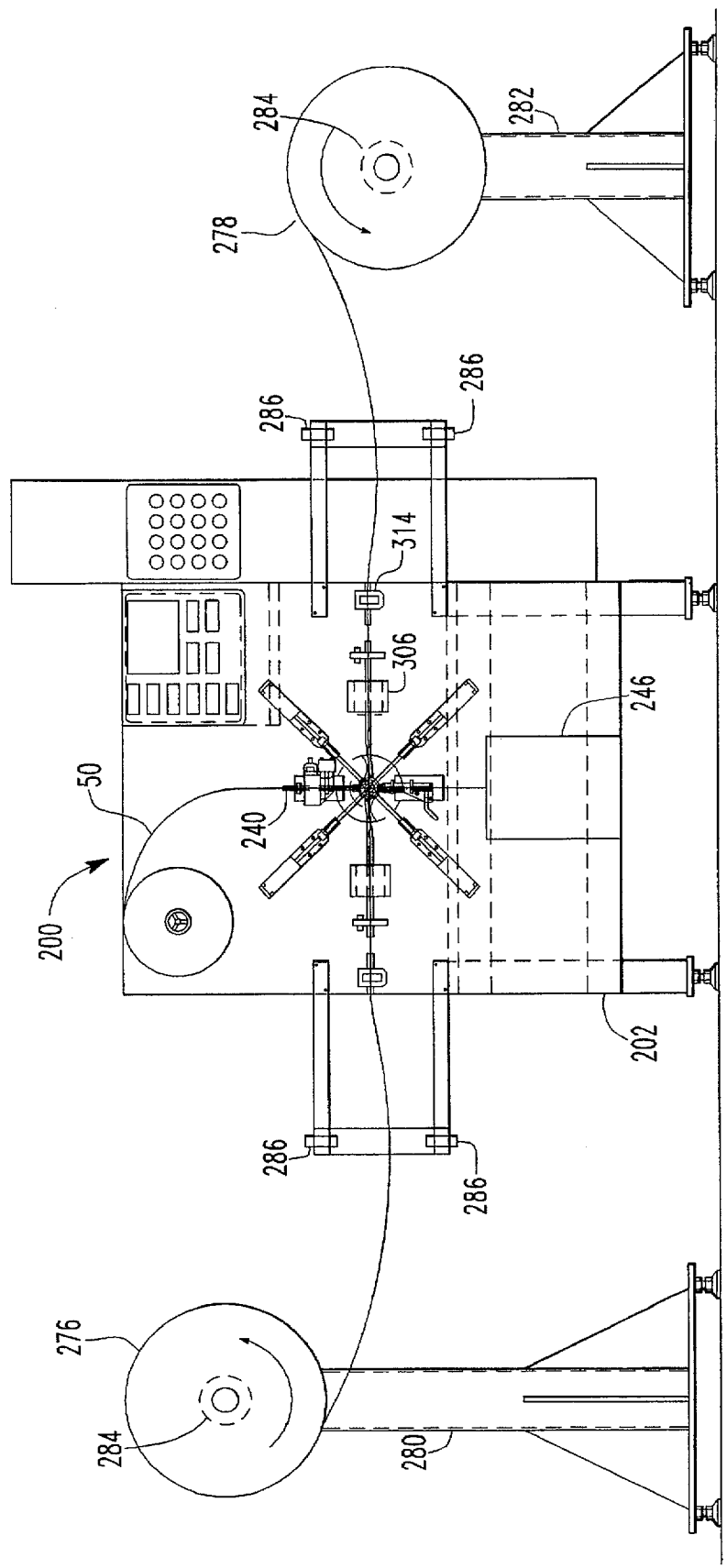
FIG. 16 is a front view of an apparatus for making an electric energy storage device according to the present invention.
Figure 17:
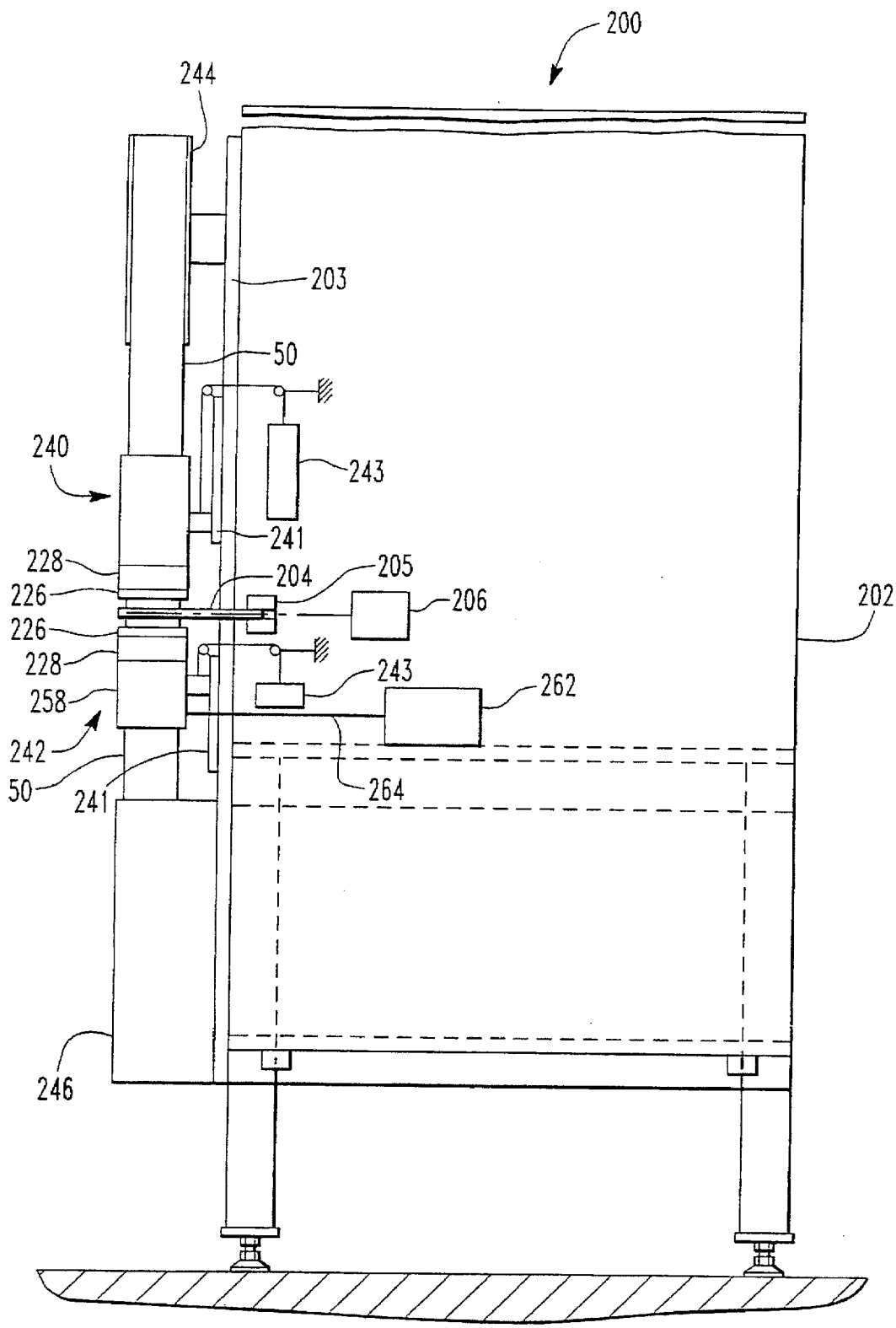
FIG. 17 is a diagrammatical right side view of the frame of an apparatus according to FIG. 16 showing the separator feed mechanism.
Figure 19:
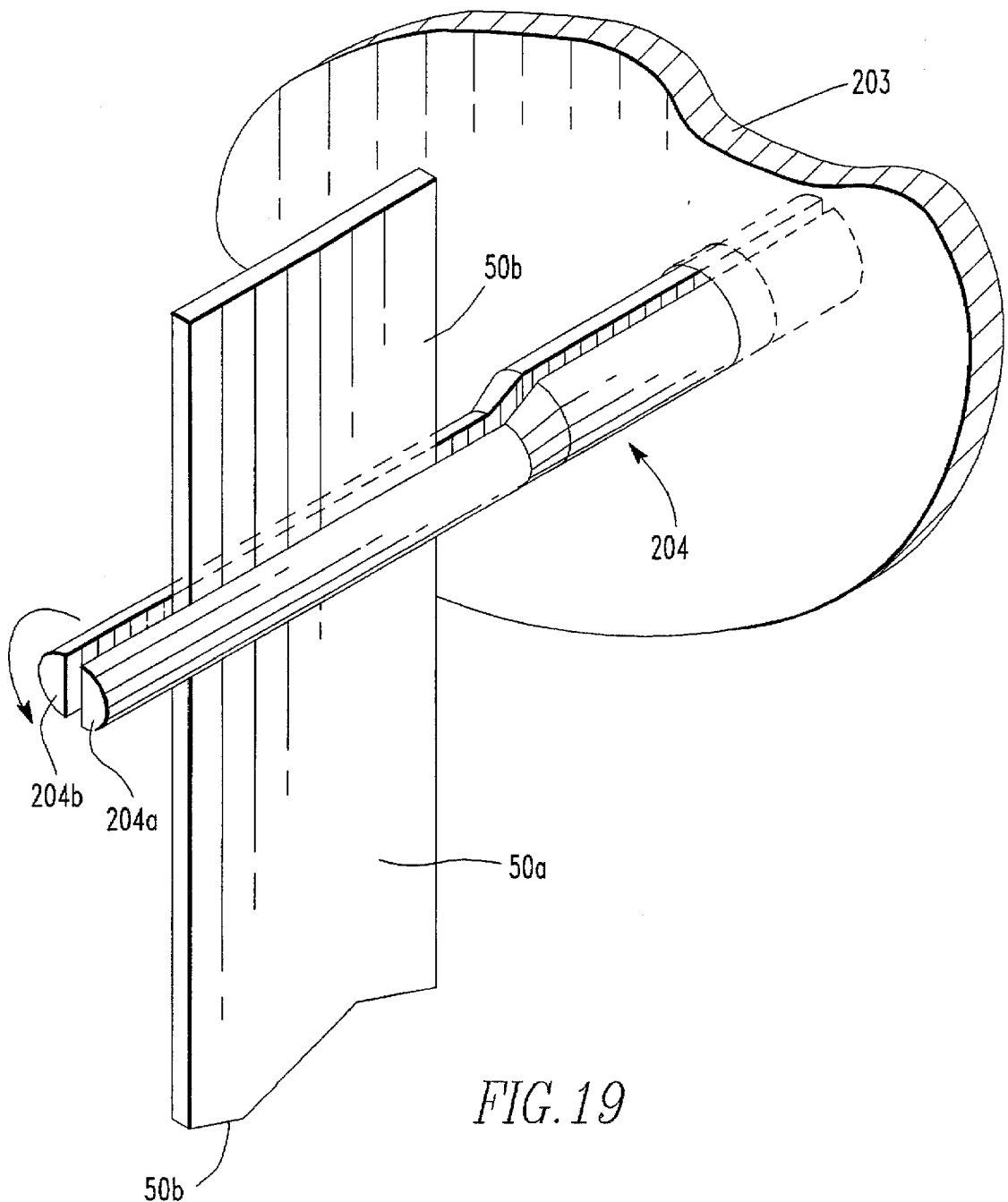
FIG. 19 is a perspective view of the arbor of the apparatus of FIG. 16 gripping the separator.
Figure 23:
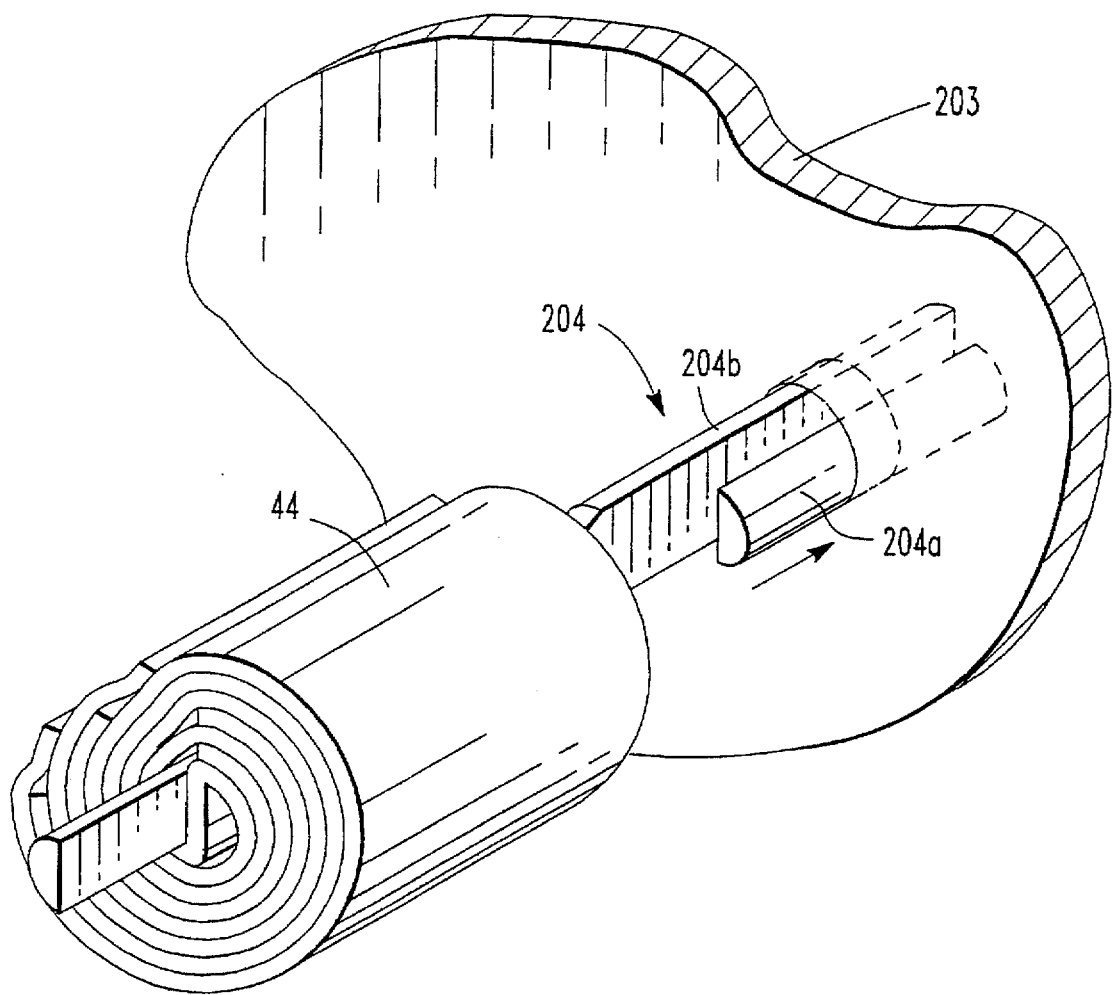
FIG. 23 is a perspective view of the arbor of the device of FIG. 16, one half of the arbor being removed from a completed winding.
Figure 24:
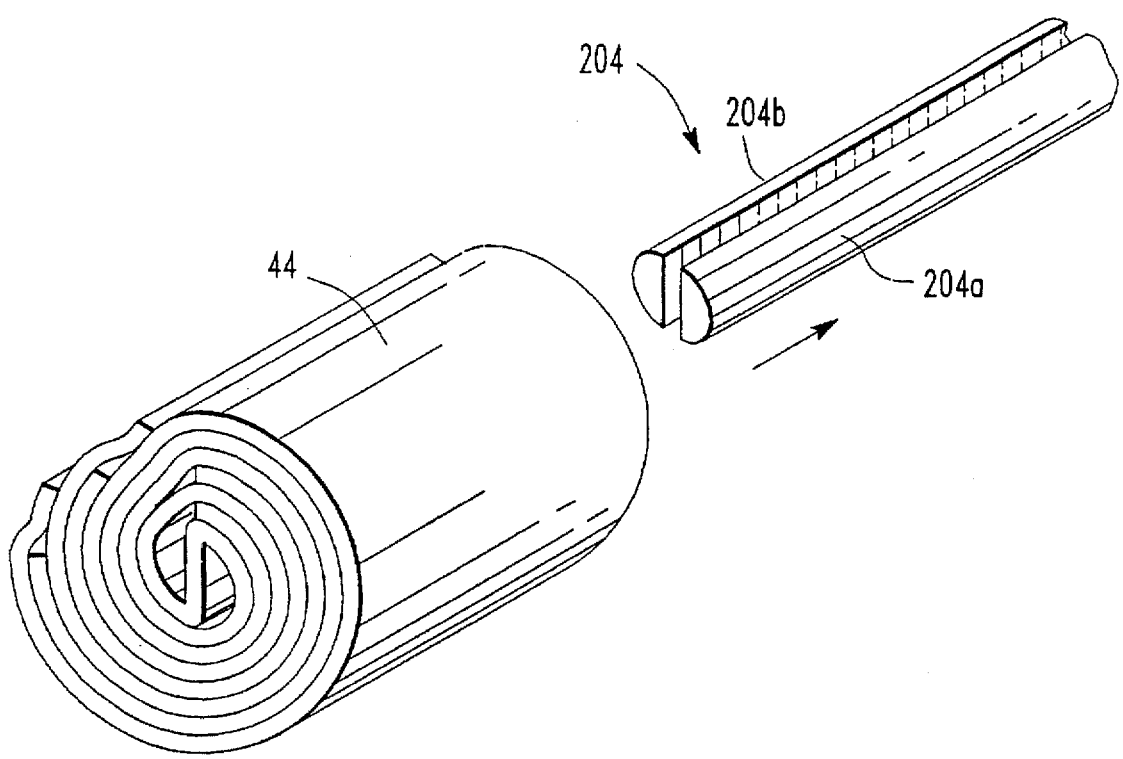
FIG. 24 is a perspective view of the arbor of the device of FIG. 16, both halves of the arbor being removed from the winding.

As broadly embodied in FIGS. 16 and 17, an arbor 204 is rotatably mounted on the frame 202 and extends through front wall 203. The arbor 204 may preferably be made of two prongs 204a and 204b mounted on the frame 202 opposite each other. FIG. 19 shows the prongs 204a,204b of the arbor 204 extending through the front wall 203 with the separator 50 placed between them in preparation for winding. The prongs 204a,204b of the arbor 204 may be mounted on bearings 205 so as to be rotatable together as a single unit. The prongs 204a,204b should preferably supported only at one end within the frame 202 and should be retractable into the frame 202 for reasons which will be described below. FIG. 23 shows prong 204a retracted from a finished winding 44, and FIG. 24 shows both prongs 204a, 204b retracted from the winding. The prongs 204a,204b may be retracted by any suitable mechanism such as pneumatically operated pistons, electric motors, or the like.

Alternately, the arbor 204 may comprise a rod or a tube around which the separator 50 and plates 46,48 are wound. However, the two-piece arbor 204 shown in the figures most easily forms a winding 44 in that the prongs 204a, 204b can hold the separator 50 between them when winding is begun. If another type of arbor is employed, some mechanism such as a clamp or a groove to initially hold the separator 50 must be used. Further, two pieces of separator 50 may be required rather than the one-piece separator as shown in the figures.

The preferred diameter of the arbor 204 depends on the desired diameter of the winding 44 to be produced. In general, the arbor 204 should be kept as small as possible in order to minimize the hole 60 diameter of the eventually completed winding 44 to provide a battery having more capacity per unit of volume. However, the arbor 204 diameter should be large enough to stably support the winding 44 during the winding process. It is preferred that the ratio of the diameter of the completed winding 44 to the diameter of the arbor 204 be at least six to one. A preferred arbor 204 diameter for an 8 inch diameter winding 44 is in the range of 0.250 to 0.375 inches. Although the present apparatus 200 is suitable for winding large windings 44, it should be understood that the apparatus may also be employed to wind smaller windings, such as those of standard battery sizes from AAA to D. A preferred arbor 204 diameter for a AAA battery is in the range of 0.100 to 0.125 inches, while a preferred arbor diameter for a D battery is in the range of 0.125 to 0.160 inches.

In accordance with the invention, means are provided for rotating the arbor to wind the anode plate, the cathode plate and the separator about the arbor to thereby form the winding. As broadly embodied herein, means for rotating the arbor may comprise, for example, a motor 206 mounted in the frame 202 behind front wall 203. The motor 206 may preferably be a stepping motor which can be run at varying speeds during the winding process following a preprogrammed pattern or responding to manual input from an operator. The motor 206 can be coupled to the arbor 204 by any suitable mechanism such as gears or belts.

Preferably anode and cathode reels are respectively provided for paying out the anode plate and the cathode plate to the arbor during winding. As broadly shown in FIG. 16, adjacent the frame 202 are provided an anode reel 276 and a cathode reel 278 on which a wound supply coil of the anode material and cathode material are respectively held. The reels 276,278 are mounted on stands 280,282 having different heights. While the stands 280 282 are shown in FIG. 16 as standing apart from the frame 202, the stands could be attached to the frame if desired.

Figure 21:
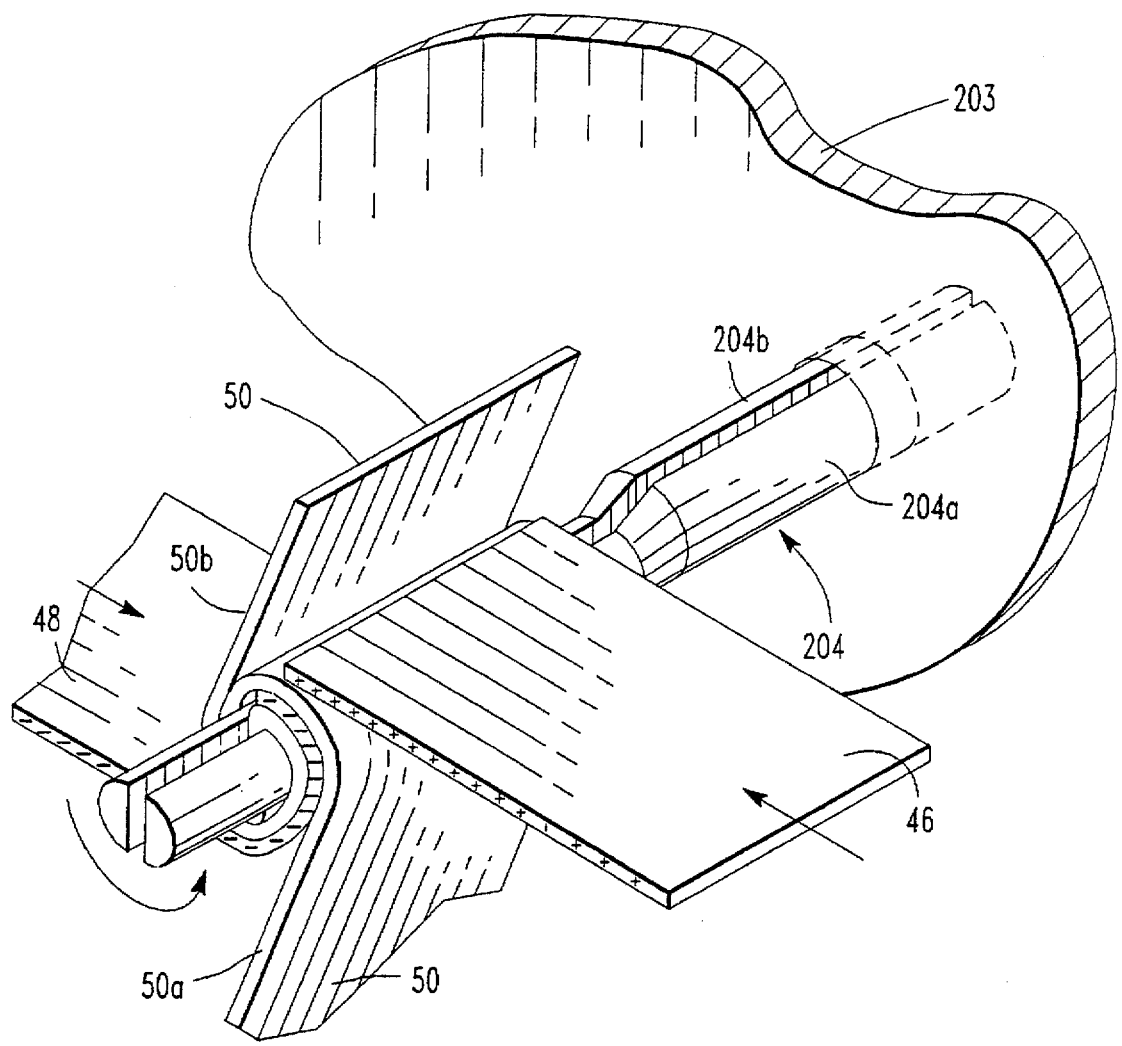
FIG. 21 is a perspective view of the arbor of the device of FIG. 16 rotated from the position shown in FIG. 20.
Figure 22:
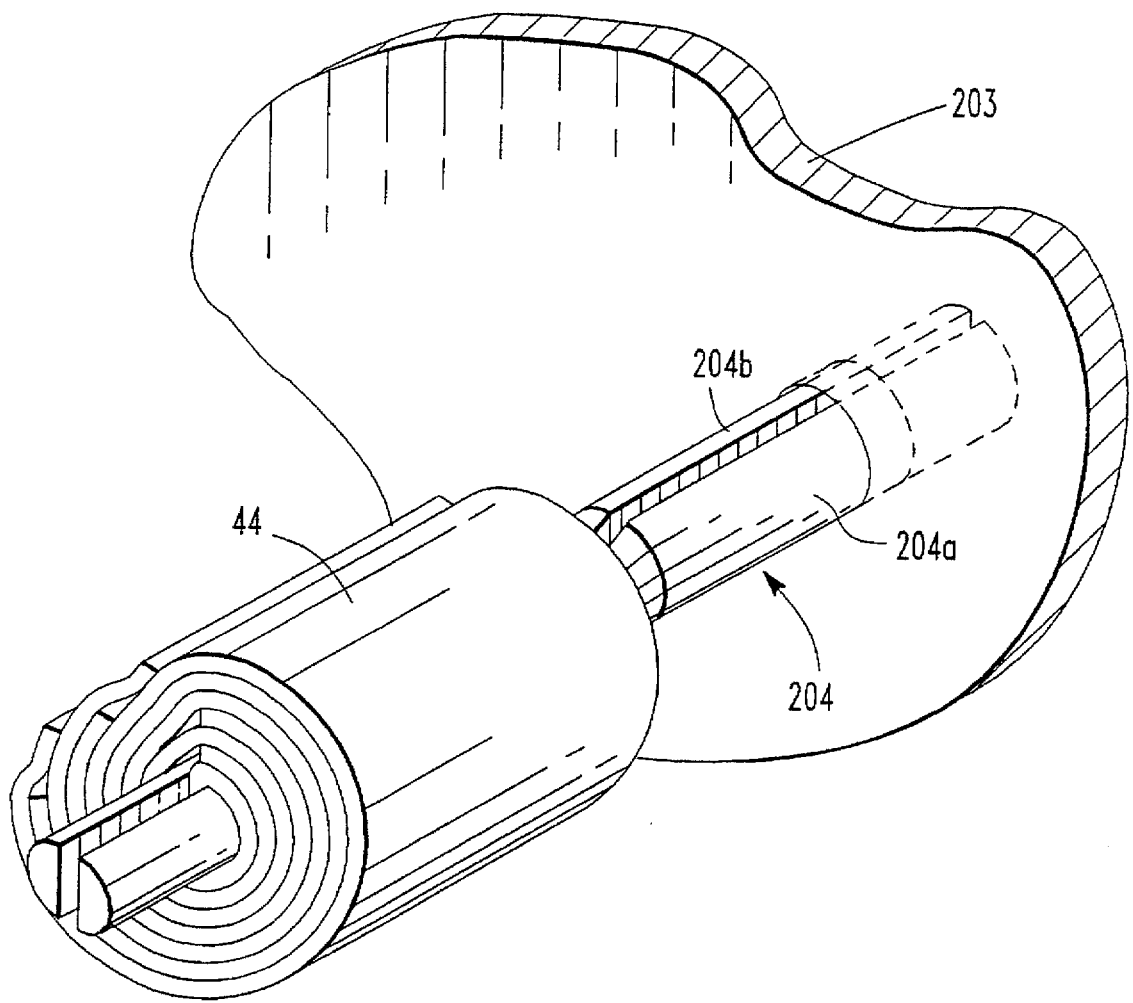
FIG. 22 is a perspective view of a completed winding on an arbor of the device of FIG. 16.

Preferably, the stands 280,282 may have stepping motors 284 for paying out the plates 46,48 from the reels 276,278. When paying out the plate material during winding, the reels 206,278 preferably both rotate in the same direction as the arbor 204. Thus, as shown in FIG. 16, the arbor 204 and the reels 206,278 all rotate counterclockwise during winding. The common rotation direction is important since the plates 46,48 are supplied from a coil on the respective reel 276, 278. The coiling causes the plates 46,48 to have a tendency to bend, after being payed out of the coils, in the direction they were wound in the coil. Therefore, when the plates 46,48 are wound around the arbor 204, it is preferable that the plates are wound in the same direction as they were wound about the supply coils to avoid back bending of the plates and ensure that the winding 44 is uniformly wound. Thus, as shown in FIGS. 21 and 22, the plates 46,48 are wound counterclockwise about the arbor 204 in the same direction that the reels 206,278 rotate.

Figure 27:
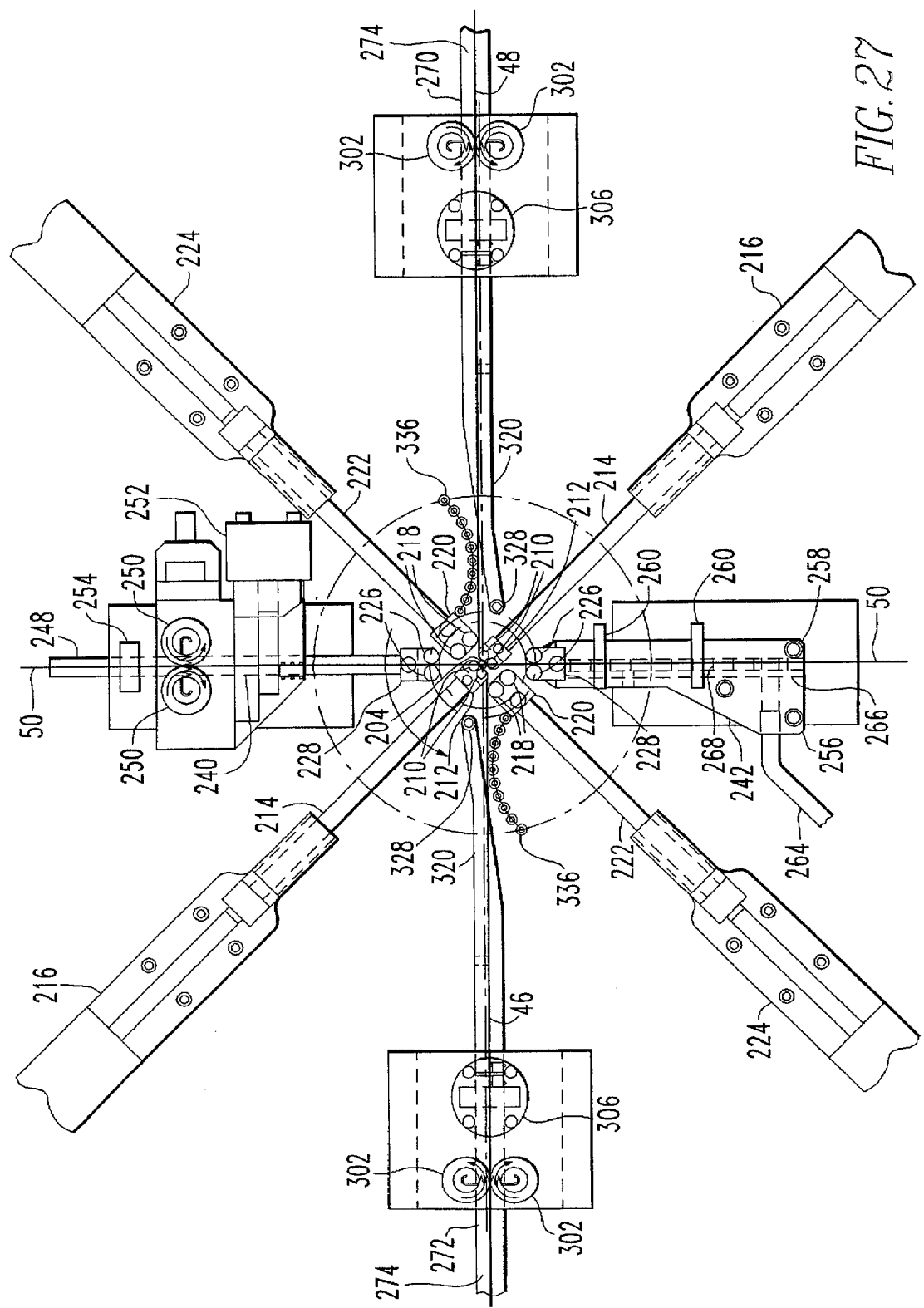
FIG. 27 is an enlarged front view of the rollers and plate tracks surrounding the arbor of the device of FIG. 16.
Figure 32:
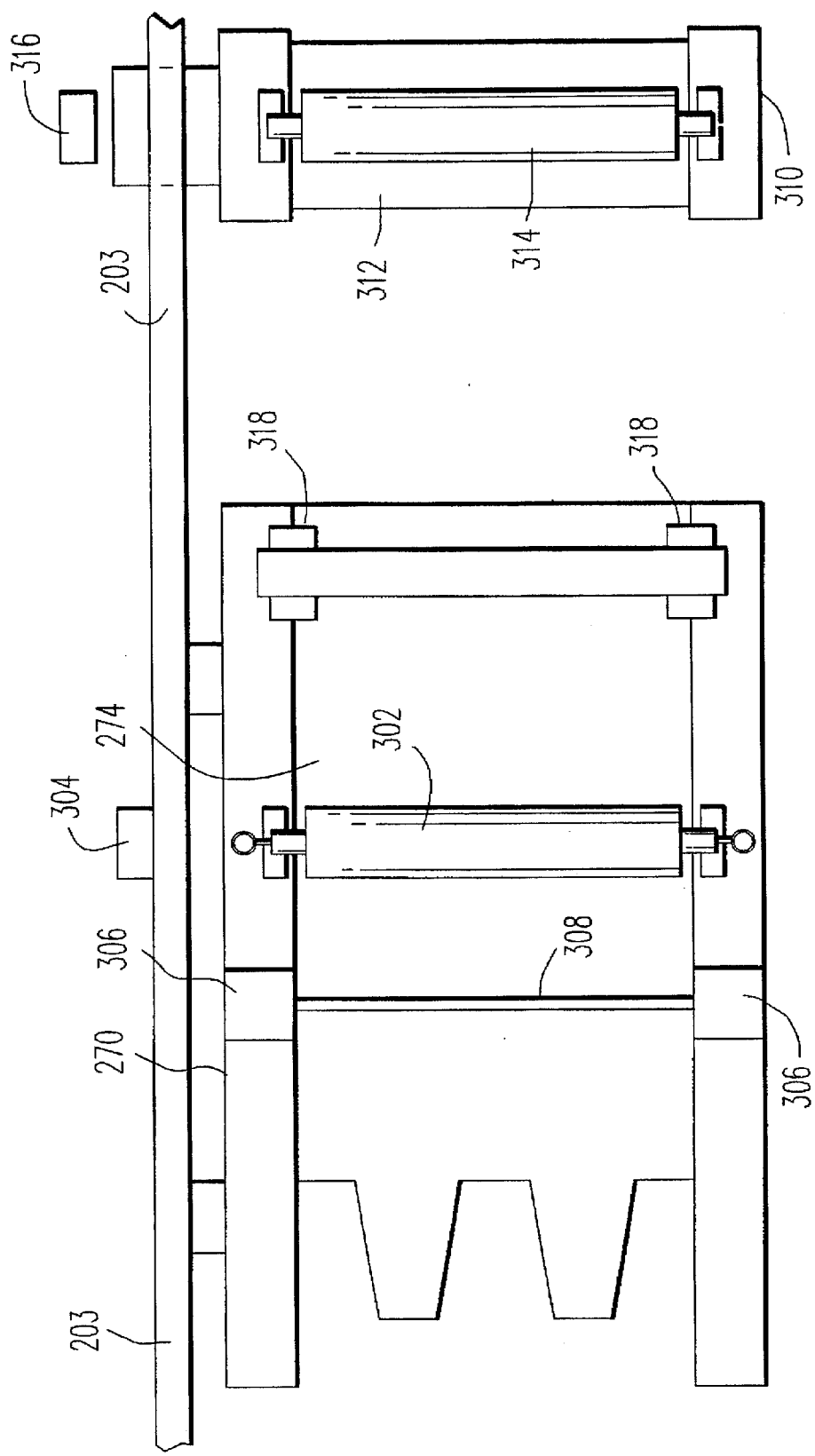
FIG. 32 is a top view of the positive plate track and tracking platform of the device of FIG. 16.

As shown in FIGS. 27 and 32, a positive plate track 270 and a negative plate track 272 are provided attached to the front wall 203 of the frame 202 between the stands 280,282 and the arbor 204, respectively. The plate tracks 270,272 each have a groove 274 for receiving a plate to be fed to the arbor 204. Each groove 274 should be deep enough to receive the respective plate and should receive the plate with a very tight slip fit across its width. In that windings 44 with diameters as large as 8 inches can have plates 46,48 as long as 800 inches, precise control of the plate alignment during winding is required. Therefore, the plate tracks 270,272 may be made of hardened tool steel, the grooves 274 being machined to a tolerance of about ±0.001 inch for precisely guiding the plates.

Figure 35:
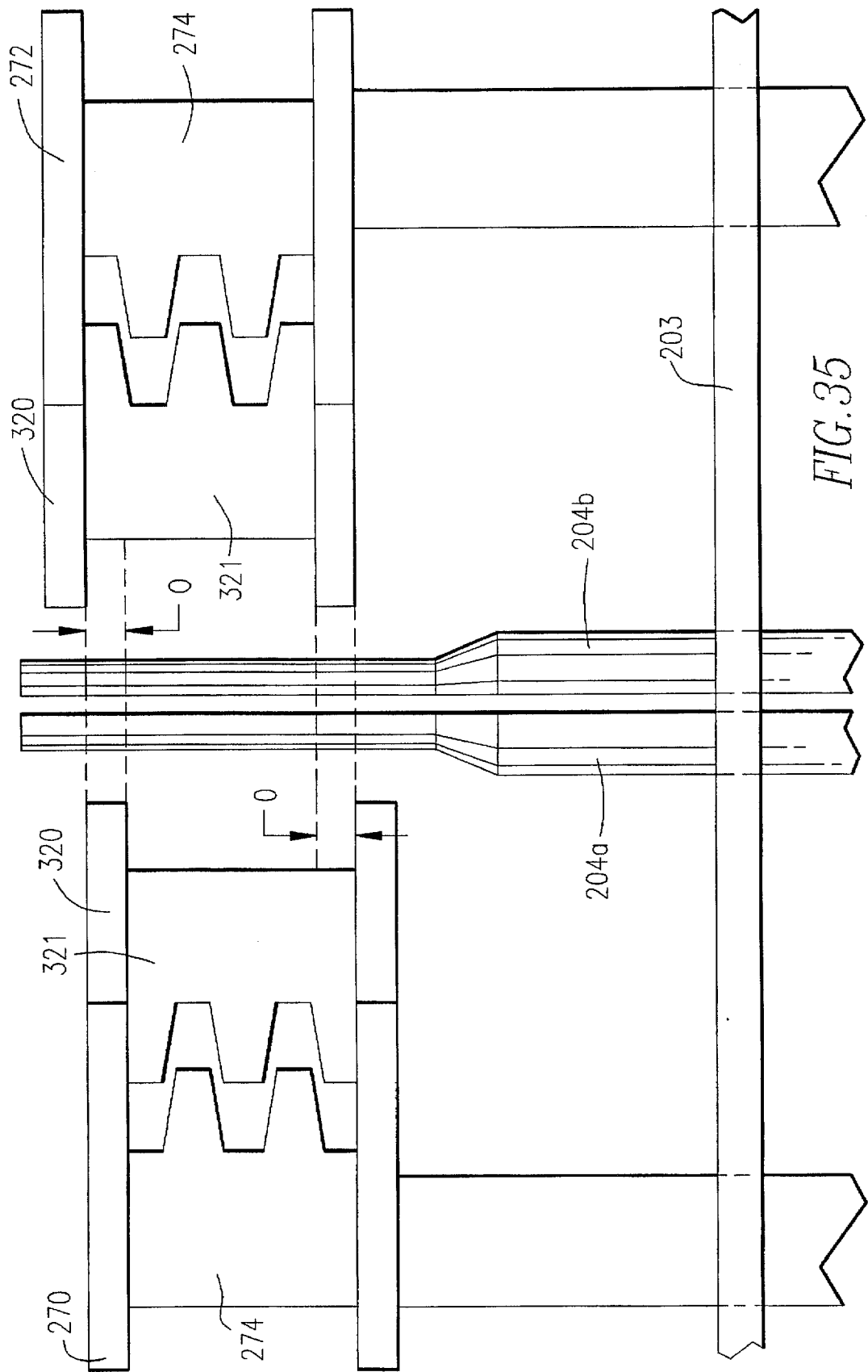
FIG. 35 is a diagrammatical representation of the offset plate tracks of the device of FIG. 16.

Preferably, the apparatus further includes means for winding the anode and cathode plates in an offset relationship so that an elongated side edge of the cathode plate extends beyond an elongated side edge of the anode plate at a first side of the winding. Similarly an elongated side edge of the anode plate extends beyond an elongated side edge of the cathode plate at a second side of the winding opposite the first side. As broadly embodied herein, the means for winding the plates in the offset relationship described extensively above may comprise orienting the positive and negative plate tracks 270,272 in an offset relationship. As shown in FIG. 35, the sides of the grooves 274 and 321 on the positive plate track 270 and slide 320 are offset from the sides of the grooves 274 and 321 on the negative track 272 and slide 320 by an equal amount on each side. This offset amount, denoted by the reference character "0", should be equal at both sides of the tracks 270,272. The tracks 270,272 are mounted on support members 271 which are adjustably engaged with the frame 202. The offset 0 is adjustable by varying the distance between one or both of the tracks 270,272, and the front wall 203 of the housing by moving the support members 271 into or out of the frame 202. Precise control of the offset 0 and the alignment of the plates 46,48 during winding allows the winding of plates longer then conventional apparatuses can wind.

Preferably, the stands 280,282 have different heights so that the reels 276,278 pay out the plates 46,48 at about the height of the plate tracks 270,272. Therefore, the reels 276,278 support much of the weight of the plates 46,48 during the winding, thereby reducing friction across the tracks 270,272.

Preferably, the motors which drive the anode and cathode reels are intermittently activated and halted in response to sensors which sense the position of the plates as they are payed out to the arbor. As broadly shown in FIG. 16, a pair of plate position sensors 286 are mounted on both sides of the frame 202 facing the stands 280,282. The position sensors 286 may sense capacitance to thereby determine the position of the plates 46,48. Alternately, the position sensors 286 may be typical optical or acoustical position sensors. In operation, a motor 284 is activated when the upper sensor 286 (as shown in FIG. 16) determines that the respective plate is near or contacting the upper sensor. The motor 284 operates paying out the plate until the lower sensor 286 (as shown in FIG. 16) determines that the respective plate is near or contacting the lower sensor. The motor 284 is then shut off. As the arbor 204 rotates and takes up the plate, the portion of the plate between the upper and lower position sensors 286 will rise until the upper sensor again senses the plate, after which the motor 284 is again activated. This cycle repeats itself continuously during winding.

Preferably, as set forth in FIGS. 27 and 32, at least one electrode feed roller 302 is mounted in the positive plate track 270 to draw the plate 46 from the stand 282 to the arbor 204. Preferably two feed rollers 302 may be provided so that the plate 46 passes between the pair in a nipping engagement. The feed rollers may be driven by a stepping motor 304 mounted on the frame 202 to initially draw the plate from the stand 282 to the arbor 204. Once the plate 48 is being wound about the arbor 204, the feed rollers 302 are no longer driven by the motor 304 and act as idler rollers.

Preferably, a cutting mechanism 306 is mounted on the positive plate track 270 between the feed rollers 302 and the arbor 204 to cut the plate 46 just prior to completion of a winding 44. The cutting mechanism 306 may include a motor-actuated, pneumatic, or manual cutting blade 308. The blade 308 may operate as a shearing edge, a guillotine edge, or a scissor edge, as long as it is hard enough to cut the plate 46.

Preferably, the apparatus 200 further includes a tracking platform 310 mounted on the frame 202 via a support member 311. The tracking platform 310 includes a groove 312 similar to groove 274 in the positive plate track 270. At least one tracking roller 314 is mounted on the tracking platform 310. Preferably, a pair of tracking rollers 314 is provided, as shown in FIG. 16. As for feed rollers 302, tracking rollers 314 may comprise spring loaded nip rollers. A tracking motor 316 may be provided on the frame 202 or on the tracking platform 310 for moving the support member 311 and platform back and forth small distances relative to the front wall 203. The tracking motor 316 may preferably comprise a servo motor which can rapidly and accurately move the tracking platform 310 slightly so as to keep the plate accurately aligned in the groove 274 in the positive plate track 270.

Preferably, plate edge position sensors 318 are provided on the positive plate track 270 for determining the position of the side edges of the plate 46. The position sensors 318 may comprise infrared or other wavelength light beam position detectors. The position sensors 318 detect the distance between the side edges of the plate 46 and the side edges of the groove 274. The position sensors 318 should be accurate enough to detect a gap between the edge of the plate 46 and the edge of the groove 274 on the order of about 0.001 to 0.005 inches or smaller.

Preferably, when the position sensors 318 detect a gap between the plate 46 side edge and the groove 274 edge larger than a predetermined amount, for example, such as about 0.005 inches, a signal is sent to the tracking motor 316. The tracking motor 316 then drives the tracking platform 310 slightly in the direction which will reduce the gap to below the predetermined amount. This tracking function is performed continuously during the operation of the device 200 to thereby keep the plates 46,48 aligned. Such precise alignment is important, especially during the initiation of the winding process, since the plates 46,48 used with the present invention may be in the neighborhood of 800 inches long. Even the smallest misalignment at the beginning of the winding process could undesirably perpetuate itself and grow throughout the winding process to render the resultant winding 44 misshapen or nonfunctional for its intended purpose.

Figure 33:
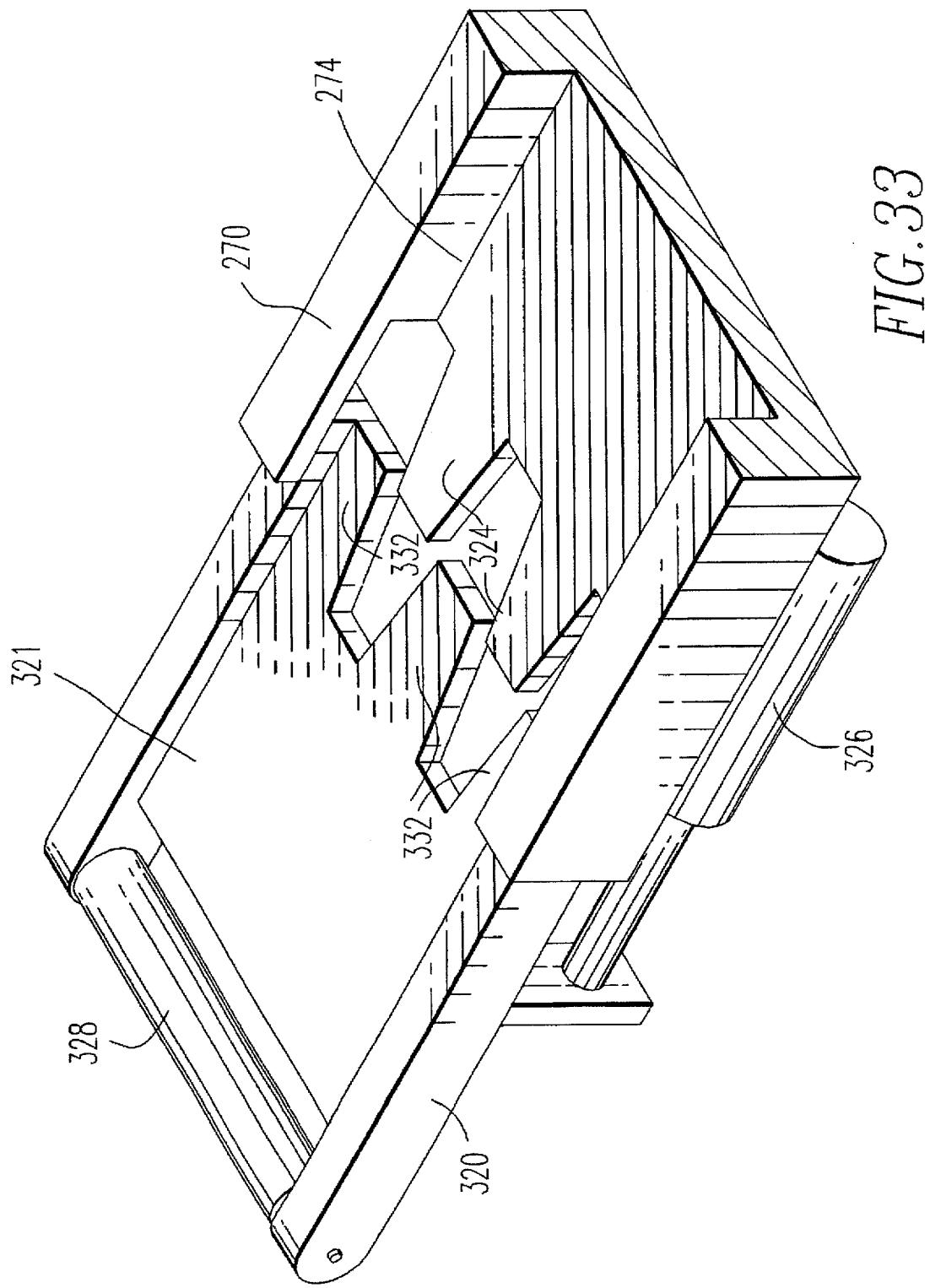
FIG. 33 is a perspective view of the positive plate track and slide of the device of FIG. 16.

Preferably, a telescoping slide 320 extends from the end of the positive plate track 270 toward the arbor 204. As shown in FIG. 33, the slide 320 has teeth 322 extending from slide groove 321 which mesh with teeth 324 on the positive plate track 270. When the slide 320 is extended, the teeth 322 on the slide 320 overlap slightly with the teeth 324 on the positive plate track 270 so that no linear gap exists across the entire groove 274. The teeth overlap so that the plate 46 is always supported at some position across its width during its passage down the groove 274. However, structures other than teeth could be employed between the groove 321 and the groove 274 to support the plate within the scope of the invention.

Preferably, a roller 328 is provided on the end of the slide 320 away from the positive plate track 270 for contacting the winding 44 during the winding process. A pressure cylinder 326 may be attached to the positive plate track 270 to urge the slide 320 (via a shaft 327) away from the track and to apply pressure to its winding 44 as it grows.

Figure 34:
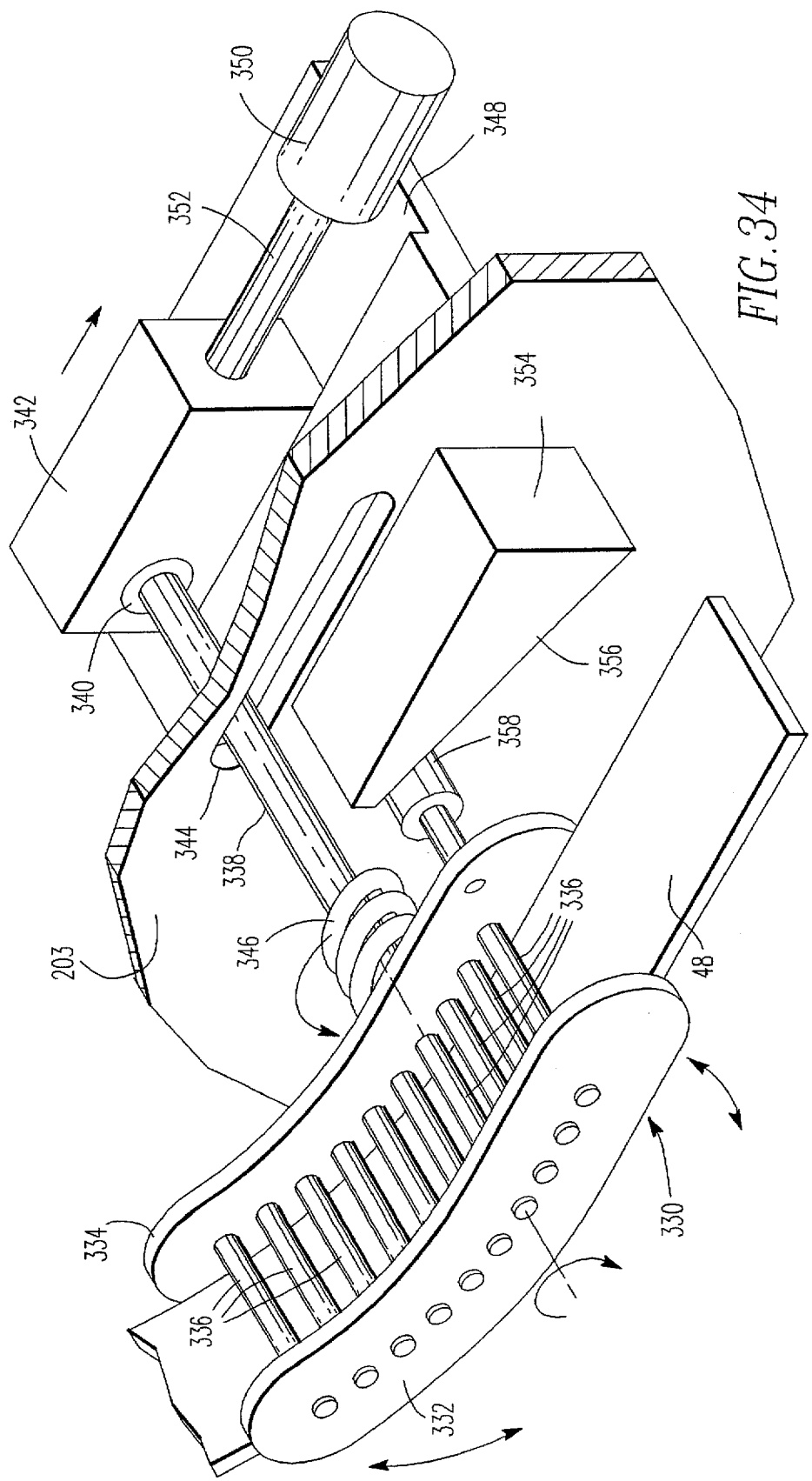
FIG. 34 is a perspective view of the roller assembly mechanism of the device of FIG. 16.

Preferably, as set forth in FIG. 34, an arched roller assembly 330 is provided above the positive plate track 270 for guiding the plate 48 during winding. The roller assembly includes two arcuate sides 332,334 with a plurality of idler rollers 336 in between. The assembly 330 is supported by pivot shaft 338 mounted in a pivot bearing 340 in a slide base 342 in the frame 202. The pivot shaft 338 extends through a slot 344 in the front wall 203 of the frame 202. A torsion tension spring 346 urges the assembly 330 in the counterclockwise direction, as shown in FIG. 34. The slide base 342 is slidable along a slide path 348 inside the frame 202. A pressure cylinder 350 urges a shaft 352, and thus the slide base 342, to the left as shown in FIG. 34, so that the left most idler roller 336 may apply pressure to the winding 44 as it grows. A camming member 354 is mounted on the front wall 203 of the frame 202. The camming member 354 has a camming surface 356 for guiding a cam follower 358 which is attached to the side 334 of the roller assembly 330. During the winding process, the roller assembly 330 is pushed to the right by the winding 44, as shown in FIG. 34, and the camming member 354 causes the assembly to rotate clockwise. As shown in FIGS. 28–31, this clockwise rotation allows the rollers 336 of the assembly 330 to guide the plate 46 smoothly to the winding 44 during the winding process.

Is should be understood that a duplicate of the above structure used for guiding the cathode plate 46 is also provided opposite the arbor 204 for guiding the anode plate 48. For example, the negative plate track 272 supports feed rollers 302, a cutting mechanism 306, sensors 318, and a slide 320. Similarly, a duplicate tracking platform 310 with tracking rollers 314 are provided. However, as shown in FIG. 27, the roller assembly 330 for the anode plate 48 is mounted beneath the negative plate track 272, and the roller 328 on the slide 320 is mounted above the plane in which the plate initially travels. Thus, the slide groove 321 may be shortened on the negative plate slide 320 so that the anode plate may pass between the roller 328 and the roller assembly 330, as shown in FIG. 27.

During the winding, the diameter of the winding increases from an initial diameter to a completed diameter. FIGS. 18–24 show the process by which the separator 50 and the plates 46,48 form the winding 44 as the arbor 204 rotates.

In accordance with the invention, the apparatus includes a series of rollers arranged on the frame about the arbor and being movable away from the arbor. Only a portion of the series of rollers contact the winding when the winding is of the initial diameter, and additional rollers contact the winding when the winding reaches a first intermediate diameter between the initial and completed diameters. As embodied in FIG. 27, a series of support rollers are arranged about the arbor 204 on the frame 202. The rollers are mounted so as to be movable away from the arbor 204 during the winding process, the winding 44 pushing the rollers.

The series of rollers includes a first set of four rollers 210 mounted in pairs on first housings 212. The rollers 210 should be longer than the distance between the sides 64,66 of the winding 44 to be produced to ensure that the rollers contact the entire winding applying even pressure during the winding process. The rollers 210 are preferably idler rollers, and may include a resilient outside surface for contacting the winding 44. The housings 212 are each mounted on the end of shafts 214 which are disposed on opposite sides of the arbor 204. Each shaft 214 is slidably engaged by a pressure cylinder 216 mounted on the frame 202.

The pressure cylinders 216 should be capable of exerting in the range of 35 to 100 pounds-force, and more preferably exert in the range of 35 to 60 pounds-force, to maintain the rollers 210 in pressing contact with the winding 44 during the winding process to ensure that the winding is wound tightly about the arbor. The pressure cylinders 216 are capable of at least partially supporting the weight of a winding 44 of well over 100 pounds. Preferably, the pressure cylinders 216 should be able to be retracted by the pressure of the winding 44 on the rollers 210 as the winding 44 grows through a distance of about 4 inches or more each, providing an ability to wind an 8 inch diameter winding 44.

Preferably the series of rollers includes a first set of rollers for initially supporting the winding when the winding is of the initial diameter, and a second set of rollers for subsequently supporting the winding when the winding reaches the first intermediate diameter. As shown in FIG. 27, the first set of four rollers 210 contacts the winding 44 at the start of the winding process. Thus, rollers 210 are the only rollers which contact the winding 44 when the winding process is in the initial steps shown in FIGS. 19–21, as the winding begins to increase in size from the initial diameter to a completed diameter. The growth of the winding 44 during the winding process pushes the rollers 210 outwardly against the force of the pressure cylinders 216.

It is important that the pressure cylinders 216 and rollers 210 provide an even distribution of pressure about the winding 44 to smoothly compress the winding during the winding process. Thus, the compression of the separator 50 may vary by less than 10% throughout the winding 44, as described above.

Figure 28:
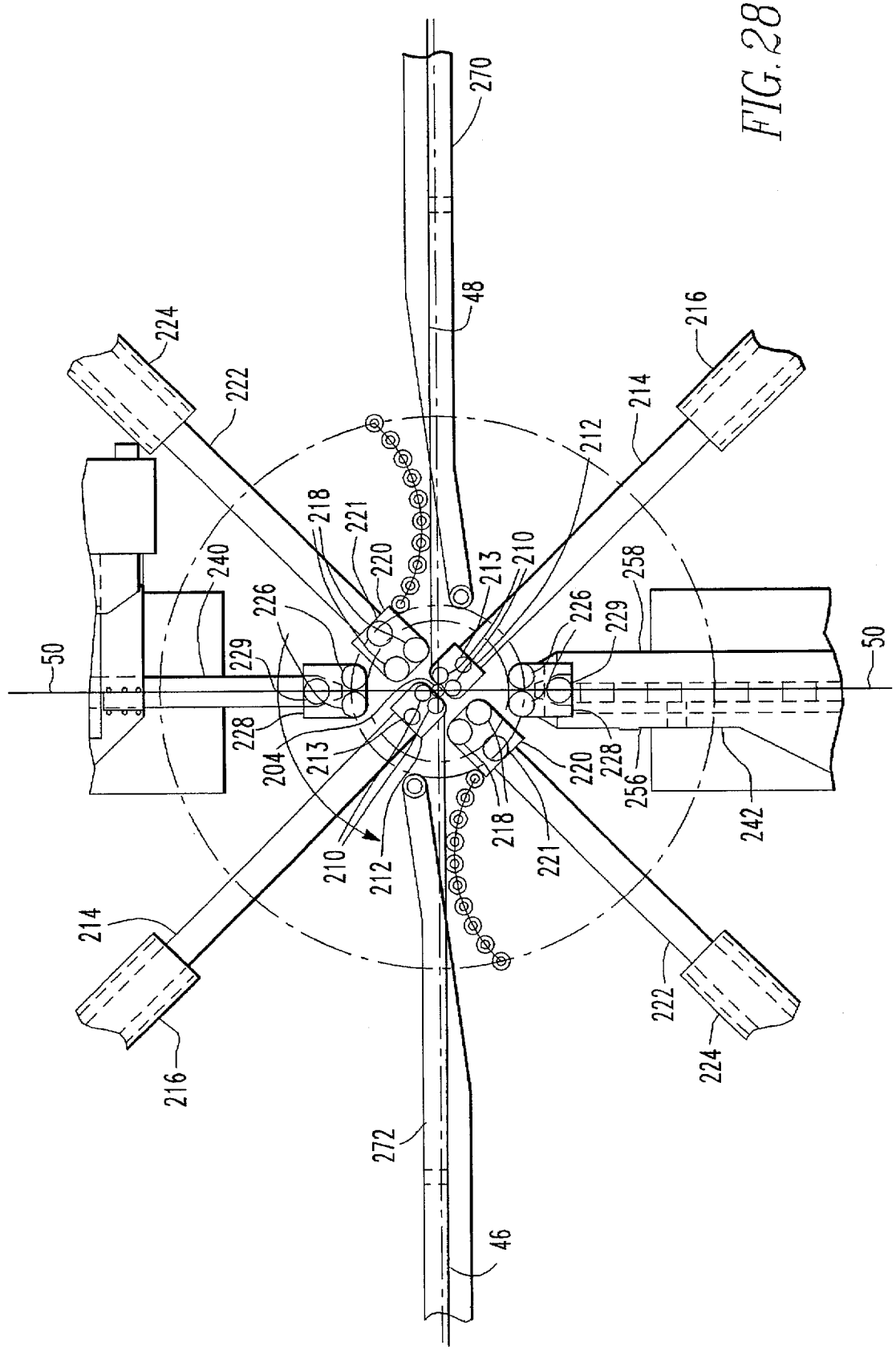
FIG. 28 is an enlarged representation of the rollers surrounding the arbor at the initiation of winding.
Figure 29:
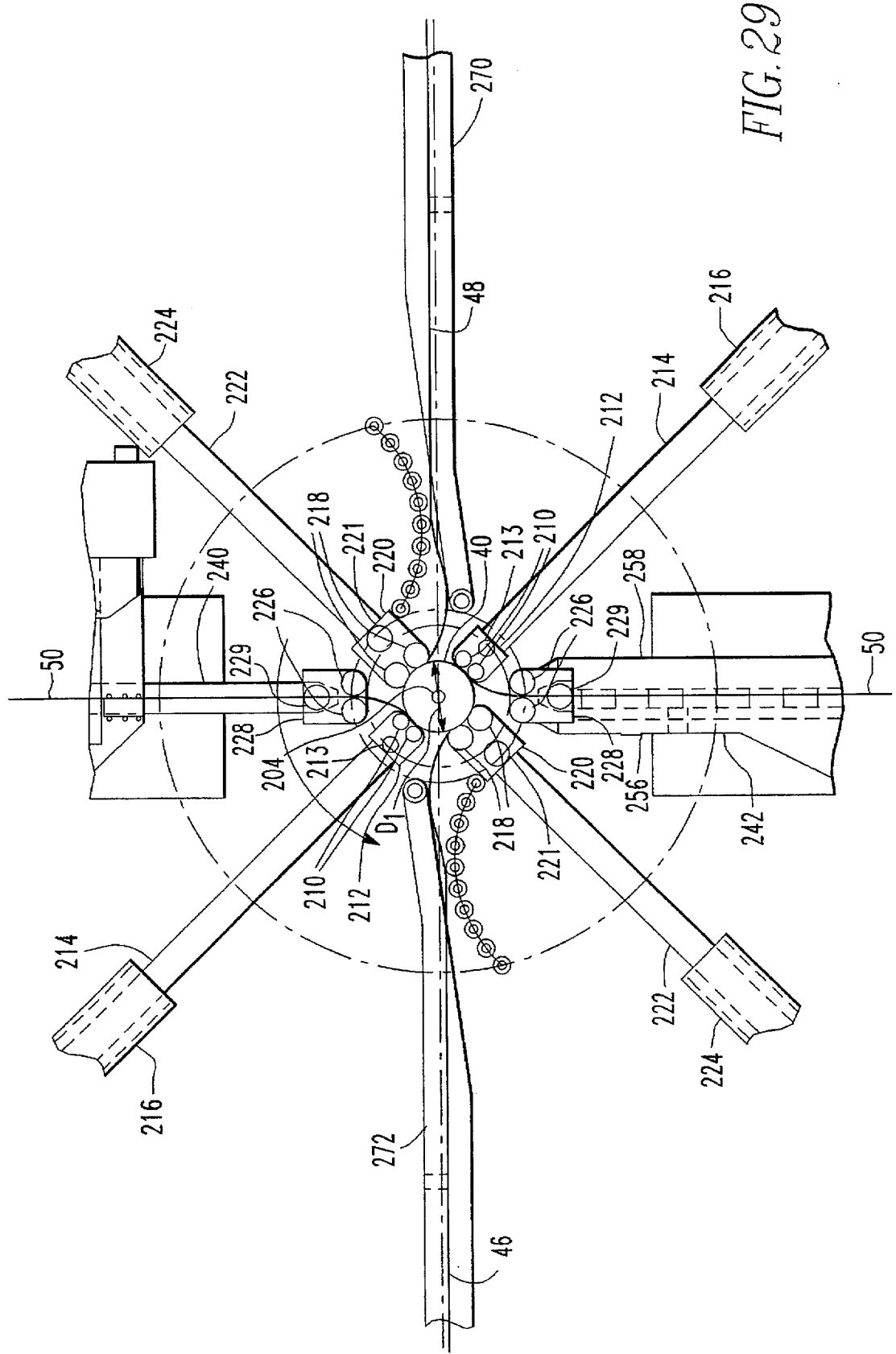
FIG. 29 is an enlarged representation of the rollers surrounding the arbor after the winding has grown to a first predetermined diameter.

The first set of rollers 210 are the only rollers which support the winding 44 until the winding grows to the first predetermined diameter. As shown in FIG. 29, a second set of four rollers 218 is mounted in pairs on housings 220. The housings 220 are mounted on shafts 222 slidably engaged in pressure cylinders 224 secured to the frame 202. The second set of rollers 218 and the elements which support them are substantially similar to the first set of rollers 210. However, the second rollers 218 and housings 220 may be slightly larger than the first rollers 210 and housings 212 because the winding 44 will be larger when the second rollers contact the winding than when the first rollers contact the winding. The second set of rollers 218 and their support elements should be spaced about the circumference of the arbor 204 from the first set of rollers 210 and their support elements. As shown in FIG. 28, the each pair of the second set of rollers 218 is spaced 90° from both pairs of the first set of rollers 210. Such spacing allows for even support of the winding 44 during the winding process. However, the spacing of the sets of rollers 210, 218 may be altered within the scope of the invention as long as the winding 44 is sufficiently supported during the winding process.

The second set of rollers 218 contacts the winding 44 when the winding reaches a first predetermined diameter $D_1$, as shown in FIG. 29. Thus, at the initiation of the winding process, the rollers 218 are disposed in the position shown in FIG. 28 and do not move outward from the arbor 204 until the winding 44 grows to the first predetermined diameter $D_1$, as shown in FIG. 29. As for the first set of rollers 210, the second set of rollers 218 moves outward from the arbor 204 as the winding 44 grows larger than is shown in FIG. 29.

Figure 30:
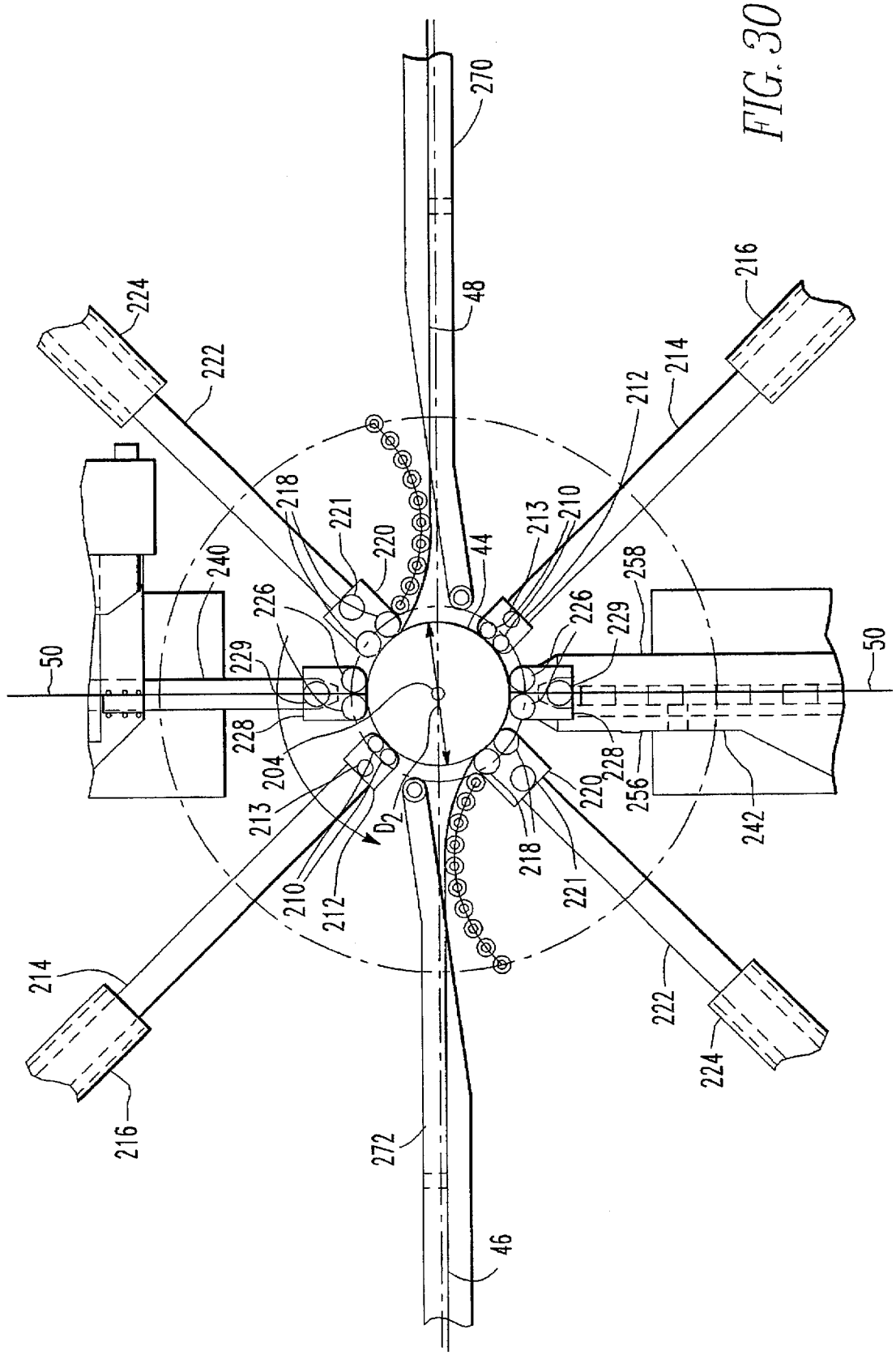
FIG. 30 is a diagrammatical representation of the rollers surrounding the arbor after the arbor has grown to a second predetermined diameter.

Preferably, during the winding process, the winding grows from the first intermediate diameter to a larger second intermediate diameter before reaching the completed diameter, the series of rollers including a third set of rollers for subsequently supporting the winding when the winding reaches the second intermediate diameter. As shown in FIG. 30, if a winding 44 of a diameter larger than a second predetermined diameter $D_2$ is desired, a third set of rollers 226 may engage the winding. The third set of rollers may be mounted in pairs on housings 228 similar to housings 212 and 220, above. One housing 228 is mounted on an upper separator track assembly 240, and the other housing is mounted on a lower separator track assembly 242, as will be described below. Both separator track assemblies 240,242, and thus both housings 228 are movable away from the arbor 204 during the winding process.

As shown in FIG. 30, the third set of rollers 226 contacts the winding 44 when it grows to the second predetermined diameter $D_2$. In that the separator track assemblies 240,242 are preferably mounted directly above and below the arbor 204 for reasons which will be described below, each pair of the third set of rollers 226 is mounted above and below the arbor 204 spaced in between a pair of the first set of rollers 210 and a pair of the second set of rollers 218.

Figure 31:
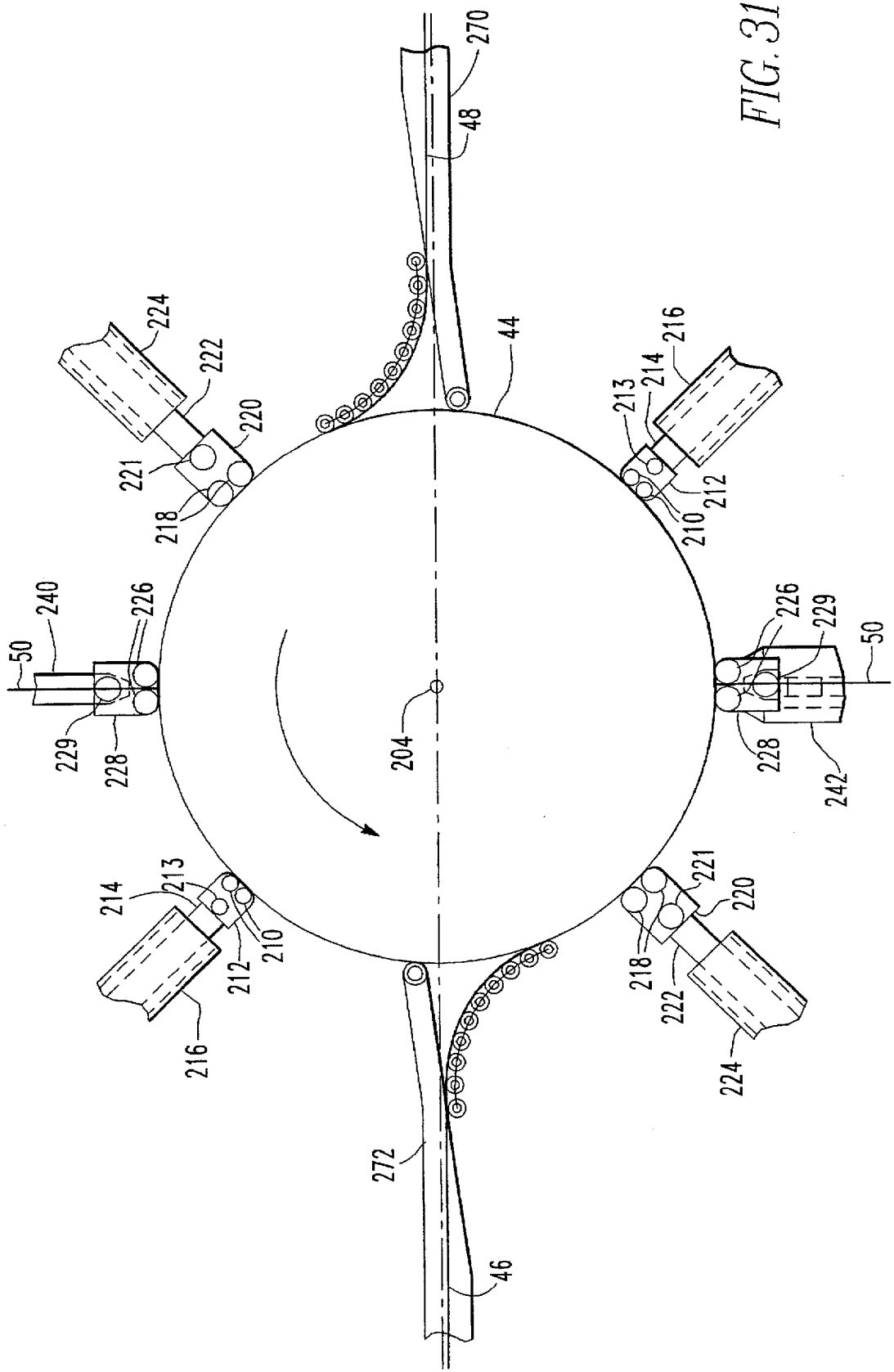
FIG. 31 is a diagrammatical representation of the rollers surrounding the arbor after the arbor has reached a finished diameter.

If the arbor 204 is rotated further from the position shown in FIG. 30, the winding 44 may reach rollers 328 and the inner most idler rollers 336 as described above. As the winding 44 diameter increases even more, it reaches a completed diameter, as shown in FIG. 31. In this position, all of the rollers 210,218,226,328,336 have been forced outward from the arbor 204 by the winding 44. The pressure cylinders 216,224,326,350 are still applying pressure on the winding 44 to ensure than the winding is evenly wound. The pressure cylinders 216,224,326,350 are also still supporting substantially all of the weight of the winding 44, thus precluding any undesirable bending of the arbor 204 or damage to the motor 206 due to the weight of the winding 44.

The arrangement of the rollers and the arbor 204 beneficially allows the use of a smaller arbor than in prior art devices. For example, the mounting of the arbor 204 to the frame 202 at only one end, rather than at both ends, allows the arbor to flex while rotating, thereby reducing the possibility of breaking. As shown in FIG. 3, circle A defines the outermost radius of the winding 44 measured from the center axis of the arbor. As shown in FIG. 3, the outer surface of the winding 44 does not conform to circle A because the winding 44 is not perfectly circular. This irregularity results from the desired positioning of the ends 46a, 48a of the plates 46,48 adjacent each other. The irregularity causes uneven stresses to act on the arbor 204 during winding rotation. However, this stress is minimized by the substantial support of the weight of the winding 44 by the rollers.

It should be kept in mind that the sets of rollers need not be arranged in pairs within the scope of the invention. For example, each housing 212,220,228 could hold any number of rollers sufficient to support the winding 44. Furthermore, the sets of rollers need not be arranged in housings mounted opposite from each other. For example, the first set of rollers 210 could be mounted on three or four housings 212 spaced about the arbor 204. However, applicants have found that arranging two rollers on a housing and arranging two housings opposite each other and spaced from the arbor 204 at a given diameter provide advantageous results. Such an arrangement allows for the use of an increasing number of rollers contacting the winding as the winding grows.

Figure 26:
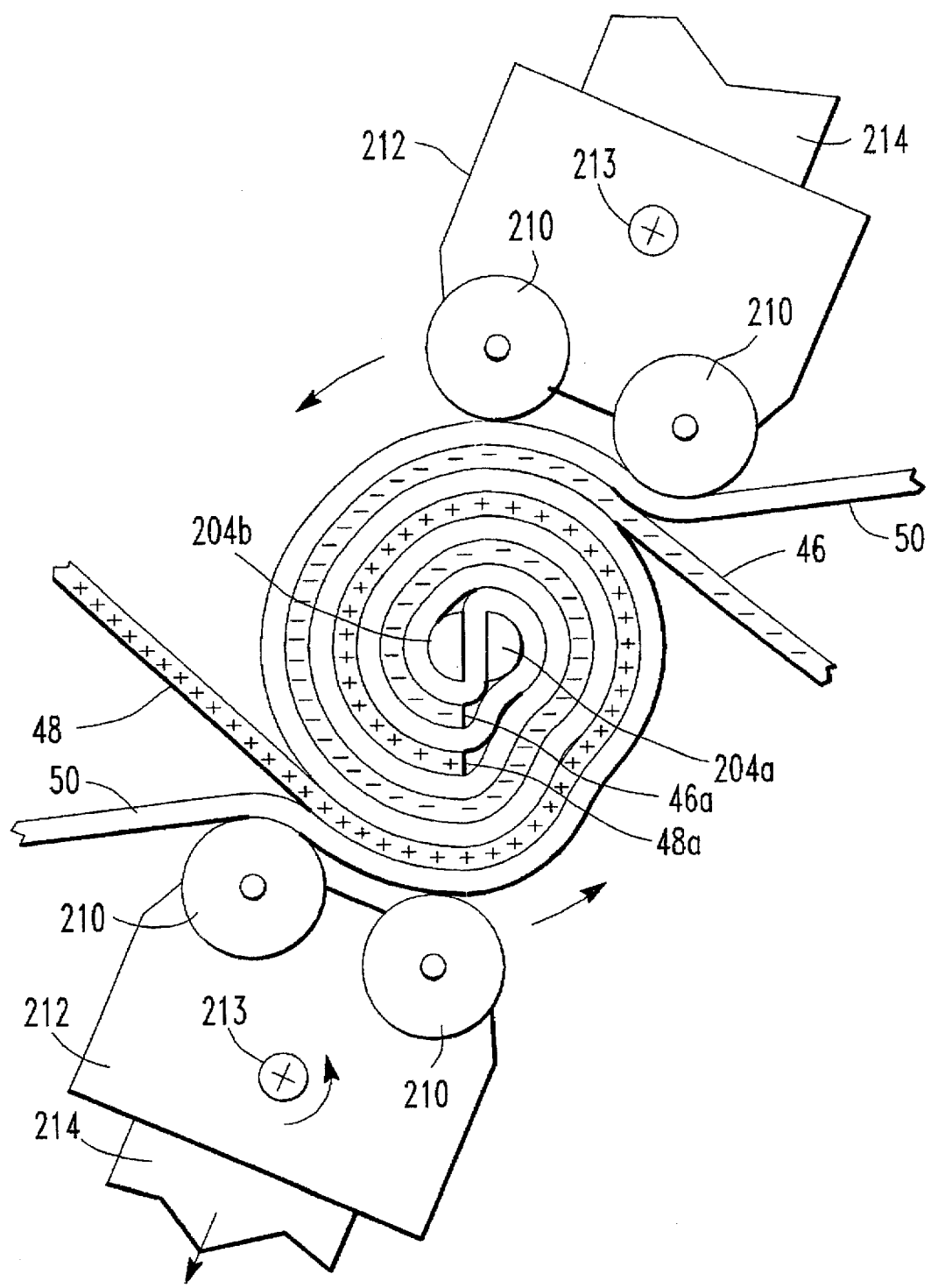
FIG. 26 is a diagrammatical representation of rollers supporting a winding being formed about an arbor during the initial stages of winding.

Preferably, the housings supporting the rollers are pivotable about an axis substantially parallel to the arbor. As best shown in FIG. 26, housings 212 are pivotably supported on the shafts 214. Each housing 212 may pivot about an axis 213 perpendicular to the plane of FIG. 26 and parallel to the arbor 204. The other housings 220,228 are similarly pivotable about their respective axes 221,229. The pivotability of the housings is important in that it allows the housings to maintain contact between their respective rollers and the winding 44 when the "step" in the winding is passed during each rotation. Thus, as shown in FIG. 26, as the winding 44 rotates in the direction of the curved arrows, the step in the winding extending radially outwardly from the ends 46a,48a of the plates 46,48 passes each housing 212 once every 360°. If the housing 212 at the lower right in FIG. 26 were not pivotable, the uppermost roller 210 in this housing would undesirably lose contact with the winding 44 briefly as the lowermost roller 210 moved past the step. If contact between the rollers 210 and winding 44 is lost, even momentarily, the possibility occurs of producing uneven, loose, or nonuniformly compressed windings.

Therefore, when the lower housing 212 reaches the step in the winding 44, the housing may pivot, as shown in FIG. 26, about the axis 213 in the direction denoted by the arrow. The housing 212 may also be pushed back slightly against the force of the pressure cylinder 216 to accommodate the larger diameter of the winding 44. The pivoting housing 212 provides a smooth transition of the rollers 210 from an area of the winding 44 of a given thickness across a step to an area of the winding of a larger thickness while keeping both rollers in contact with the winding.

Preferably, the apparatus includes a separator reel. As embodied in FIGS. 16 and 17, the separator 50 which is wound in the winding 44 is supplied from a separator reel 244 preferably mounted on the frame 202 above the arbor 204. The separator reel 244 should hold enough of the separator material 50 to wind at least one winding 44 since it is preferable that the separator in each winding be made from a single, continuous piece of material.

Preferably a separator accumulator is provided in the apparatus, the separator reel paying out a first portion of the separator prior to winding and a second portion of the separator during winding. The first and second portions of the separator are wound simultaneously on the arbor during winding. As broadly shown in FIGS. 16 and 17, a separator accumulator 246 is mounted to the frame 202. The separator accumulator 246 may comprise a container such as a box with an open top and should be mounted directly beneath the arbor 204.

Prior to winding the separator 50 about the arbor 204, a first portion 50a of the separator is run off the separator reel 244, past the arbor, and into the separator accumulator 246 where it is allowed to simply pile up in a serpentine fashion. The arbor 204 is then placed in the position shown in FIG. 19 by extending one or both of the prongs 204a,204b, if necessary. When winding is initiated, the first portion 50a of the separator 50 is pulled upwards from the separator accumulator 246 to be wound about the arbor 204. Simultaneously, the second portion 50b of the separator 50 is pulled down from the separator reel 244 to be wound about the arbor 204. Winding the first portion 50a of the separator 50 from the separator accumulator 246 rather than from a reel reduces the tension on the separator and thereby reduces the possibility of tearing during winding. Use of the separator accumulator 246 also facilitates beginning the winding since the separator 50 can be placed between the prongs 204a, 204b of the arbor 204 and simply wound without having to attach two separator pieces to the arbor prior to winding. Additionally, use of the separator accumulator 246 facilitates the proper alignment of the separator 50 prior to winding so that the separator and plates 46,48 are properly wound about the arbor 204.

Preferably, the apparatus further includes a separator track mounted on the frame for guiding the separator toward the arbor. As broadly embodied in FIGS. 16, 17, and 27, a separator track for guiding the separator 50 toward the arbor 204 is provided in two parts. An upper separator track assembly 240 guides the second portion 50b of the separator 50 from the separator reel 244 to the arbor 204. A lower separator track assembly 242 guides the first portion 50a of the separator 50 from the separator accumulator 246 to the arbor 204.

As shown in FIG. 27, the upper separator track assembly 240 includes a hollow guide member 248 defining a channel therethrough having a rectangular cross section. The guide member 248 supports the upper housing 228, and the separator 50 passes between the rollers 226 mounted on the upper housing. The upper assembly 240 is movable upward away from the arbor 204 during the winding process by virtue of growth of the winding 44. The upper assembly 240 is mounted on the front wall 203 of the frame in a slide track 241. A counterweight 243 is provided in the frame 202 to move in tandem with the upper assembly 240. The guide member 248 defines a rectangular channel through its center just large enough to receive the separator 50. Therefore, if windings 44 of different sizes having separators 50 with correspondingly different widths are to be made on the apparatus 200, different guide members 248 must be provided for each size or else the guide member size should be adjustable. The guide member 248 may thus be readily detachable from the apparatus 200 for ease of replacement.

The upper separator track preferably includes a pair of rollers for pulling the separator from the separator reel. As shown in FIG. 27, rollers 250 are provided on the separator track 240 for pulling the separator 50 from the reel 244. The rollers 250 may preferably be spring loaded pinch rollers with resilient outer surfaces. The rollers 250 act as driving feed rollers to pull the first portion 50a of the separator 50 into the separator accumulator 246. The rollers 250 may be driven by a stepping motor (not shown). Once the first portion 50a of the separator 50 is pulled from the separator reel 244 and the apparatus is in condition to begin winding, the rollers 250 are no longer driven and become merely dragging tension idler rollers. Thus, the rotation of the arbor 204 alone draws the second portion 50b of the separator 50 from the reel 244 to the arbor 204.

The upper separator track assembly 240 preferably includes a cutting mechanism for cutting the separator. As shown in FIG. 27, a cutter 252 is provided on the separator track 240 beneath the rollers 250. The cutter 252 may include any suitable mechanism for severing the separator 50 such as shearing, scissor, or guillotine blades. The cutter 252 may be manually or programmably operated when a winding 44 is nearly complete.

If desired, a separator sensor may be located in the upper separator track to determine if the separator reel has run out of separator. As shown in FIG. 27, a sensor 254 may be located in the upper separator track assembly 240 adjacent the guide member 248 for detecting the presence or absence of the separator 50. The sensor may comprise any known position detector such as an optical sensor. The apparatus 200 may be programmed to signal the operator or stop winding upon receiving a signal from the sensor 254 that no separator material is 50 present in the guide member 248.

The lower separator track assembly 242 preferably includes a fixed base portion and a movable portion. Like the upper assembly 240, the lower assembly 242 is mounted to the front wall 203 of the frame on a slide track 241 and moves in tandem with a counter weight 243. As broadly shown in FIG. 27, the lower separator track 242 includes two parts, a fixed base 256 and a movable portion 258. The fixed base 256 is mounted on the lower assembly 242 for movement up and down. The movable portion 258 is attached to the base 256 by pins 260 (see FIG. 27) on which the movable portion may move back and forth. The base 256 and the movable portion 258 define a rectangular opening for receiving the separator 50 between them, similar to that through the guide member 248, when the movable portion is in the closed position (as shown in FIG. 27).

Before the first portion 50a of the separator 50 is payed out from the separator reel 244, the movable portion 258 is positioned (to the right of the position shown in FIG. 27) to allow the separator to freely flow into the separator accumulator 246. The separator 50 can then be accurately aligned against the base 256. The movable portion 258 is then moved to the left and shut against the base 256 before winding is begun, thereby entrapping the separator 50 in between and increasing the tensioning effect of the vacuum on the separator.

Preferably, the lower separator track assembly 242 has means for applying suction to the separator to maintain tautness during winding. As embodied herein, the suction means may comprise a vacuum source 262 provided in the frame 202 and connected to the base 256 by a vacuum line 264. The vacuum line 264 communicates with a plurality of parallel passages 266 extending from top to bottom inside the base 256. Along the passages 266 are a number of small conduits 268 placing the passages in communication with the rectangular opening between the base 256 and the movable portion 258. The vacuum source 262 draws vacuum on the separator 50 as it passes through the lower separator track assembly 242 during winding in order to keep the first portion 50a of the separator taut as it is lifted from the separator accumulator 246 during winding. Use of the vacuum to keep the first portion 50a of the separator 50 taut strains the separator less than the use of a reel below the arbor 204. To keep the separator 50 taut, the vacuum source 262 should provide a dragging tension on the separator in the range of a few ounces. The vacuum level should not be high enough to tear the separator 50 during winding, only high enough to maintain tautness.

In using the apparatus 200, the operator first pulls the ends of the anode and cathode plate material from the reels 276,278. The plates 46,48 are each passed between their respective plate position sensors 286 and pushed through their respective tracking rollers 314 on the tracking platform 310. The plates 46,48 are then threaded beneath the edge position sensors 318 on their respective plate tracks 270,272 and are fed between their respective feed rollers 302. The feed rollers 302 are activated drawing the plates 46,48 past their respective cutting mechanisms 306. If desired, the plates 46,48 may be cut by the cutting mechanisms to provide the square ends 46a,48a for winding. Once the feed rollers 302 begin to draw the plates 46,48 the plate position sensors 286 may be activated to control the stand motors 284.

The separator 50 is put in place for winding by threading the separator from the separator reel 244 through the upper separator track assembly 240. Prong 204a of the arbor is retracted into the frame 202 to move it out of the way of the separator 50. The rollers 250 are activated to draw the first portion 50a of the separator from the separator reel 244 through the upper separator track assembly 240, past the arbor 204, through the opened lower separator track assembly 242, and into the separator accumulator 246. The lower separator track assembly 242 is then closed over the separator 50, and the vacuum may be activated.

Figure 18:
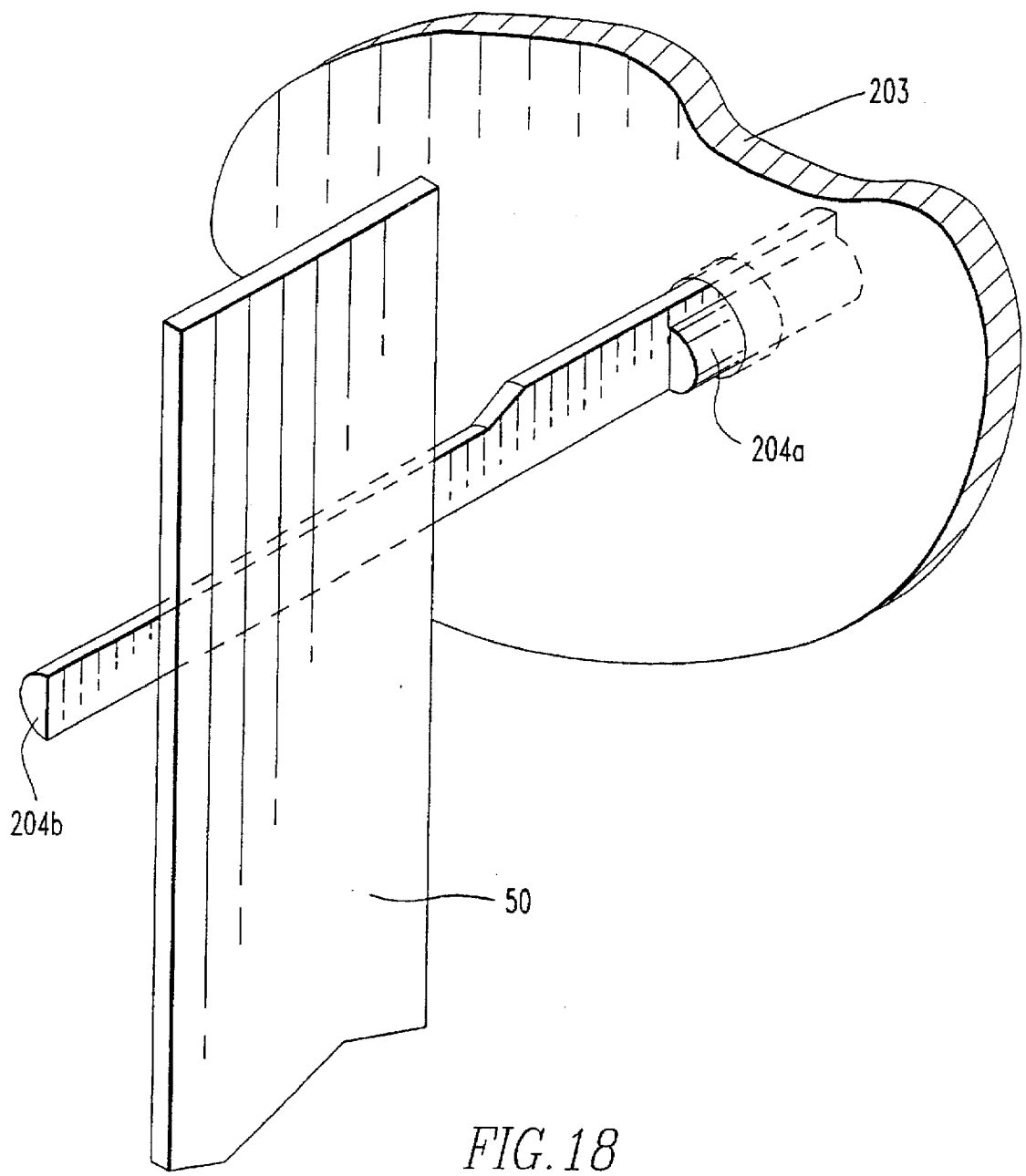
FIG. 18 is a perspective view of the arbor of the apparatus of FIG. 16.
Figure 20:
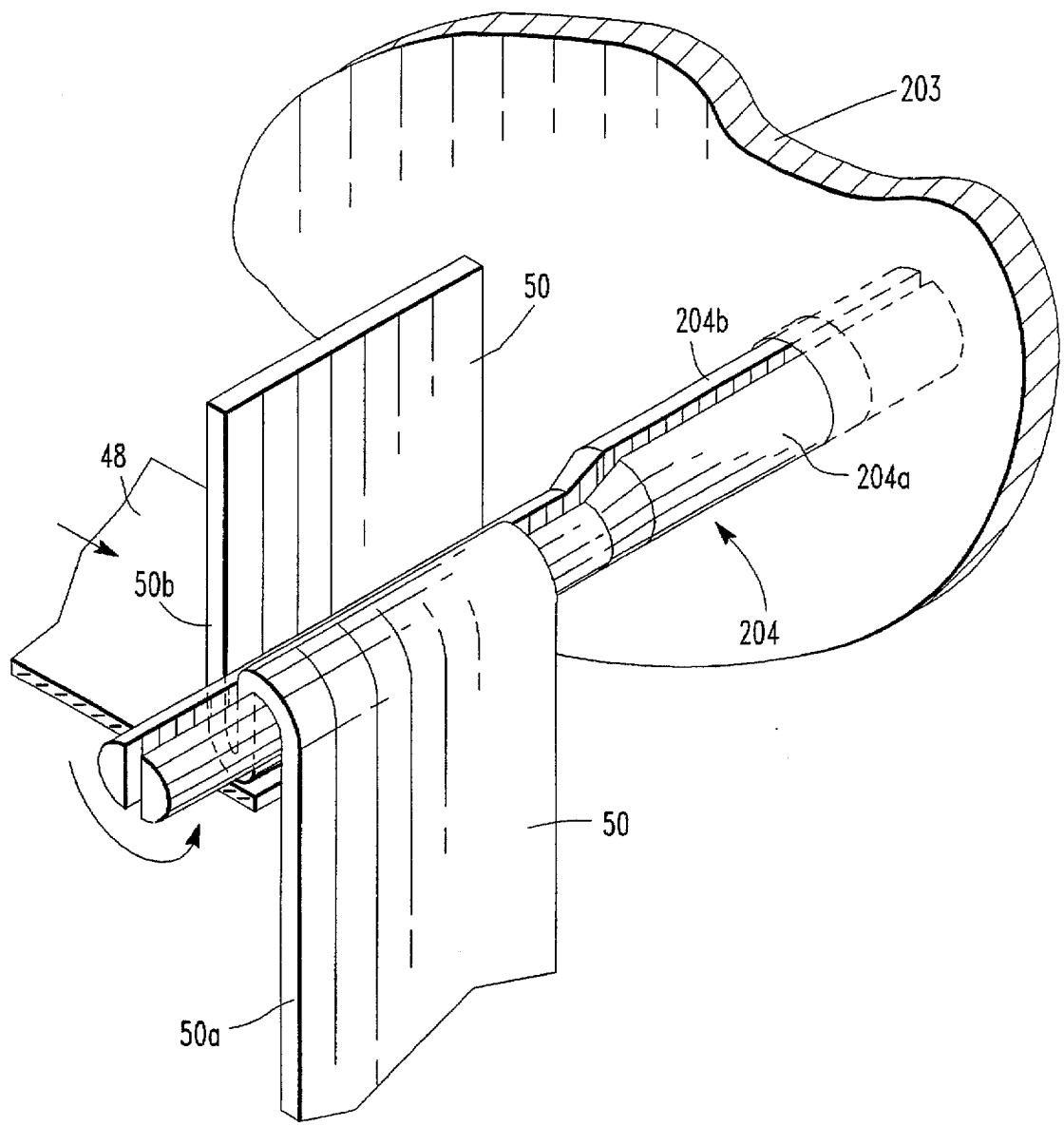
FIG. 20 is a perspective view of the arbor of the apparatus of FIG. 16 rotated from the position shown in FIG. 19.

The separator 50 thus extends past prong 204b of the arbor 204, as shown in FIG. 18. As shown in FIG. 19, prong 204a is then extended out of the frame 202 to take a position opposite prong 204b, with the separator 50 between the prongs. The arbor 204 is then rotated counterclockwise by the motor 206. FIG. 20 shows the position of the arbor 204 and separator 50 after the motor 206 has rotated the arbor about 180°. At this point, the motor 206 stops the rotation of the arbor 204, with the separator 50 covering a substantial part of the circumference of the prongs 204a,204b. The distance between two points on the inner surfaces of the separator 50, both in contact with opposite prongs 204a, 204b of the arbor 204 in FIG. 20, may be considered the inner first diameter of the winding 44. This diameter defines the hole 60 discussed above regarding the ratio between the diameter of the winding 44 and the diameter of the hole 60 in the winding. Thus, the diameter of the hole 60 essentially equals the diameter of the arbor 204.

The anode and cathode plates 48,46 are then brought into contact with the separator 50 by the feed rollers 302 to be wound about the arbor 204. First, as shown in FIG. 20, the anode plate 48 is pushed into contact with the separator 50 after the motor 206 stops the arbor 204 from rotating. After the anode plate 48 contacts the separator 50, the motor 206 drives the arbor 204 counterclockwise about 180° and stops in the position shown in FIG. 21. The cathode plate 46 is then brought into contact with the separator 50 by the feed rollers 302. The motor 206 then rotates the arbor 204 until a completed winding 44 is nearly created, with the output of the edge sensors 318 causing the tracking motor 316 to move the tracking platform 310 back and forth as necessary. The motor 206 is eventually stopped halting the arbor 204 rotation. The cutting mechanisms 252,306 cut the separator 50 and plates 46,48. Then, the motor 206 restarts the arbor 204 to create a finished winding 44, as shown in FIG. 22. Once a completed winding 44 is created, the winding may be wrapped in tape or a napkin ring to maintain the tightness of the winding. Alternatively, the winding 44 may be moved from the arbor 204 directly into a casing or pressure vessel so that the winding does not have an opportunity to loosen.

It should be understood that either of the plates 46,48 may be fed into the separator 50 first. It should also be understood that the about 180° rotation of the arbor between FIGS. 19 and 20 may be omitted, and a plate may be introduced into contact with the separator 50 when the arbor 204 is in the position shown in FIG. 19. This first half-rotation is desired because the plates 46,48 are more readily drawn into the arbor when they are gripped between portions of the separator 50, which does not occur as readily without the initial rotation. Alternatively, the arbor 204 may be rotated more than 180° before the first plate is introduced or before the second plate is introduced, or both.

If the second plate 46 is introduced into the separator 50 after a 180° rotation of the arbor 204 after the first plate 48 is introduced, the ends of the plates 46a,48a will be adjacent each other in the winding 44 with the separator 50 in between, as shown in FIG. 26. This arrangement of the plate ends 46a,48a prevents the wasting of plate capacity since only the overlapping portions of the plates 46,48 are active when discharging.

However, this arrangement of the plate ends 46a,48a undesirably causes the unevenness in the generally circular surface of the winding 44 radially spaced outwardly from plate ends 46a,48a, as discussed above. To avoid this large "step," the second plate 46 may be introduced into the separator 50 at the same time as the first plate 48 in order to maintain a smoother outside profile of the winding 44 by providing two smaller steps. However, some wasted plate capacity will result.

From the position shown in FIG. 22, the winding 44 is then removed from the arbor 204. As shown in FIGS. 23 and 24, one prong 204a may be retracted into the frame 202 followed by the other prong 204b. Once both prongs 204a, 204b retract into the frame 202, the winding 44 is supported by the support rollers (not shown in FIG. 24). This method of removing the arbor 204 from the winding 44 minimally stresses the arbor 204. Therefore, this method of removal is preferred for larger windings 44 which may weigh well over 100 pounds for an 8 inch diameter winding.

Figure 25:
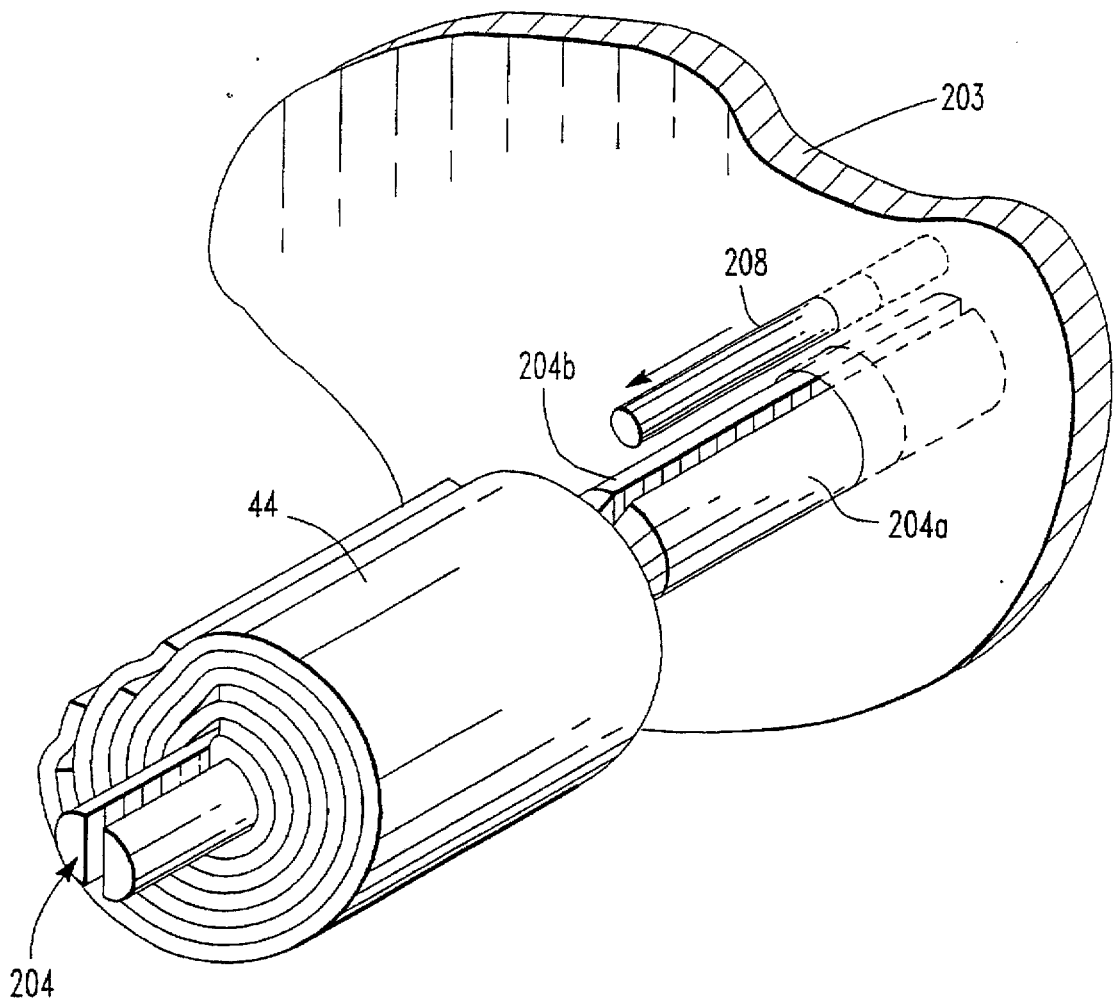
FIG. 25 is a perspective view of a push rod pushing a winding off an arbor of the device of FIG. 16.

Alternatively, as shown in FIG. 25, a push rod 208 extendable from the frame 202 may be used to push the winding 44 off the arbor 204. If desired, the push rod 208 may push the winding 44 directly into a casing 42 or pressure vessel 104. The push rod 208 may be circular, as shown in FIG. 25. Alternately, an annular push rod 208, which fits around the arbor 204, or a plurality of push rods spaced around the arbor, may be provided. In order to facilitate the removal of the winding 44 from the arbor 204 with the push rods, the support rollers' compressive force may be reduced prior to activation of the push rod. Use of a push rod 208 is more suited to the manufacture of smaller windings 44 which do not weigh as much as the larger windings described above.

All of the electric, electromechanical and pneumatic movable elements of the apparatus 200 can be controlled by any suitable controller such as a Programmable Logic Controller (PLC).

It will be apparent to those skilled in the are that various modifications and verifications can be made in the storage device, vehicle, apparatus and method of the present invention without departing from the spirit or scope of the invention. Thus, it is intended that the present invention cover the modifications and variations of this invention provided they come within the scope of the appended claims and their equivalents.

What is claimed is:

1. A motor vehicle for transporting loads in excess of 100 pounds, the vehicle comprising:

a frame;

a plurality of wheels rotatably mounted on the frame;

an electric motor for driving at least one of the wheels; and an electrical energy storage device electrically connected to the motor for energizing the motor, the device including:

(a) a casing;

(b) a plurality of electrically connected coiled windings disposed within the casing, each winding including a cathode plate including a strip having a pair of elongated side edges, an anode plate including a strip having a pair of elongated side edges, and a separator located between the cathode and anode plates, the cathode plate and the anode plate being wound in an offset relationship so that one elongated side edge of the cathode plate extends beyond one elongated side edge of the anode plate at a first side of the winding, and the other elongated side edge of the anode plate extends beyond the other elongated side edge of the cathode plate at a second side of the winding opposite the first side;

(c) an electrolyte material located within each winding; and (d) and a plurality of current collectors disposed within the casing, at least one of the current collectors being pressed against one of the first and second sides of each winding to electrically contact the corresponding winding side at a plurality of locations thereon.

2. The vehicle of claim 1, further including a vessel in which the casing is disposed.

3. The vehicle of claim 2, wherein said vessel is a pressure vessel.

4. The vehicle of claim 2, wherein said vessel is a structural portion of the frame.

5. The vehicle of claim 2, wherein said vessel is located within a hood compartment of the vehicle.

6. The vehicle of claim 2, wherein said vessel is located within a trunk compartment of the vehicle.

7. The vehicle of claim 2, wherein said vessel is located beneath a passenger compartment of the vehicle.

8. The vehicle of claim 2, further including a plurality of said casings, each of said casings holding a plurality of said windings, an amount of said electrolyte material, and a plurality of said current collectors, each of said casings having a substantially cylindrical shape and defining a longitudinal axis, said vessel being configured to hold the casings in a honeycomb arrangement so that the longitudinal axes are parallel.

9. The vehicle of claim 2, further including a plurality of said casings, each of said casings holding a plurality of said windings, an amount of said electrolyte material, and a plurality of said current collectors, each of said casings having a substantially cylindrical shape and defining a longitudinal axis, said vessel being configured to hold the casings so that the longitudinal axes are parallel and coplanar.

10. The vehicle of claim 1, further including a series of metal tubes connected to the frame, each tube for holding a plurality of windings in an axially aligned relationship.

11. The vehicle of claim 1, further including a series of tubes connected to the frame, each tube for holding one casing.

12. The vehicle of claim 1, wherein each of said windings defines a hole therethrough along a longitudinal axis, a ratio of the diameter of the winding to the diameter of the hole being greater than about 6 to 1.

* * * * *